US007869797B2

(12) United States Patent
Kondo et al.

(10) Patent No.: US 7,869,797 B2
(45) Date of Patent: Jan. 11, 2011

(54) DATA PROCESSING SYSTEM AND METHOD, COMMUNICATION SYSTEM AND METHOD, AND CHARGING APPARATUS AND METHOD

(75) Inventors: Tetsujiro Kondo, Tokyo (JP); Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 12 days.

(21) Appl. No.: 11/726,243

(22) Filed: Mar. 21, 2007

(65) Prior Publication Data

US 2007/0177003 A1 Aug. 2, 2007

Related U.S. Application Data

(63) Continuation of application No. 10/048,759, filed as application No. PCT/JP01/04670 on Jun. 1, 2001, now Pat. No. 7,313,386.

(30) Foreign Application Priority Data

Jun. 2, 2000 (JP) .............................. 2000-166733

(51) Int. Cl.
*H04M 3/42* (2006.01)
(52) U.S. Cl. .................... 455/414.1; 455/419; 455/420; 455/406; 455/408
(58) Field of Classification Search ............. 455/414.1, 455/414.2, 414.3, 403, 466, 419, 420, 406, 455/408
See application file for complete search history.

(56) References Cited

U.S. PATENT DOCUMENTS

| 5,436,664 | A | * | 7/1995 | Henry ................... 375/240.16 |
| 5,751,957 | A | | 5/1998 | Hiroya et al. ............... 709/203 |
| 5,790,642 | A | | 8/1998 | Taylor et al. ........... 379/114.02 |
| 5,850,527 | A | * | 12/1998 | Suzuki ....................... 709/247 |
| 6,041,316 | A | * | 3/2000 | Allen ........................... 705/52 |
| 6,075,778 | A | * | 6/2000 | Sugita ......................... 370/335 |
| 6,510,243 | B1 | | 1/2003 | Ikeda ........................... 382/173 |
| 6,757,271 | B1 | | 6/2004 | Kim ............................ 370/342 |
| 6,779,040 | B1 | | 8/2004 | Lee et al. .................... 709/247 |
| 6,809,724 | B1 | | 10/2004 | Shiraishi et al. ............. 345/169 |

(Continued)

FOREIGN PATENT DOCUMENTS

JP 7-264092 10/1995

(Continued)

OTHER PUBLICATIONS

Tanaka Tetsuo (Jap. Pub-10-333901) discloses information processor and software managing method (Dec. 18, 1998).

*Primary Examiner*—Ajit Patel
*Assistant Examiner*—Khai M Nguyen
(74) *Attorney, Agent, or Firm*—Frommer Lawrence & Haug LLP; William S. Frommer; Thomas F. Presson

(57) ABSTRACT

A communication system for providing data corresponding to a request from a user and charging the user for the data provided, when the user designates a result of a desired operation A usage management unit selects a processor, corresponding to the user's designation, which effect operations corresponding to a plurality of different algorithms, respectively. When the processor corresponding to the designation is selected, an algorithm processor makes an operation corresponding to the designation. A management center charges the user for the use of the algorithm.

30 Claims, 27 Drawing Sheets

U.S. PATENT DOCUMENTS

2002/0161988 A1 * 10/2002 Barlow et al. ............... 712/221
2004/0255113 A1 * 12/2004 Ogura ....................... 713/156

FOREIGN PATENT DOCUMENTS

| JP | 08-307846 | * | 11/1996 |
| JP | 9-44578 | | 2/1997 |
| JP | 9-93560 | | 4/1997 |
| JP | 9-154131 | | 6/1997 |
| JP | 09-328189 | * | 9/1997 |
| JP | 10-112856 | | 4/1998 |
| JP | 10-327282 | | 12/1998 |
| JP | 10-333901 | | 12/1998 |
| JP | 11-69141 | | 3/1999 |
| JP | 11 73255 | | 3/1999 |
| JP | 11-112871 | | 4/1999 |
| JP | 11-187407 | | 7/1999 |
| JP | 11-305887 | * | 11/1999 |
| JP | 2000-92004 | | 3/2000 |

* cited by examiner

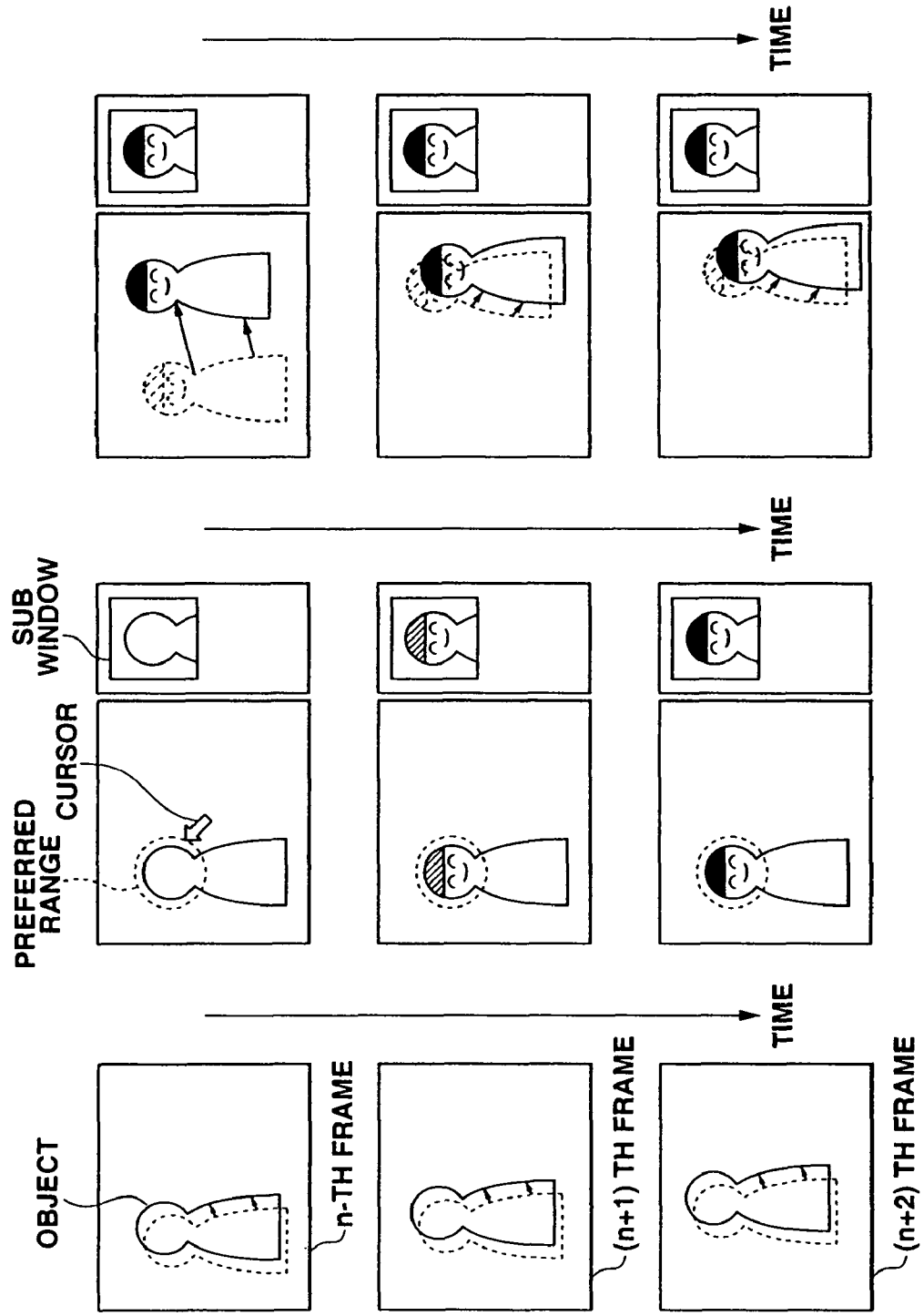

| LOW LEVEL ELEMENT | PREFERENCE TO BE TACKED ⟷ | HIGH LEVEL ELEMENT | EXAMPLE |
|---|---|---|---|
| COLOR ⌐ | | | RED PORTION |
| └ PATTERN ──────── | | | STRIPED PORTION |
| AREA COMPOSITION ── | | | EYE, NOSE AND MOUTH |
| SPEED ⌐ | | | MOVING PORTION |
| POSITION ┤ | | | MIDDLE |
| DEPTH ─ | | | THING AT THIS SIDE |
| └ MOTION ──────── | | | UNIFORM MOTION |
| | └── OBJECT ──────── | | PERSON |
| | | └ SPECIFIC OBJECT | MR. / MRS. OO |

FIG.17

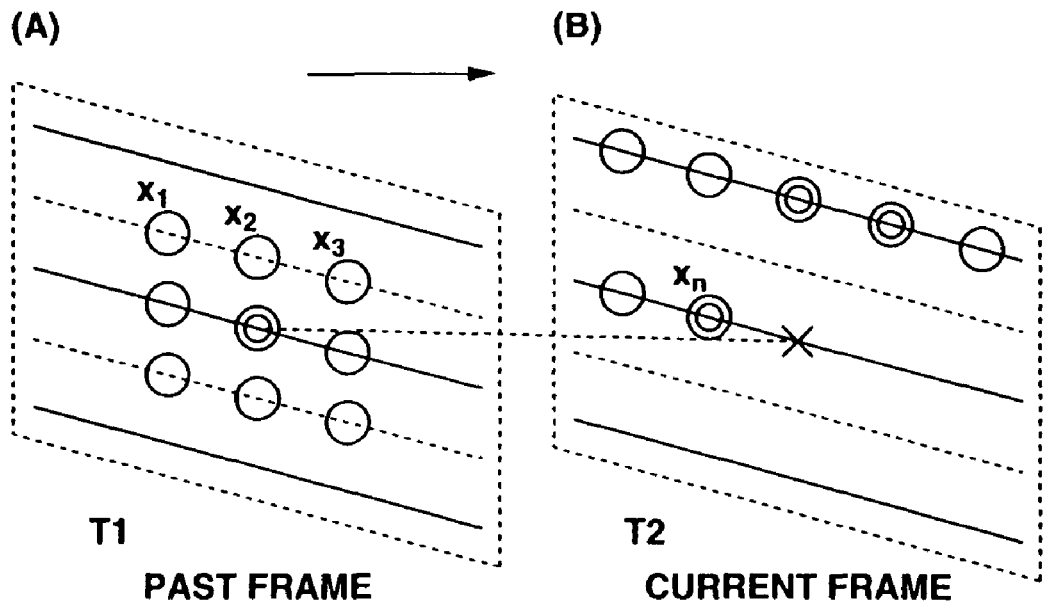
FIG. 28A FIG. 28B
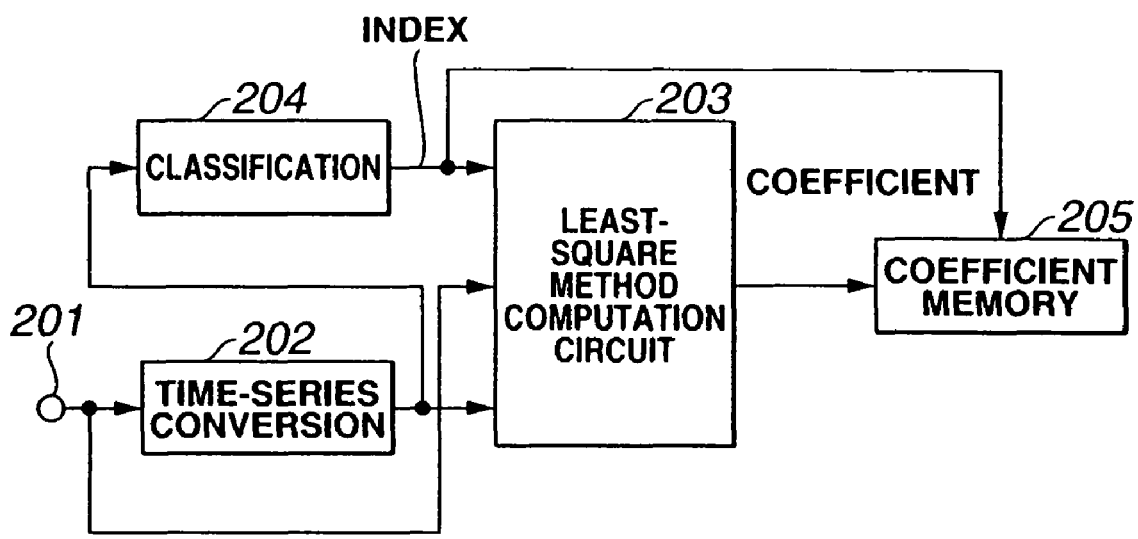
FIG. 29

DATA PROCESSING SYSTEM AND METHOD, COMMUNICATION SYSTEM AND METHOD, AND CHARGING APPARATUS AND METHOD

This application is a Continuation of U.S. application Ser. No. 10/048,759 filed on Jun. 18, 2002, now U.S. Pat. No. 7,313,386 which is a 371 of PCT/JP01/04670 filed on Jun. 1, 2001, which claims the benefit of Japanese Application 2000-166733 filed Jun. 3, 2000. All of which are hereby incorporated by reference in their entirety herein.

TECHNICAL FIELD

The present invention generally relates to a data processing apparatus and method for paying an amount charged for data served to a user, an charging management apparatus and method for charging a user for data served to the user, a communication system and method, a communication apparatus and method included in the communication system, and a medium having stored therein a program which allows an information processing apparatus to charge a user for data served to the user.

BACKGROUND ART

For example, in a data service system including a data server or provider and users to whom data are served from the data server, the user is charged proportionally to an amount of data served to the user or on a flat-rate basis not depending upon the served data amount, for example.

Also, there is disclosed in the U.S. Pat. No. 6,041,316 a network system in which low-quality data are normally served but the user can be served with higher-quality data with having to pay an additional charge for the higher quality.

Also, the Japanese Published Unexamined Application No. 164552 of 1998 discloses a video-on-demand transmitter and terminal which make it possible to serve a video program whose quality meets the user's demand and charge the user on a program-quality basis. In the video-on-demand transmitter and terminal disclosed in this Japanese Published Unexamined Application, there is used a data processing algorithm such as MPEG-1 or MPEG-2 (these are similar to each other) upon which the quality of a served video program depends and thus the charge for a served video program is varied depending upon whether or not the served video program is a one compressed with MPEG-1 or MPEG-2. For example, MPEG-1 is used at the transmitter while MPEG-2 is used at the terminal.

Namely, in the above Japanese Published Unexamined Application, the charge to the user is varied depending upon the function of the application layer in the video-on-demand transmitter and terminal such as the signal processing technique used for data served to the user.

The above transmitter and terminal has a function to record/reproduce a hardware control layer function such as power supply to the internal circuit in them, but there is not disclosed any system with which the user can selectively grade up the functions of the hardware control layer.

With the above technique, however, a signal processing technique designated by the user once will be fixed and the quality of video program and signal processing will not be selectable even if the state of transmission is changed. Namely, any optimum service will not be available to the user.

DISCLOSURE OF THE INVENTION

Accordingly, the present invention has an object to overcome the above-mentioned drawbacks of the prior art by providing a data processing apparatus and method, charging management apparatus and method, communication system and method, communication apparatus and method, and storage medium having stored therein a program executed in the data processing apparatus etc., enabling a data service and charging adaptive to different demands of the user, more particularly, a charging adaptive to a profit of the user as well as to the value of data served by the data server to the user.

The above object can be attained by providing a data processing system including:

a designation input unit capable of designating desired methods for at least an application layer and hardware control layer, respectively;

a signal processor capable of selectively carrying out methods related to the application layer;

a hardware controller capable of selectively carrying out methods related to the hardware control layer; and a controller to control the signal processor or hardware controller based on the designation from the designation input unit to carry out the designated method.

In the above data processing system, the signal processor includes a storage unit to store a plurality of methods, and the controller reads, from the storage unit, one method in response to a designation from the designation input unit and carries out the method.

The above data processing system further includes a transmitter to send data, a receiver to receive transmitted data, and an output unit to output received content data. The signal processor is controlled by the controller to process supplied content data by carrying out a method selected on the basis of the designation supplied from the designation input unit, and output the processed content data to the transmitter.

Also, the above object can be attained by providing a communication system with a charging management apparatus, including:

a processor including:
a designation input unit capable of designating desired methods for at least an application layer and hardware control layer, respectively;
a request signal transmitter to send a signal of request for a method designated by the designation input unit;
a receiver to receive a reply to the request signal;
a signal processor capable of selectively carrying out methods related to the application layer;
a hardware controller capable of selectively carrying out methods related to the hardware control layer; and
a controller to control the signal processor or hardware controller to carry out a method designated by the designation input unit;
a charging management apparatus including:
a request signal receiver to receive the request signal;
a judgment unit to judge, based on the received request signal, whether the method is available not;
a judgment result transmitter to send the judgment result from the judgment unit to the receiver;
a usage-charge storage unit to store charge information on the use of each of a plurality of methods stored in the signal processor or hardware controller; and
a computing unit for computing, based on information stored in the usage-charge storage unit, information indicative of an amount charged to the user having made designation to the designation input unit, and outputting the charged amount information.

Also, the above object can be attained by providing a charging management apparatus including:

a request signal receiver to receive, from an external apparatus, a signal of request for permission to use desired methods related to an application layer and hardware control layer, respectively, of the external apparatus;

a judgment unit to judge, based on the permission request signal received by the request signal receiver, whether the method is available not;

a judgment result transmitter to send the judgment result from the judgment unit to the receiver;

a usage-charge storage unit to store charge information on the use of each of a plurality of methods; and a computing unit for computing, based on information stored in the usage-charge storage unit, information indicative of an amount charged to the user having made designation to the designation input unit, and outputting the charged amount information.

In the above charging management apparatus, the charged amount information computing unit computes, based on information stored in the usage-charge storage unit, charged amount information by summing a charge for use of an automatic selection method for automatically selecting one of a plurality of methods and a charge for the use of a method corresponding to a compression algorithm selected by the automatic selection method.

Also, the above object can be attained by providing a communication system including first and second communication apparatuses and a charging apparatus, the first communication apparatus including:
a designation input unit capable of designating desired methods for at least an application layer and hardware control layer, respectively, of a transmitter;
a request signal transmitter to send a signal of request for a method designated by the designation input unit;
a receiver to receive content data processed by the method made available by the request signal transmitter;
a hardware controller capable of selectively carrying out methods related to the hardware control layer; and
a first controller to control the hardware controller to carry out a method designated by the designation input unit;

the second communication apparatus including:
a signal processor for selectively carrying out methods related to the application layer to process input content data;
a second controller for controlling the method designated by the designation input unit to be carried out based on the request signal sent from the request signal transmitter; and
a transmitter to send the processed content data to outside; and the charging management apparatus including:
a usage-charge storage unit to store charge information on the use of each of a plurality of methods stored in the signal processor or hardware controller; and
a computing unit for computing, based on information stored in the usage-charge storage unit, information indicative of an amount charged to the user having made designation to the designation input unit, and outputting the charged amount information.

In the above communication system, the communication apparatus is to make communications of content data, and includes a receiver to receive an external signal of request for carrying out a method related to the application layer, a signal processor for selectively carrying out methods related to the application layer to process input content data, a controller to control the signal processor to carry out a designated method, and a transmitter to send the processed content data to outside.

Also, the above object can be attained by providing a communication method for communication of content data and a program for controlling a communication system in which the communication method is carried out, by which desired methods are designated for at least the application layer of the transmitter and the hardware control layer of the receiver, respectively, a signal of request for the designated method is sent, the signal processor processes content data supplied to the transmitter by carrying out the method according to the sent request signal, and the processed content data are sent from the transmitter to the receiver. The receiver receives the sent content data, the method carried out by the hardware controller controls power supply to the internal circuit of the receiver, information indicative of an amount charged to the user having designated the method is computed based on information stored in the usage-charge storage unit having stored therein information on a charge for the use of each of a plurality of methods stored in the signal processor or hardware controller, and the charged amount information is outputted.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 14A, 14B and 14C show examples of displays of an image on the image output unit of the receiver in FIG. 4.

FIG. 17 explains an example of a feature reflecting a tendency of user's interest.

FIGS. 28A and 28B explain description of an image with a time-space model.

FIG. 29 is a block diagram of an example of the data communication system intended for a learning to make to determine a coefficient of the predictive coding circuit for classification-adaptive predictive coding.

BEST MODE FOR CARRYING OUT THE INVENTION

In the PCT Published Unexamined Application No. WO01/11889A1 of the Applicant of the present invention, there is disclosed an image processor which effects the spatial resolution control disclosed in the Japanese Published Unexamined Application No. 112856 of 1998 as well as the time resolution control in order to control the amount of information in an area designated by clicking a mouse or the like at the data receiving side.

Further, the above PCT Published Unexamined Application No. WO01/11889A1 discloses an algorithm by which an object the user is interested in is extracted from a position clicked with the mouse by the user at the data receiving side and time interval between clicks. Moreover, it discloses a technique by which a user's preference is learned from a feature of the object the user has been interested in and an object the user is interested in is automatically predicted, to thereby improve the image quality of the object.

The preferred modes of carrying out the present invention will be described herebelow with reference to the accompanying drawings.

Figure 1:
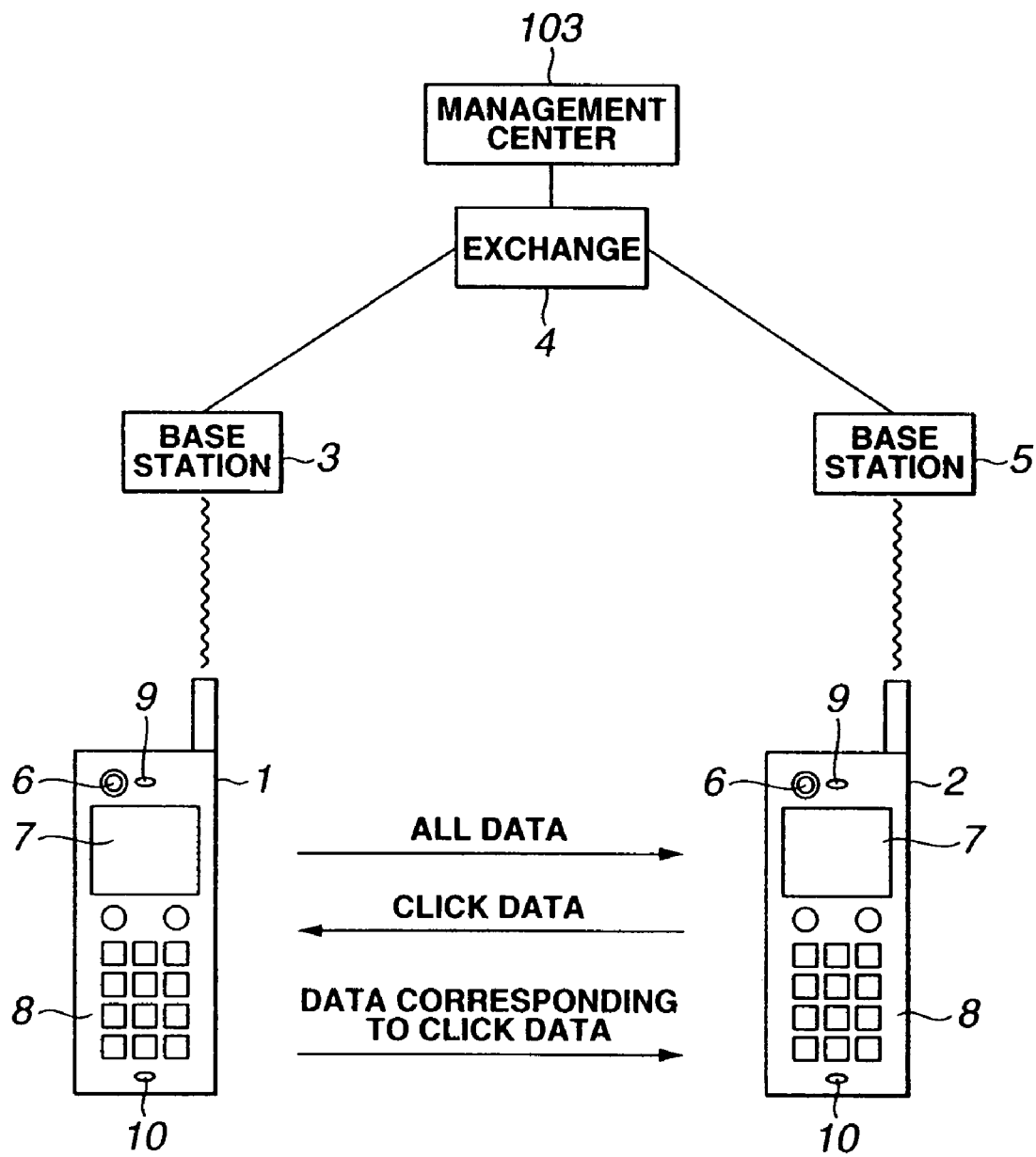
FIG. 1 is a block diagram of the communication system according to the present invention.

The data communication system according to the present invention is configured as shown in FIG. 1. The term "system" used herein refers to a logical assembly of a plurality of apparatuses whether the apparatuses of different constructions are in the same enclosure or not.

As shown in FIG. 1, the data communication system includes at least two terminals 1 and 2 each being for example a mobile telephone, PHS (personal handy-phone system: registered trademark) or the like, a radio base station 3 or 5 which makes radio communications with the terminal 1 or 2, and an exchange 4 such as a telephone station which provides a connection between the base stations 3 and 5. Note that the radio base stations 3 and 5 are identical to each other or different from each other. With the above system configuration, the terminals 1 and 2 can send signals from one to the other of them and receive signals from their counterpart, via a transmission line formed from the radio base stations 3 and 5, exchange 4, etc.

There will be described in detail later the operations made for charging at each time of data service and data reception, such as operations made for charging for data service to the terminals 1 and 2 via the management center 103 in FIG. 1 and for data transmission and reception between the terminals 1 and 2 in the data communication system according to the present invention and the configuration of the system.

In the data communication system shown in FIG. 1, each of the terminals 1 and 2 being a mobile telephone, PHS or the like includes at least a key pad 8 for input of a phone number, characters, symbols, etc., a microphone 10 for input of a sound, a speaker 9 for output of a sound, a video camera 6 having an imaging device and optical system, capable of picking up a still image and moving image, respectively, and a display unit 7 capable of displaying characters and symbols as well as an image.

Between the terminals 1 and 2, there can be transferred sound signals as well as image data captured by the video camera 6. Therefore, each of the terminals 1 and 2 can display an image picked up by its counterpart on the display unit 7.

There will be described here by way of example a data communication in which for example the terminal 1 sends image data while the terminal 2 receives the image data from the terminal 1. In the following description, the terminal 1 or 2 will be referred to as "transmitter 1" or "receiver 2", respectively, wherever appropriate.

In this case, image data are sent along with information on its frame rate from the transmitter 1 to the receiver 2 via a transmission line including the base stations 3 and 5, exchange 4, etc. Receiving the image data sent from the transmitter 1, the receiver 2 will display, on the display unit 7 such as a liquid crystal display (LCD) or the like, a moving image reproduced from the image data according the received frame rate information. On the other hand, the receiver 2 will send, to the transmitter 1 via the transmission line, control information used to control the spatial resolution and time resolution of the image displayed on the display unit 7. That is, the receiver 2 will send, to the transmitter 1, control information ("click data" as designation data which will further be described later) used at the transmitter 1 to localize an area the user of the receiver 2 is interested in.

Receiving the control information (click data) from the receiver 2, the transmitter 1 will localize, based on the click data, the image area (interesting area) the user of the receiver 2 is interested in from an image to be displayed at the receiver 2, such as an image picked up by the video camera 6 of the transmitter 1. Further, the transmitter 1 will control the amount of information in image data to be sent to the receiver 2 in such a manner that the spatial resolution and time resolution of the localized image area will be changed while satisfying given conditions. Note that in case each of the transmitter 1 and receiver 2 is a PHS terminal for example, the frequency range of the transmission line will be 1895.1500 to 1905.9500 MHz and the transmission rate will be 128 kbps (bit per second).

Figure 2:
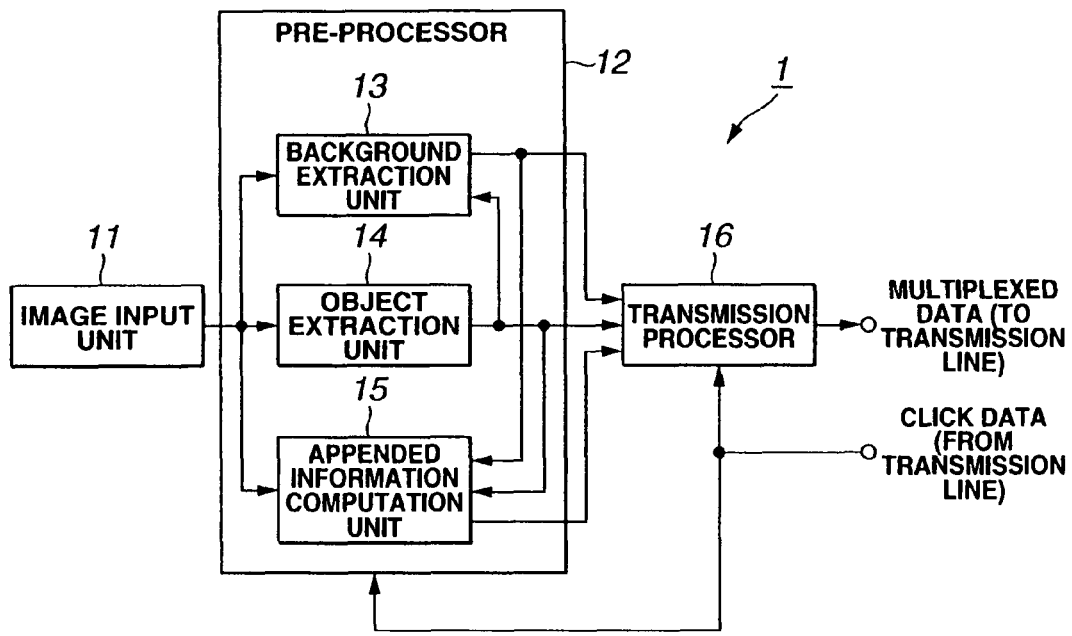
FIG. 2 is a block diagram of the transmitter included in the communication system in FIG. 1.

Referring now to FIG. 2, there is illustrated in the form of a block diagram the transmitter 1 included in the data communication system shown in FIG. 1. As shown, the transmitter 1 further includes an image input unit 11 consisting of the video camera 6 having for example the imaging device (CCD: charge-coupled device) and optical system, an image signal processing circuit to generate image data from the image signal picked up by the video camera 6, etc. That is, the user of the transmitter 1 images a desired object by the video camera 6, the image signal processing circuit generates image data from the image supplied from the video camera 6, and the image input unit 11 sends the image data to a pre-processor 12.

The pre-processor 12 includes mainly a background extraction unit 13, object extraction unit 14 and an appended information computation circuit 15. Further detailed description of the pre-processor 12 will be given later.

Based on the click data sent from the receiver 2, the object extraction unit 14 of the pre-processor 12 extracts, from the image captured by the video camera 6 of the image input unit 11, an area the user of the receiver 2 is interested in, that is, an interesting area, and supplies a transmission processor 16 with image data corresponding to the extracted interesting area. Note that in case the image picked up by the video camera 6 of the image input unit 11 includes a plurality of areas the user of the receiver 2 is interested in, the object extraction unit 14 will supply image data corresponding to the plurality of interesting areas to the transmission processor 16. Also, the image data corresponding to the interesting area extracted by the object extraction unit 14 is also supplied to the appended information computation unit 15.

The area the user is interested in is for example an object such as a substance found in an image. Note that the "object" referred to herein is one of pieces of an image divided by a unit and which can be processed per unit and for processing each of special substances in an image, the substance is defined as "object". According to the present invention, object data are extracted from an image on the basis of click data and processed per object. Note that object is prepared in different manners depending upon the content of a required image.

In the object extraction unit 14, an object as an example of interesting area (will be referred to as "appropriate object" hereunder) is extracted as will be described below. Note that the interesting area has not to always be an object but may be an image area other than an object, image area in an object or background image part which will be described later or the like. The present invention will be described concerning an object as an interesting area.

In the embodiment of the present invention, small-object image data corresponding to click data derived from clicking of an image by the user are extracted and the small-object image data are connected or not to each other to extract object image data and then extract an object image from the object image data.

Also, when the interest of the user of the receiver 2 is directed to another area, the object extraction unit 14 will detect the change of interest to extract an object image being a new interesting area based on the result of detection of the change in interest of the user. The object extraction effected in the object extraction unit 14, that is, the localization of an interesting area and detection of an area to which the user's interest has shifted will further be described later.

Next, the background extraction unit 13 of the pre-processor 12 extracts, based on the object extraction result supplied from the object extraction unit 14, signals (will be referred to as "background image data" hereunder) equivalent to a background portion (image area other than the interesting area; will be referred to as "background image" hereunder) of an image from the image data supplied from the image input unit 11, and supplies the extracted background image data to the transmission processor 16 and appended information computation unit 15. The background image is a flat image area whose activity is low and having no special meaning as an image. Of course, the background image includes an image having no special meaning as well as an object the user is interested in, but for the simplicity of the explanation, the above flat image area will be taken as a background image in the following description of the present invention.

The appended information computation unit 15 detects, based on the background image data supplied from the background extraction unit 13, a movement of the background caused by the change in imaging direction of the image input unit 11 during imaging, for example a background movement vector indicative of a panning and tilting. The appended information computation unit 15 detects, based on the image data of an object (will be referred to as "object image data" hereunder) supplied from the object extraction unit 14, an object movement vector indicative of a movement of the object. The appended information computation unit 15 supplies the transmission processor 16 with the movement vectors as appended information. Also, based on the object image data supplied from the object extraction unit 14, the appended information computation unit 15 supplies the transmission processor 16 with an image picked up by the video camera 6 of the image input unit 11, that is, information on the object such as a position, profile indicating a shape, etc. of the object in a frame image, as appended information. Namely, the object extraction unit 14 extracts also information on the object such as position, shape, etc. of the object during extraction of an object image, and supplies them to the appended information computation unit 15. The appended information computation unit 15 will output the information on the object as appended information.

Based on the click data supplied from the receiver 2, the transmission processor 16 encodes the object image data from the object extraction unit 14, background image data from the background extraction unit 13 and appended information from the appended information computation unit 15 so as to meet the requirement for a data rate at which data can be transmitted on the transmission line while raising the spatial and time resolutions of the object image in aan image to be displayed on the display unit 2. Further, the transmission processor 16 multiplexes the encoded object image data (will be referred to as "object encoded data" hereunder), background image data (will be referred to as "background encoded data" hereunder) and appended information (will be referred to as "appended information encoded data" hereunder), and sends the multiplexed data along with frame rate information to the receiver 2 via the transmission line.

Next, the operations of the transmitter 1 shown in FIG. 2 will be described with reference to the flow chart shown in FIG. 3.

Figure 3:
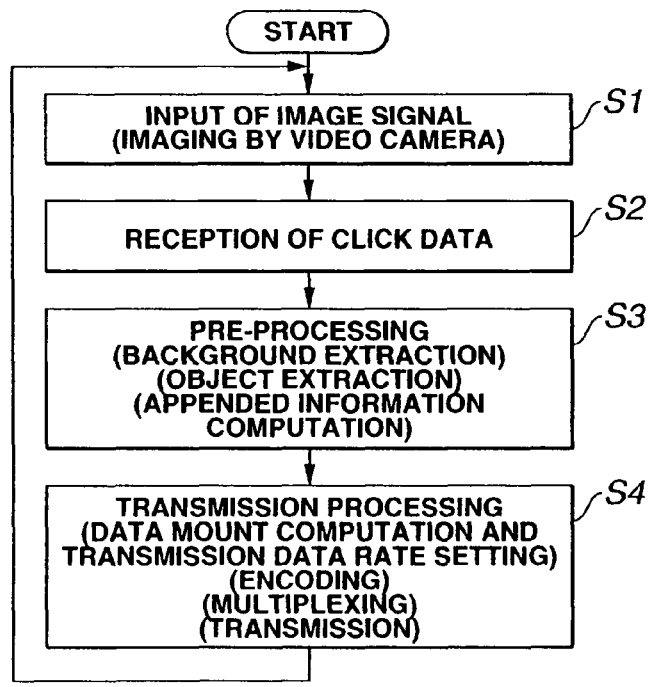
FIG. 3 shows a flow of operations made in the transmitter in FIG. 2.

First in step S1 in FIG. 3, the video camera 6 of the image input unit 11 at the transmitter 1 captures an image, and sends the image data to the pre-processor 12.

Next in step S2, the transmitter 1 receives the click data sent from the transmitter 2, and supplies the click data to the pre-processor 12.

In step S3, the pre-processor 12 having received the image data and click data pre-processes the data for background extraction, object extraction and appended information computation, and sends background image data, object image data and appended information thus obtained to the transmission processor 16. The object extraction includes detection of interesting-object change as well.

In step S4, the transmission processor 16 computes amounts of the object image data, background image data and appended information so as to meet the requirement for a data rate at which data can be transmitted via the transmission line, and multiplexes the object image data, background image data and appended information according to their data amount by encoding them as will further be described later. Thereafter, the transmission processor 16 will send the multiplexed data along with frame rate information to the receiver 2 via the transmission line.

Subsequently, the procedure returns to step S1 and similar operations are repeated.

Figure 4:
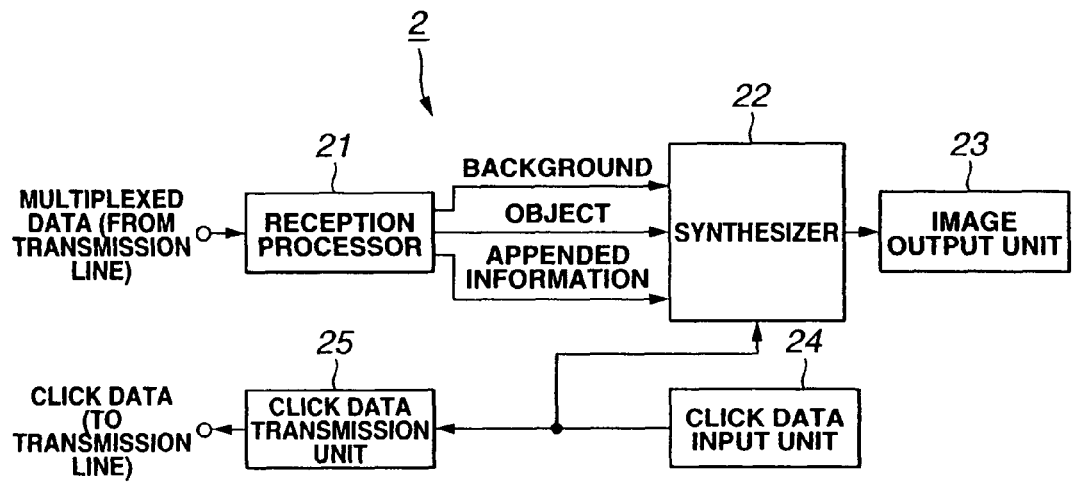
FIG. 4 is a block diagram of the receiver included in the communication system in FIG. 1.

FIG. 4 shows the construction of the receiver 2 included in the data communication system shown in FIG. 1.

The multiplexed data sent from the transmitter 1 via the transmission line are received by a reception processor 21 in the receiver 2 shown in FIG. 4. The reception processor 21 will demultiplex, from the received multiplexed data, the background encoded data, object encoded data and appended information encoded data and decode them, and send the decoded background image data, object image data and appended information to a synthesizer 22.

The synthesizer 22 will synthesize an image from the decoded background image date, object image data and appended information supplied from the reception processor 21, and supply the synthesized image signals to an image output unit 23. Also, the synthesizer 22 controls the spatial and time resolutions of the synthesized image based on the click data supplied from a click data input unit 24.

Based on the supplied image data, the image output unit 23 will generate a drive signal for driving the liquid crystal display or the like in the display unit 7 and send the drive signal to the liquid crystal display or the like at a frame rate which is based on the frame rate information received along with the aforementioned multiplexed data. Thus, the image synthesized by the synthesizer 22 is displayed on the display unit 7.

When the user operates the key pad 8 having the function as a pointing device to designate a coordinate position of an image on the display unit 7, the click data input unit 24 generates click data indicating a clicked position corresponding to the operation of the key pad 8 by the user, that is, a coordinate position, and a clicked time. Namely, when the user clicks the key pad 8 to designate an interesting area being a desired image portion in an image displayed on the display unit 7, the click data input unit 24 generates click data indicating coordinate information on the clicked position and a clicked time. The click data generated by the click data input unit 24 are sent to the synthesizer 22 and click data transmission unit 25.

Receiving the click data from the click data input unit 24, the click data transmission unit 25 sends it to the transmitter 1 via the transmission line.

Figure 5:
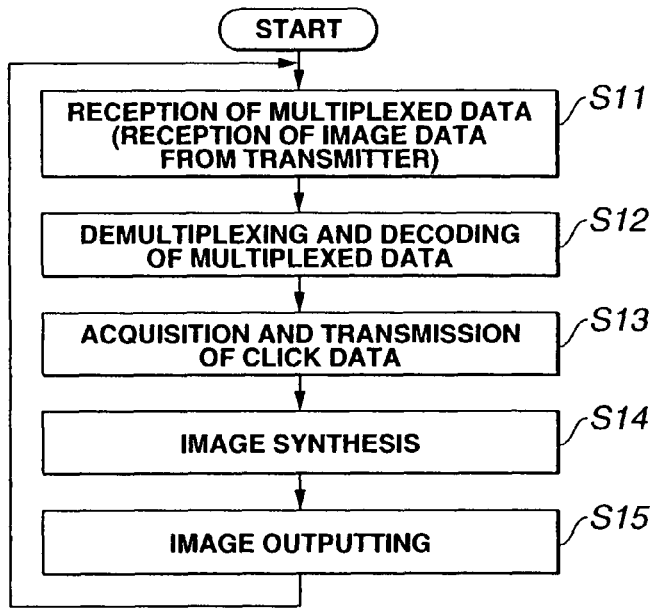
FIG. 5 shows a flow of operations made in the receiver in FIG. 4.

Next, the operations of the receiver 2 shown in FIG. 4 will be outlined with reference to the flow chart shown in FIG. 5.

First in step S11 in FIG. 5, the reception processor 21 in the receiver 2 receives the multiplexed data from the transmitter 1 via the transmission line.

Next in step S12, the reception processor 21 demultiplexes, from the multiplexed data, the background encoded data, object encoded data and appended information encoded data, and then decodes the thus demultiplexed encoded data. The decoded background image data, object image data and appended information are sent to the synthesizer 22.

In step S13, the click data input unit 24 of the receiver 2 acquires the click data by clicking the key pad 8 by the user, sends it to the synthesizer 22 and also to the click data transmission unit 25, and the click data are sent from the click data transmission unit 25 to the transmitter 1.

Next in step S14, the synthesizer 22 synthesizes an image from the background image data, object image data and appended information supplied from the reception processor 21 and the click data supplied from the click data input unit 24, and controls the spatial and time resolutions of the synthesized image.

Thereafter in step S15, the image output unit 23 has the liquid crystal display or the like in the display unit 7 display the image synthesized by the synthesizer 22 thereon on the basis of the frame rate information received along with the multiplexed data.

Thereafter, the procedure returns to step S11, and similar operations are repeated.

Next, the construction of the transmission processor 16 included in the transmitter 1 shown in FIG. 2 will be described in detail with reference to FIG. 6.

Figure 6:
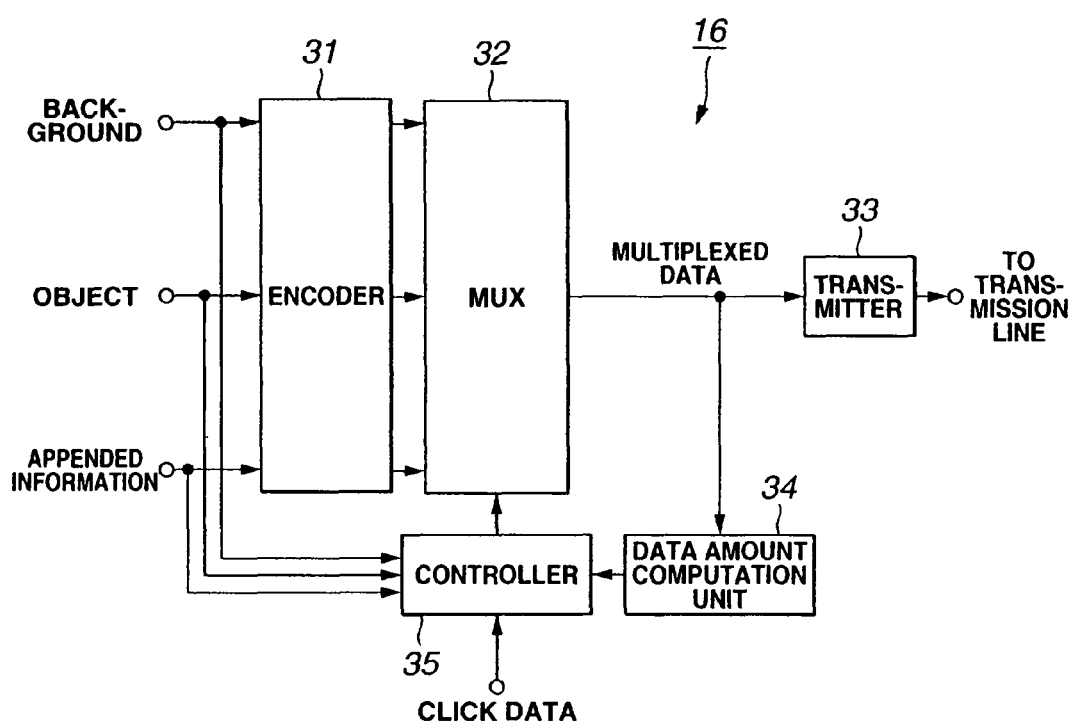
FIG. 6 is a block diagram of the transmission processor included in the transmitter in FIG. 2.

As shown in FIG. 6, the transmission processor 16 is supplied with the background image data, object image data and appended information from the pre-processor 12 in FIG. 2. The background image data, object image data and appended information are supplied to an encoder 31 and controller 35.

The encoder 31 hierarchically encodes the supplied background image data, object image data and appended information as will further be described later, and supplies each data thus encoded to a multiplexer (MUX) 32.

Under the control of the controller 35, the MUX 32 selects the background encoded data, object encoded data and appended information encoded data supplied from the encoder 31 and supplies them as multiplexed data to a transmission unit 33.

The transmission unit 33 modulates the multiplexed data supplied from the MUX 32 according to the aforementioned frame rate information and the transmission standard for a downstream transmission line, and sends the modulated multiplexed data to the receiver 2 via the downstream transmission line.

Also, the data amount computation unit 34 monitors the multiplexed data outputted from the MUX 32 to the transmission unit 33, compute a data rate for the multiplexed data and supplies the computed data rate to the controller 35.

The controller 35 controls the output of multiplexed data from the MUX 32 so that the data rate computed by the data amount computation unit 34 will not exceed the transmission rate of the transmission line while receiving the click data received from the receiver 2 via the transmission line to control the multiplexing of the encoded data in the MUX 32.

Figure 7:
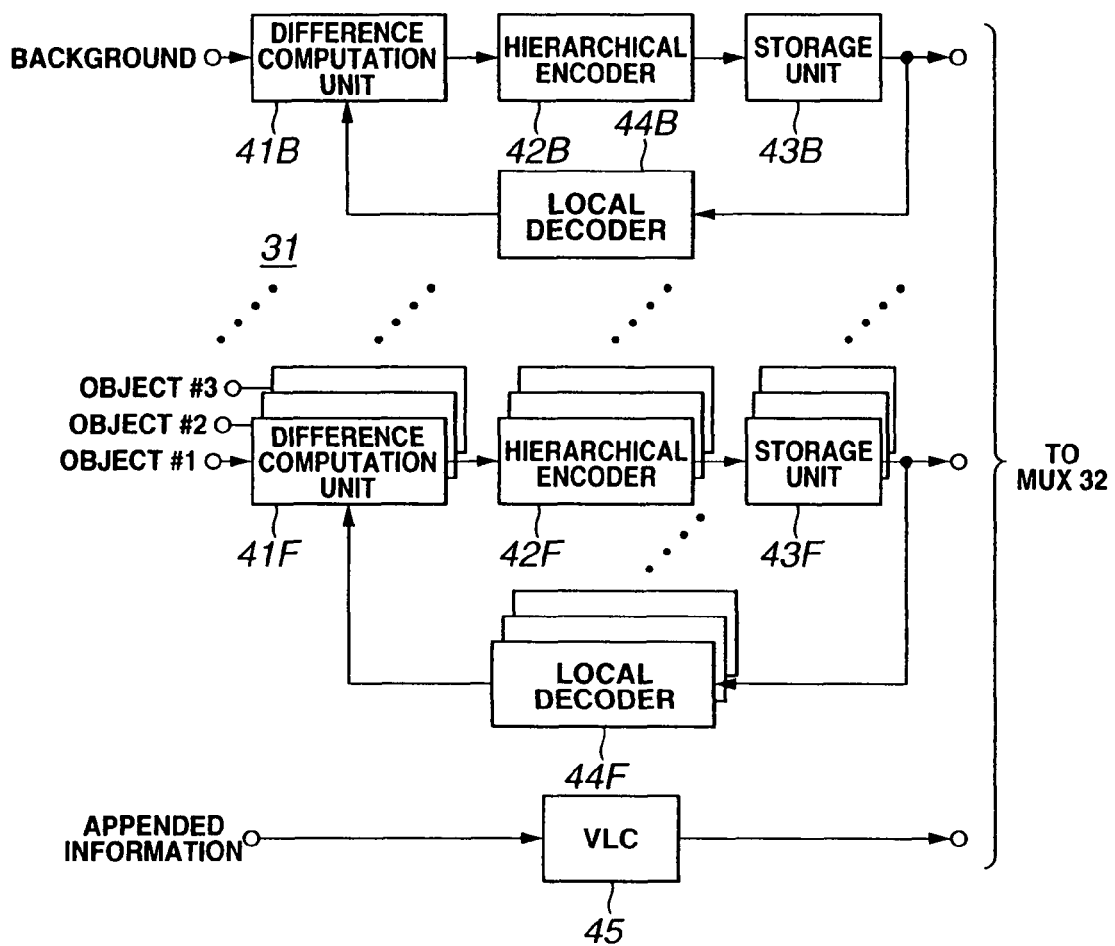
FIG. 7 is a block diagram of the encoder of the transmission processor in FIG. 6.

The encoder 31 shown in FIG. 6 is constructed as shown in detail in FIG. 7.

In the encoder 31 in FIG. 7, the background image data are supplied to a difference computation unit 41B. The difference computation unit 41B subtracts one frame-precedent, already processed background image data from background image data contained in an image frame (will be referred to as "current frame" hereunder wherever appropriate) supplied from a local decoder 44B and going to be processed at present, and supplies difference data of the background image (will be referred to as "background image difference data" hereunder) as the subtraction result to a hierarchical encoder 42B.

The hierarchical encoder 42B hierarchically encodes the background image difference data from the difference computation unit 41B, and supplies data obtained by the encoding, that is, background encoded data, to a storage unit 43B.

The storage unit 43B provisionally stores the background encoded data supplied from the hierarchical encoder 42B. The background encoded data stored in the storage unit 43B are sent to the MUX 32 in FIG. 6.

Further, the background encoded data stored in the storage unit 43B are supplied to the local decoder 44B. The local decoder 44B locally decodes the background encoded data to decode their initial background image data, and supplies the decoded background image data to the difference computation unit 41B. The background image data thus decoded by the local decoder 44B are used in the difference computation unit 41B to acquire data on a difference from background image data in a next frame.

In the encoder 31 in FIG. 7, the object image data are supplied to a difference computation unit 41F. The difference computation unit 41F subtracts one frame-preceding, already processed background image data from object image data contained in an image frame (current frame) supplied from a local decoder 44F and going to be processed at present, and supplies difference data of the object (will be referred to as "object image difference data" hereunder) as the subtraction result to a hierarchical encoder 42F.

The hierarchical encoder 42F hierarchically encodes the background image difference data from the difference computation unit 41F, and supplies data obtained by the encoding (object encoded data) to a storage unit 43F.

The storage unit 43F provisionally stores the object encoded data supplied from the hierarchical encoder 42F. The object encoded data stored in the storage unit 43F are sent to the MUX 32 in FIG. 6.

Further, the object encoded data stored in the storage unit 43F are supplied to the local decoder 44F. The local decoder 44F locally decodes the object encoded data to decode their initial object image data, and supplies the decoded object image data to the difference computation unit 41F. The object image data thus decoded by the local decoder 44F are used in the difference computation unit 41F to acquire data on a difference from object image data in a next frame.

Note that in case there exists a plurality of objects (#1, #2, #3, . . . ), image data corresponding to the plurality of objects are subject to difference computation, hierarchical encoding, storage and local decoding by the difference computation unit 41F, hierarchical encoder 42F, storage unit 43F and local decoder 44F, respectively.

Also, in the encoder 31 shown in FIG. 7, the appended information is supplied to a VLC (variable-length encoder) 45. The VLC 45 makes variable-length encoding of the appended information. The variable-length encoding method may be a one which can compress the data by reducing the redundance. Namely, the variable-length encoding may be the run-length encoding, Huffman encoding or the like. The variable-length encoded appended information is sent as the aforementioned appended information encoded data to the MUX 32 in FIG. 6.

Next, the hierarchical encoding effected in the encoder 31 in FIG. 7 and the decoding effected at the receiving side correspondingly to the hierarchical encoding will be described with reference to FIG. 8.

The encoder 31 in FIG. 7 makes, for each of 3 layers, for example, such a hierarchical encoding as to take a mean value (mean pixel value) of 4 pixels consisting of 2 horizontal pixels and 2 vertical pixels in a low layer for example as a value of one pixel in a layer one level higher than the low layer. Note that the term "pixel value" used herein refers to a difference obtained by the difference computation effected as a preliminary operation for the hierarchical encoding, namely, a difference of each pixel. Of course, in case no difference computation is done before the hierarchical encoding, the pixel value is not such a specified one.

Figure 8C:
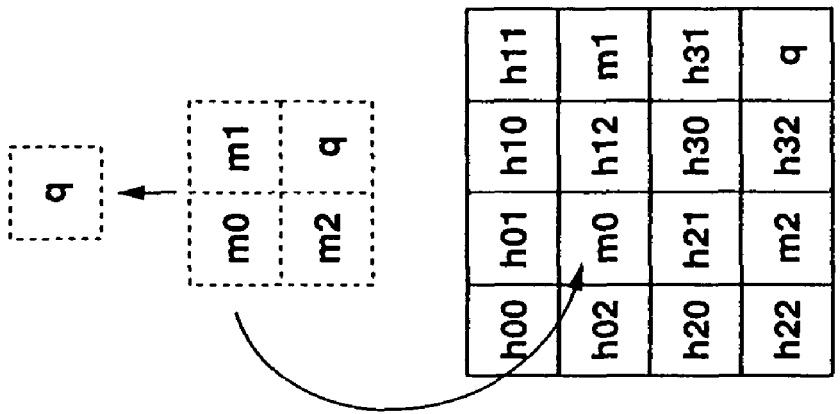
FIGS. 8A, 8B and 8C explain the hierarchical encoding/decoding.
Figure 8B:
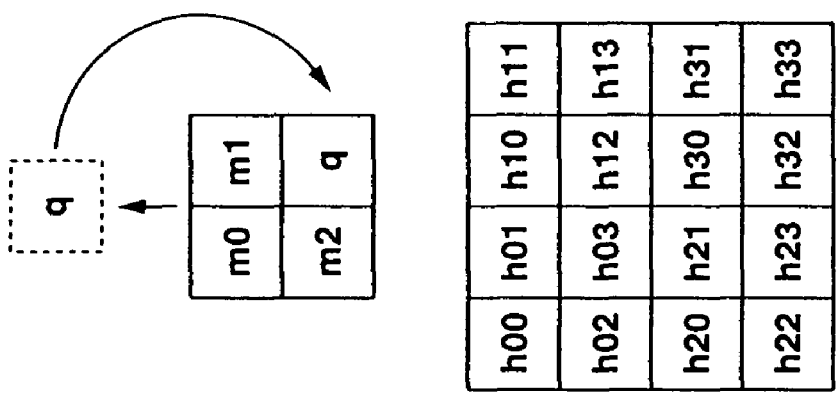
Figure 8A:
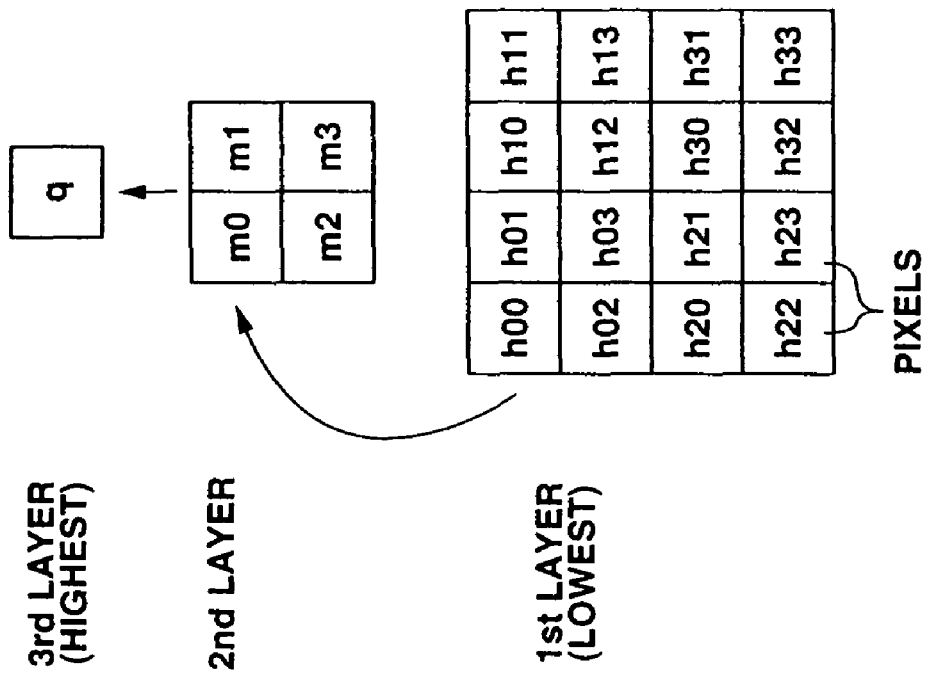

The above will further be described below on the assumption that an image in the lowest layer (first layer) consists of 4 horizontal pixels and 4 vertical pixels (will be referred to as "4×4 pixels" hereunder) for example as shown in FIG. 8A. In this case, the hierarchical encoding will be such that there is calculated a mean value of four pixels h00, h01, h02 and h03 including the two horizontal pixels and two vertical pixels (will be referred to as "2×2 pixels" hereunder) at the upper left of the 4×4 pixels and the mean value is taken as the value of a pixel m0 at the upper left in the second layer. Similarly, a mean value of 2×2 pixels h10, h11, h12 and h13 at the upper right of the 4×4 pixels in the first layer is taken as the value of a pixel m1 at the upper right of the second layer; mean value of 2×2 pixels h20, h21, h22 and h23 at the upper left of the 4×4 pixels in the first layer is taken as the value of a pixel m2 at the lower left of the second layer; and mean value of 2×2 pixels h30, h31, h32 and h33 at the lower right of the 4×4 pixels in the first layer is taken as the value of a pixel m3 at the lower right of the second layer. Further in the hierarchical encoding, a mean value of four pixels m0, m1, m2 and m3 included in the 2×2 pixels in the second layer is determined and taken as the value of a pixel q in the third layer (highest layer).

In the encoder 31 in FIG. 7, the hierarchical encoding is effected as having been described just above. Note that with such a hierarchical encoding, the spatial resolution of an image in the highest layer (third layer) is lowest, that of images in the lower layers will be higher and that of an image in the lowest layer (first layer) will be highest.

In case all the above pixels h00 to h03, h10 to h13, h20 to h23, h30 to h33, m0 to m3 and q are to be sent, the data amount will be larger by the pixels m0 to m3 in the second layer and pixel q in the third layer than when only the pixels in the lowest layer are sent.

To decrease the data amount for sending, the pixel q in the third layer is embedded in place of for example the pixel m3, at the upper right, of the pixels m0 to m3 in the second layer as shown in FIG. 8B and the data of the second layer thus consisting of the pixels m0, m1, m2 and q and data of the first layer are sent. Thus, the data amount can be smaller by the data amount of the third layer.

For sending the data in an amount decreased more than in the measure shown in FIG. 8B, the pixel m0 in the second layer is replaced by for example the pixel h03, at the lower right, of the 2×2 pixels h00 to h03 in the first layer, used to determine the pixel m0, similarly the pixel m1 in the second layer is replaced by for example the pixel h13, at the lower right, of the 2×2 pixels h10 to h13 in the first layer, used to determine the pixel m1, also the m2 in the second layer is replaced by for example the pixel h23, at the lower right, of the 2×2 pixels h20 to h23 in the first layer, used to determine the pixel m2, as shown in FIG. 8C, and further the q in the third layer, buried in an pixel at the lower right of the pixels m0 to m3 in the second layer in FIG. 8B is replaced by for example the pixel h33, at the lower right, of the 2×2 pixels h30 to h33 in the first layer. The data amount in the third and second layers can thus be reduced. That is, in the example shown in FIG. 8C, 16 pixels (4×4 pixels) are thus transmitted, which number of pixels is the same as that of the pixels in the lowest (first) layer as shown in FIG. 8A. Therefore, it is possible in this case to send data equivalent to pixels in each of the first to third layers in an amount not increased.

Note that the pixel m3 in the second layer, replaced with the pixel q as in FIG. 8B, and the pixels h03, h13, h23 and h33 in the first layer, replaced with the pixels m0, m1, m2 and q, as in FIG. 8C, can be decoded as will be described below.

Namely, since the value of the pixel q is a mean value of the pixels m0 to m3, it can be given by an equation of q=(m0+m1+m2+m3)/4. Thus, an equation of m3 =4×q−(m0+m1+m2) can be used to determine (decode) the value of the pixel m3 in the second layer from the pixel q in the third layer and pixels m0 to m2 in the second layer.

Also, since the value of the pixel m0 is a mean value of the pixels h00 to h03, it can be given by an equation of m0=(h00+h01+h02+h03)/4. Thus, an equation of h03=4×m0−(h00+h01+h02) can be used to determine the value of the pixel h03 in the first layer from the pixel m0 in the second layer and pixels h00 to h02 in the first layer. Similarly, the value of each of the pixels h13, h23 and h33 can be determined.

As in the above, pixels included in a layer and not sent can be decoded from sent pixels included in the layer and sent pixels included in a one-level higher layer.

Figure 9:
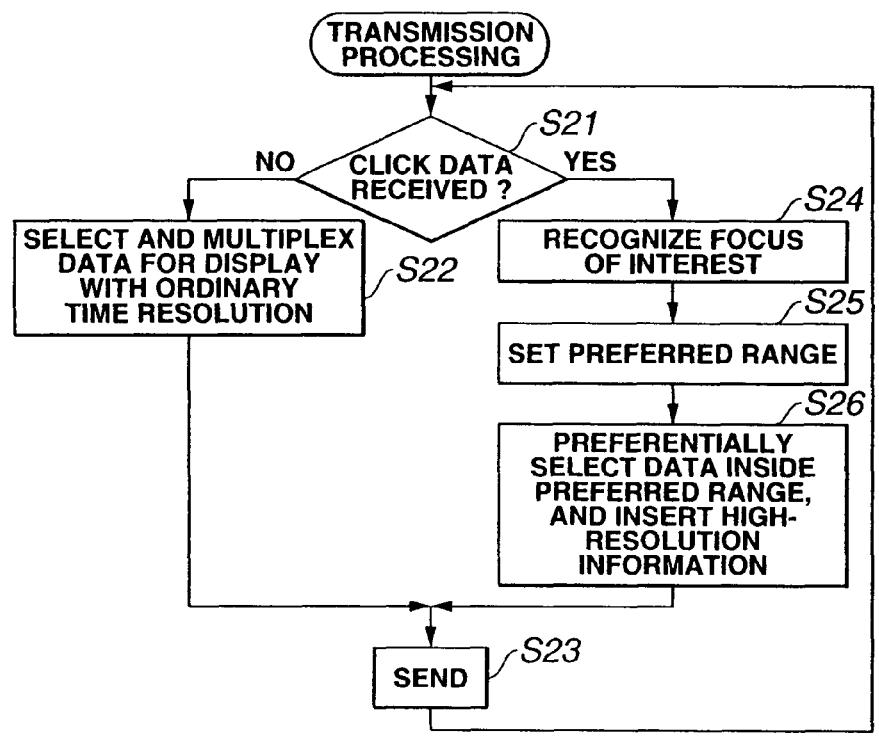
FIG. 9 shows a flow of operations made in the transmission processor in FIG. 6.

Next, the transmission processing effected in the transmission processor 16 in FIG. 6 will be described with reference to the flow chart in FIG. 9.

First in step S21, the controller 35 in the transmission processor 16 judges whether click data has been sent from the receiver 2. If it judges that no click data has been transmitted from the receiver 2, namely, if the controller 35 has not received any click data, the controller 35 will control, in step S22, the MUX 32 to select and multiplex background encoded data, object encoded data and appended information encoded data so that the receiver 2 can display an image with an ordinary time resolution such as a default time resolution.

That is, when for example 30 frames/sec is set as the ordinary time resolution, the receiver 2 will display an image at a rate of 30 frames/sec. In this case, when multiplexed data has been sent at the transmission rate of the transmission line while maintaining the time resolution of 30 frames/sec, the MUX 32 will select and multiplex the encoded data of background, object and appended information so that the spatial resolution of an image displayed at the receiver 2 will be highest.

More particularly, in case the hierarchical encoding has been effected with the three layers for example as in the above, if only the data in the third layer can be sent at the transmission rate of the transmission line for display of an image at the rate of 30 frames/sec, the MUX 32 will select the encoded data of background, object and appended data for display of the image data in the third layer. In this case, the receiver 2 ill display an image at the time resolution is 30 frames/sec and at horizontal and vertical spatial resolutions being a quarter of those of the first layer image data as their initial data.

Next in step S23, the transmission processor 16 will send, from the transmission unit 33, the multiplexed data from the MUX 32 along with the aforementioned set frame rate information via the transmission line, and then the procedure returns to step S21.

If the controller 35 judges in step S21 that click data has been sent from the receiver 2, namely, if it has received the click data, it will recognize, in step S24, based on the click data, a clicked position being a coordinate of a focus of interest designated by the user by operating the clock data input unit 24 of the receiver 2, and a clicked time.

Then in step S25, the controller 35 will localize, based on the coordinate of the focus of interest, and clicked time, an area the user of the receiver 2 is interested in and set the thus localized interesting area as a preferred range in which the spatial resolution of an image displayed at the receiver 2 is preferentially improved, to thereby detect an image in the preferred range and corresponding appended information. Note that in the present invention, the image inside the preferred range corresponds to an object image while an image outside the preferred range corresponds to an image outside the interesting area such as a background image.

In step S26, the controller 35 controls the MUX 32 to select and multiplex encoded data of an image inside the preferred range (object image), image outside the preferred range (background image) and appended information so that the image inside the preferred range will be displayed with a higher spatial resolution at the receiver 2. Namely, when having received clock data from the receiver 2, the controller 35 will control the MUX 32 to improve the spatial resolution of an image inside the preferred range by the sacrifice of the time resolution.

In the above, the controller 35 controls the MUX 32 to improve the spatial resolution of an image inside the preferred range. However, the controller 35 may control the MUX 32 to improve the time resolution of an image inside the preferred range, that is, the frame rate of an image inside the preferred range. In this case, the controller 35 may attain the improvement by the sacrifice of the spatial resolution. Also, the controller 35 may control the total information amount by handling an image corresponding to a background image outside the preferred range as a still image.

Thus, for an image inside the preferred range, the MUX 32 preferentially selects and multiplexes encoded data for display of image data in the third layer and also in the second layer, and outputs the multiplexed data.

Further, in step S26, the controller 35 controls the MUX 32 to insert information on the position, size, etc. of the preferred range into appended information selected as the multiplexed data, and then goes to step S23.

In step S23, the transmission unit 33 sends the multiplexed data output from the MUX 32 along with frame rate information via the transmission line, and then the procedure returns to step S21.

For the simplicity of the explanation, it is assumed here that in step S26, encoded data for display of image data in the third layer are continuously selected for an image outside the preferred range, for example, a background image, as in step S22. In this case, in the controller 35, the amount of the multiplexed data in step S26 will be larger by an image with a higher spatial resolution inside the preferred range, that is, image data in the second layer for the object image, than in step S22.

At this time, even if it is intended to display an image at a rate of for example 30 frames/sec, since the transmission rate of the transmission line permits to display only the image data in the third layer, the multiplexed data including the data in the second layer, acquired in step S26, will not be such data as permits to display an image at the rate of 30 frames/sec.

In this case, the transmission unit 33 will send multiplexed data whose rate is lower than 30 frames/sec or is 0 frame/sec in an extreme case, namely, a still image. Thus, at the receiver 2, there will be displayed an image included in the preferred range and whose horizontal and vertical spatial resolutions are a half of those of their initial image (image in the first layer), that is, an image (image in the second layer) whose horizontal and vertical spatial resolutions are double those of a third layer image having so far been displayed. At this time, however, the time resolution of an image displayed at the receiver 2 will be less than 30 frames/sec.

After data in the second layer for an image inside the preferred range are sent as in the above, if it is judged in step S21 that clock data has been sent from the receiver 2 as in the above, namely, when the user continuously operates the clock data input unit 24 to designate a focus of interest identical to or near the preceding one, the focus of interest identical to or near the preceding one is recognized in step S24, and the same preferred range as the preceding one is set in step S25, and the procedure goes to step S26. Thereby, in step S26, the controller 35 will control the MUX 32 to select and multiplex encoded data so that an image inside the preferred range can be displayed with a higher spatial resolution at the receiver 2.

Since the encoded data of images in the third and second layers and information appended to the images are preferentially selected for the image inside the preferred range as in the above, the encoded data of images in the first layer and information appended to the images are also preferentially selected and multiplexed. The high-resolution information is inserted into the appended information as having been described with respect to step S26, and the multiplexed data from the MUX 32 are sent along with the frame rate information from the transmission unit 33 via the transmission line in step S23, and then the procedure returns to step S21.

In this case, the receiver 2 will display an image included in the preferred range and whose spatial resolution is the same as that of their initial image (image in the first layer), that is, an image (image in the first layer) whose horizontal and vertical spatial resolutions are 4 times higher than those of a fourth layer image displayed first. However, an image whose time resolution is lower than the 30 frames/sec or is 0 frame/sec in an extreme case is handled as a still image.

With the above operations, since data intended for improvement of the spatial resolution of an image inside the preferred range including a focus of interest, namely, an interesting area such as an object image, are preferentially sent if the user of the receiver 2 continuously operates the click data input unit 24 to designate for example the same focus of interest, that is, an interesting area, the spatial resolution of the image inside the preferred range including the focus of interest is gradually improved with the result that the image in the preferred range will be displayed more definitely. That is, an interesting area being an image of a portion the user of the receiver 2 is interested in, for example, an object image, will be displayed more definitely.

As in the above, since image data sending is controlled so that the spatial resolution or time resolution of an interesting area being an image within a preferred area localized with a focus of interest which is based on click data, such as an object image, is changed within a resolution range corresponding to the transmission rate of a transmission line, an image corresponding to a focus of interest, sent at a limited transmission rate, can be displayed at the receiver 2 with a higher spatial resolution. That is, by improving the spatial resolution of an object image inside a preferred range at the sacrifice of the time resolution of the image, the object image, even when sent at the limited transmission rate, can be displayed at the receiver 2 more definitely, namely, with a higher spatial resolution.

Next, the reception processor 21 included in the receiver 2 shown in FIG. 4 will be described in further detail below with reference to FIG. 10.

Figure 10:
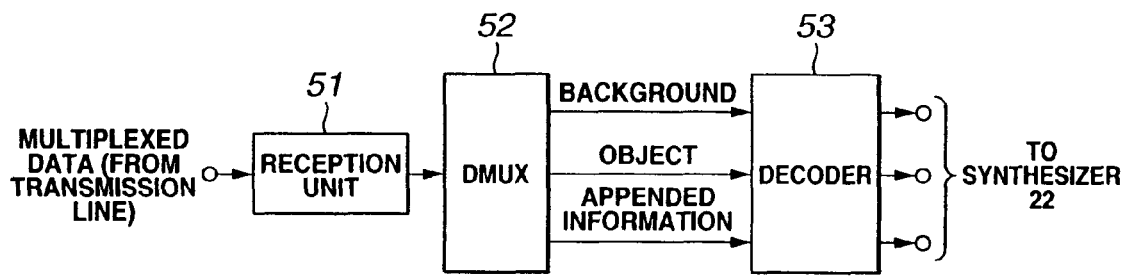
FIG. 10 is a block diagram of the reception processor included in the receiver in FIG. 4.

As shown in FIG. 10, the multiplexed data supplied via the transmission line are received and modulated by a reception unit 51, and then supplied to a demultiplexer (DMUX) 52. The DMUX 52 demultiplexed the multiplexed data supplied from the reception unit 51 into background encoded data, object encoded data and appended information encoded data, and supplies these encoded data to a decoder 53.

Reversely following the encoding-compression procedure, the decoder 53 decodes the encoded data of background, object or appended information (data derived from encoding of the difference in this embodiment) to their respective initial data, and outputs it to the synthesizer 22 shown in FIG. 4.

Figure 11:
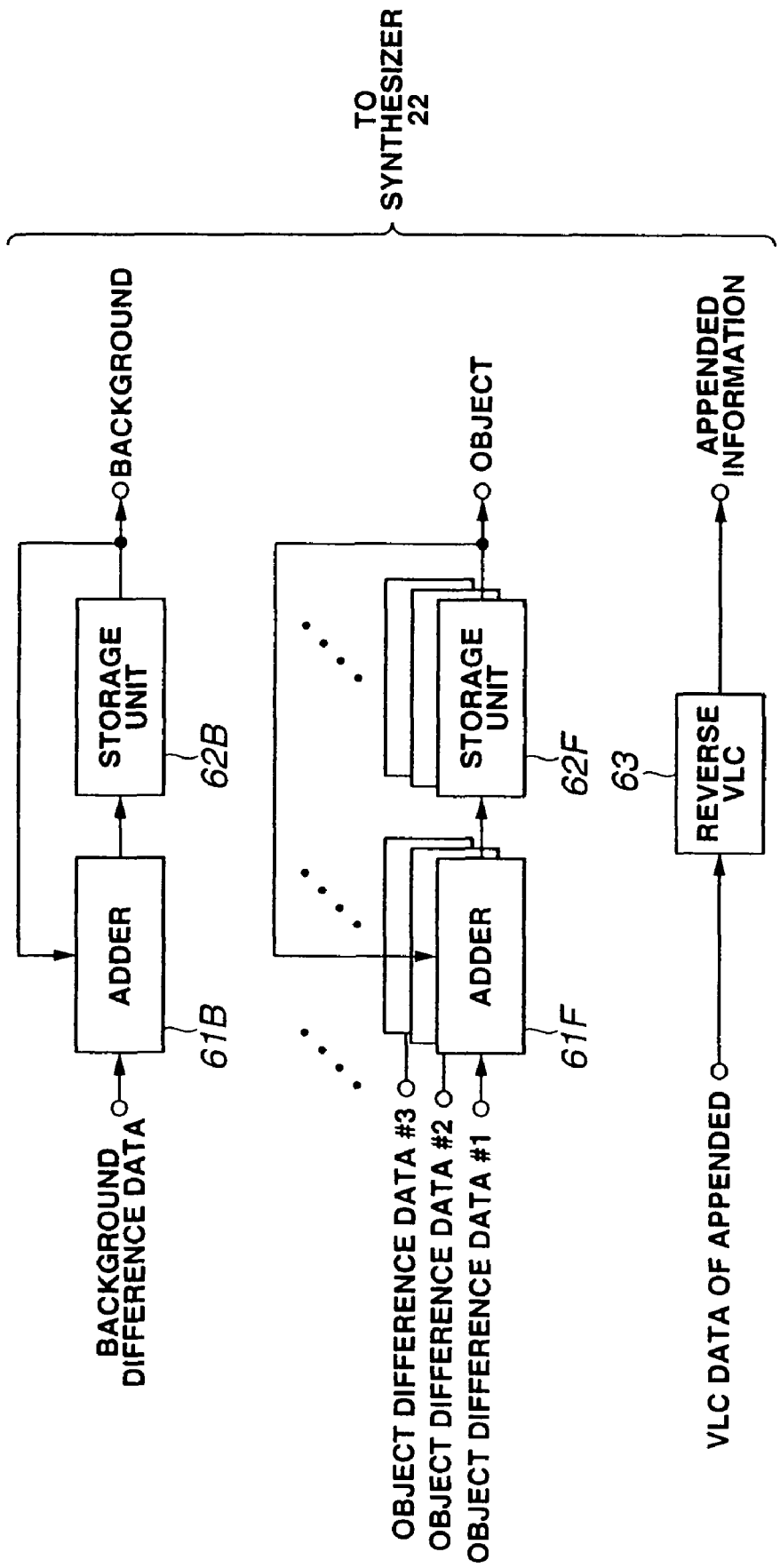
FIG. 11 is a block diagram of the decoder included in the reception processor in FIG. 10.

FIG. 11 shows in detail the decoder 53 in FIG. 10.

As shown in FIG. 11, the hierarchically encoded background image difference data being background encoded data are supplied to an adder 61B which is also supplied with background image data preceding by one frame the background encoded data, stored in a storage unit 62B and already decoded. The adder 61B adds, to the supplied background image difference data, the background image data one frame before the difference data, supplied from the storage unit 62B, to thereby decode background image data in a layer required for the current frame. The decoded background image data are supplied to and stored in the storage unit 62B, and then read and supplied to the adder 61B while being sent to the synthesizer 22 in FIG. 4.

The hierarchically encoded object image difference data being object encoded data are supplied to an adder 61F which is also supplied with object image data one frame before the difference data, stored in a storage unit 62F and already decoded. By adding, to the supplied object image difference data, object image data one frame before the difference data, supplied from th storage unit 62F, the adder 61F decodes object image data in a layer required for the current frame. The decoded object image data are supplied to and stored in the storage unit 62F, and then read and supplied to the adder 61F while being sent to the synthesizer 22 in FIG. 4. Note that when there is a plurality of objects, the adder 61F and storage unit 62F will repeat the above-mentioned hierarchical decoding for the difference data of the plurality of objects.

The above-mentioned variable length-encoded appended information being appended information encoded data are supplied to a reverse VLC (variable-length coder) unit 63 where they are variable length-decoded to their initial appended information. The initial appended information is supplied to the synthesizer 22.

Note that the local decoder 44B in FIG. 7 is constructed similarly to the adder 61B and storage unit 62B and the local decoder 44F is also constructed similarly to the adder 61F and storage unit 62F.

Next, the synthesizer 22 included in the receiver 2 shown in FIG. 4 will be described in detail below with reference to FIG. 12.

Figure 12:
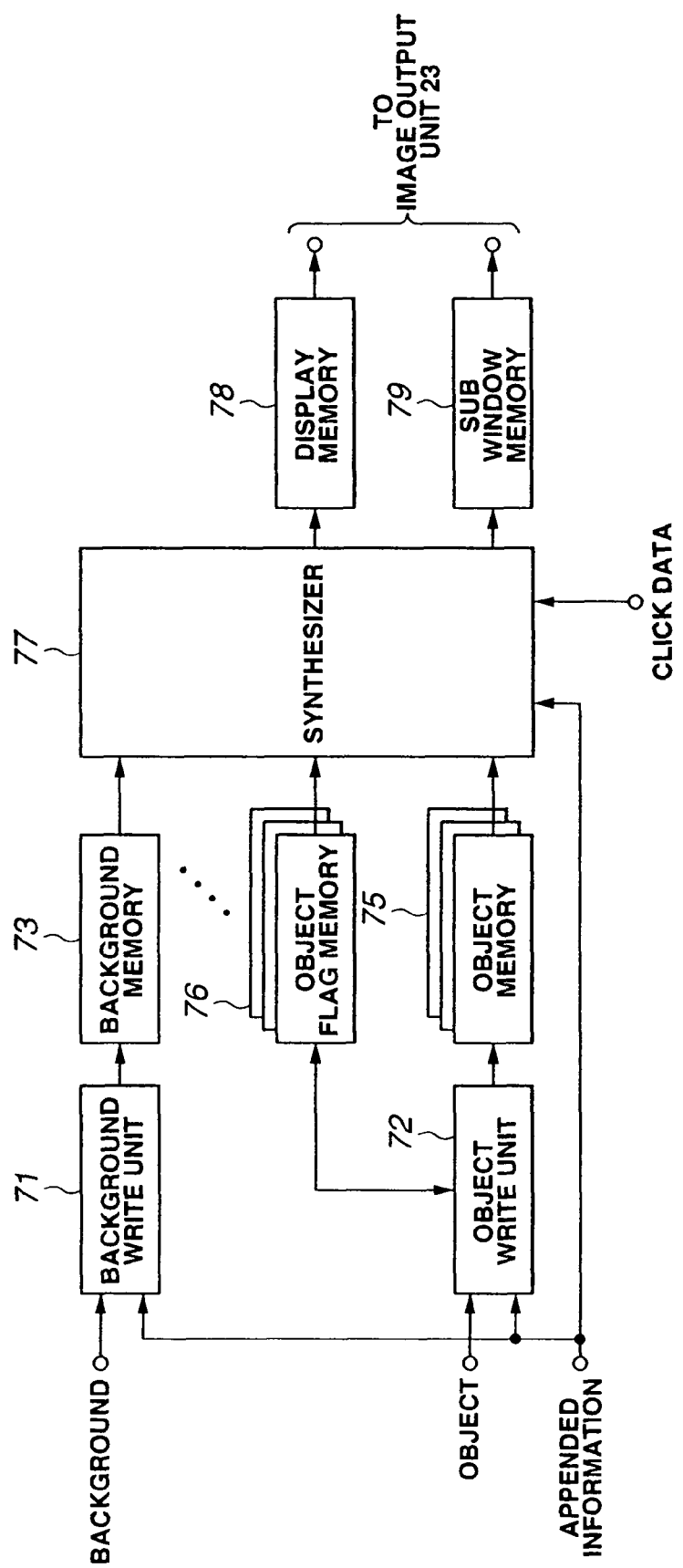
FIG. 12 is a block diagram of the synthesizer of the receiver in FIG. 4.

As shown in FIG. 12, from the decoder 53 in FIG. 10, background image data are supplied to a background write unit 71, object image data are supplied to a object write unit 72, and appended information is supplied to a background write unit 71, object write unit 72 and a synthesizer 77.

The background write unit 71 writes the supplied background image data one after another to the background memory 73. In case there is for example a movement of the background, due to a panning or tilting during imaging by the video camera 6 in the transmitter 1, the background write unit 71 will write the background image data to the background memory 73 with the background being positioned based on a background movement vector included in the appended information. Therefore, the background memory 73 can store data on an image spatially wider than one frame of image.

The object write nit will write the supplied object image data one after another to the object memory 75. Note that in case there is for example a plurality of objects, the object write unit 72 will write image data of the plurality of objects to the object memory 75 for each object. Also, for write of image data of objects having the same object number which will further be described later, namely, same object data, the object write unit 72 will write, to the object memory 75, new object image data, namely, object image data newly supplied to the object write memory 72 in place of object image data already stored in the object memory 75.

Further, when an object whose spatial resolution is high have been written to the object memory 75, the object write unit 72 will change, from "0" to "1", the object flag stored at an address in an object flag memory 76 correspondingly to each of pixels forming the object in consideration. More specifically, when writing object image data to the object memory 75, the object write unit 72 will make reference to the object flag memory 76. No object image data whose spatial resolution is low will be written to the object memory 75 having already stored therein an object whose flag is "1", namely, image data of an object whose spatial resolution is high. Therefore, basically, each time object image data are supplied to the object write unit 72, they are written to the object memory 75; however, no object image data whose spatial resolution is low will be written to the object memory 75 having already stored therein object image data whose spatial resolution is high. As a result, in the object memory 75, each time object image data whose spatial resolution is high are supplied to the object write unit 72, the number of object images whose spatial resolution is high will be larger.

The synthesizer 77 reads a background image of a current frame to be displayed at the present from the background image data stored in the background memory 73 based on the background movement vector included in the appended information while pasting, to the background image, the object image stored in the object memory 75 based on the object movement vector included in the appended information, whereby an image in the current frame is reproduced and supplied to a display memory 78.

Further, upon reception of click data from the click data input unit 24 in FIG. 4, the synthesizer 77 reads, from the object memory 75, object image data containing a coordinate position of a focus of interest included in the click data, and supplies the data to the sub window memory 79.

There is further provided a display memory 78 as a so-called VRAM (video read-only memory) to buffer or provisionally store an image in the current frame supplied from the synthesizer 77 and then read it out for supply to the image output unit 23 in FIG. 4. Also, the sub window memory 79 provisionally stores object image data supplied from the synthesizer 77 and then reads it for supply to the image output unit 23 in FIG. 4. At this time, the display unit 7 driven by the image output unit 23 will display, along with the image in the current frame, a sub window which will further be described later, and display an object image in the sub window.

Figure 13:
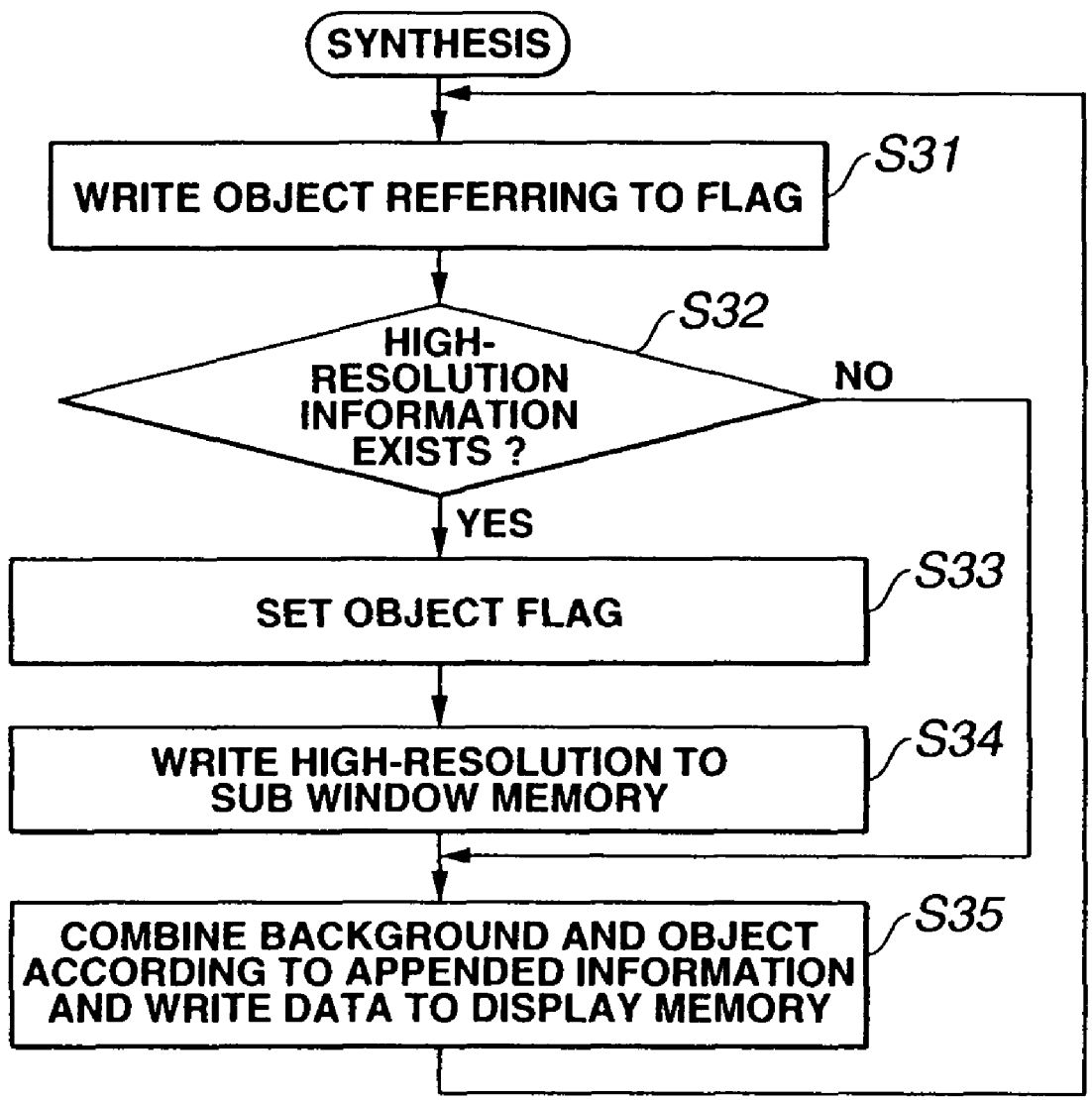
FIG. 13 shows a flow of operations made in the synthesizer in FIG. 12.

Next, the operations effected in the synthesizer 22 in FIG. 12 will be described below with reference to the flow chart in FIG. 13.

First in step S31, the object write unit 72 writes the object image data supplied from the decoder 53 in FIG. 10 as in the above on the basis of an object flag stored in the object flag memory 75.

More particularly, referring to the object flag stored in the object flag memory 76, the object write unit 72 writes object image data supplied thereto at an address, in the object memory 75, corresponding to a pixel for which the object flag is "0", and only object image data supplied thereto and whose spatial resolution is high at an address, in the object memory 75, corresponding to a pixel for which the object flag is "1".

Note that when object image data are written at an address, in the object memory 75, where object image data are already stored, they will be written over the existing object image data in the object memory 75.

Thereafter in step S32, the object write unit 72 judges whether the appended information includes high-resolution information. If it is judged in step S32 that the appended information includes high-resolution, namely, when click data are sent to the transmitter 1 by operating the clock data input unit 24 in FIG. 4 by the user of the receiver 2 and thus object image data whose spatial resolution is high are sent for an image inside the preferred range from the transmitter 1, the object write unit 72 goes to step S33 where it will set a predetermined object flag in the object flag memory 76 to "1".

That is, when object image data whose spatial resolution is high are sent for the image inside the preferred range from the transmitter 1, they are written to the object memory 75 in step S31. Thus in step S33, the object flag for pixels included in an object image whose spatial resolution is high is set to "1".

Thereafter the procedure goes to step S34 where the synthesizer 77 will read object image data inside the preferred range from the object memory 75, and write them to the sub window memory 79.

Namely, when it is judged in step S32 that the appended information includes high-resolution, click data have been sent to the transmitter 1 by operating the clock data input unit 24 in FIG. 4 by the user of the receiver 2 and thus object image data whose spatial resolution is high have been sent for an image inside the preferred range from the transmitter 1. The click data supplied to the transmitter 1 are also supplied to the synthesizer 77. Upon reception of the click data, the synthesizer 77 will recognize, in step S34, the preferred range from the coordinate of the focus of interest an clicked time included in the click data, read an object, sent from the transmitter 1, included in the preferred range and having a high spatial resolution, from the object memory 75, and write the data to the sub window memory 79.

Then in step S35, the synthesizer 77 reads, based on the background movement vector included in the appended information, background image data in the current frame from the background image data stored in the background memory 73, reads object image data to be displayed in the current frame from the object memory 75, and further combines the background image data in the current frame and object image data read from the object memory 75 according to the object movement vector included in the appended information. Thus, the synthesizer 77 reproduces the image in the current frame and writes it to the display memory 78. That is, the synthesizer 77 writes the background image data to the display memory 78 for example, and then writes the object image data over the background image data, thereby writing, to the display memory 78, the image data in the current frame obtained by combining the background image and object image.

As in the above, the image data in the current frame written to the display memory 78, and object image data written to the sub window memory 79 will be supplied to the image output unit 23 in FIG. 4 and displayed on the display unit 7.

On the other hand, if it is judged in step S32 that the appended information includes no high-resolution information, namely, when the click data input unit 24 has not been operated by the user of the receiver 2, the procedure skips over steps S33 and S34 to step S35 where the synthesizer 77 will read the background image data in the current frame from the background memory 73 and necessary object image data from the object memory 75, to combine the background image in the current frame and object image read from the object memory 75 according to the appended information. Thus, the synthesizer 77 reproduces image data in the current frame and writes them to the display memory 78. Then the procedure returns to step S31 and similar operations will be repeated.

With the above operations for the synthesis, when the user of the receiver 2 has not operated the click data input unit 24, that is, when no clicking has been made at the click data input unit 24, an image whose spatial resolution is low will be displayed on the display screen of the display unit 7 with a default time resolution as shown in FIG. 14A. Note that FIG. 14A shows an example in which an object image whose spatial resolution is low is being moved rightward over a background image whose spatial resolution is low.

When the user of the receiver 2 moves the cursor over the object image by operating the click data input unit 24 and clicks with the cursor on the object image, click data is sent to the transmitter 1 and the transmitter 1 receives data intended for display, as a high spatial-resolution image, of an image inside a preferred range localized based on the click data by the sacrifice of the time resolution. As the result, there will be displayed on the display screen of the display unit 7, as shown in FIG. 14B, an image corresponding to an object image included in the preferred range around the clicked position and whose time resolution is low but whose spatial resolution is gradually improved. That is, an image is displayed which corresponds to an object image included in the preferred range and whose spatial resolution is gradually improved correspondingly to a time when clicking has been made on the image.

Further, on the display unit 7, the sub window is opened and an image corresponding to an object in an extracted preferred range including a clicked position is displayed in the sub window with the spatial resolution of the object being gradually improved, as shown in FIG. 14B.

Thereafter, when the user of the receiver 2 stops clicking with the click data input unit 24, the synthesizer 77 reads background image data in the current frame from the background memory 73 and object image data from the object memory 75, combines the background image data and object image data according to the appended data, and writes the data to the display memory 78, in step S35 as having been described above. As in the above, since the object image data whose spatial resolution has been elevated by clicking is continuously stored as it is in the object memory 75, the object image whose spatial resolution has thus been improved by clicking is moved according to the appended information movement vector is displayed in a due position in the current frame on the display unit 7 as shown in FIG. 14C.

Therefore, by clicking in a position where an object image whose detail is to be observed, the user of the receiver 2 will be able to view an object image having an improved spatial resolution. Thus, the user will be able to view a detailed image of an object.

Note that since the background image data is stored in the background memory 73 as in the above, the transmitter 1 has not to send any background sent once and whose spatial resolution is low. Therefore, the transmission rate for the background can be allocated preferentially to sending of object image data whose spatial resolution is higher.

In the above case, the object image data having the spatial resolution raised by clicking is stored in the object memory 75 and the object image having the high spatial resolution is pasted on the background image after the clicking is stopped. Thus, the object image displayed at the receiver 2 will have a high spatial resolution but will not reflect any change in state of an object image picked up at the transmitter 1.

So, with the object flag being disregarded after the clicking is stopped, the object image data stored in the storage unit 62F in the decoder 53 shown in FIG. 11 can be written over the object image data stored in the object memory 75 and whose spatial resolution is high. That is, since object image data sent from the transmitter 1 are stored one after another into the storage unit 62F of the decoder 53, the object image in an image displayed on the display unit 7 will be made to reflect a change in state of the object captured at the transmitter 1 as in the above by writing the object image data to the object memory 75. However, the displayed object image will have a low spatial resolution.

Next, the relation between the spatial and time resolutions of an image sent from the transmitter 1 to the receiver 2 via the transmission line will be described below with reference to FIG. 15.

Assume here that the transmission rate of the transmission line is R [bps] and a background image and data including three objects #1 to #3 are sent from the transmitter 1. For the simplicity of the explanation, no consideration will be given to the appended information, and it is assumed that for displaying the background image and object images #1 to #3 with a certain spatial resolution, the same data amount is required for each of the images.

Figure 15A:
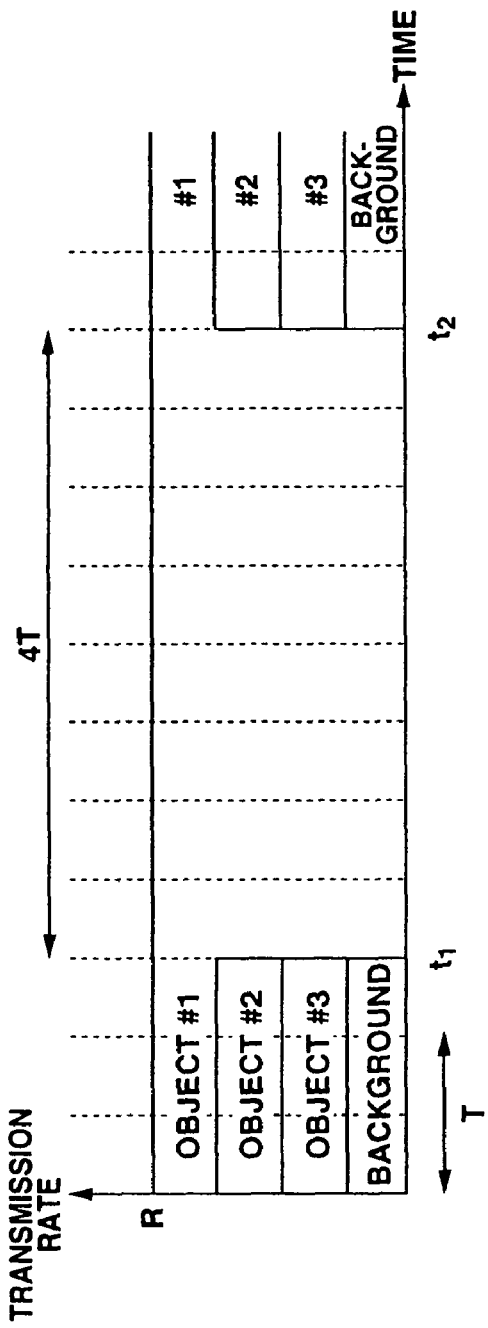
FIGS. 15A and 15B explain the relation between the spatial resolution and time resolution of an image sent from the transmitter and receiver, included in the communication system in FIG. 1.
Figure 15B:
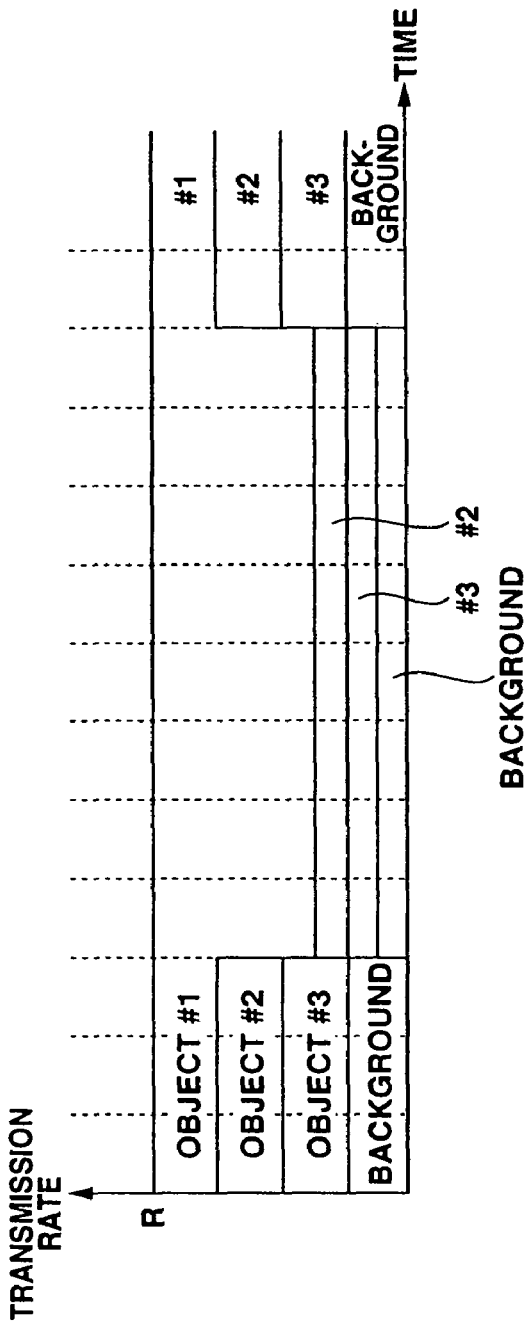

In this case, when no clicking has been made at the receiver 2, the transmitter 1 will send the background image and object images #1 to #3 each at a rate R/4 [bps] being a quarter of the transmission rate of the transmission line, as shown in FIG. 15A. Note that when the ordinary time resolution is 1/T frame/sec, the transmitter 1 will send one frame of each of the background image and object images #1 to #3 in a maximum of T sec. Therefore in this case, there will be displayed on the receiver 2 background image and object images #1 to #3 each having a spatial resolution of T×R/4 bits/frame.

When the user clicks at a time $t_1$ and in a position of the object image #1 for example, the transmitter 1 will stop sending the background image and object images #2 and #3 for example while sending only the object image #1 at the full transmission rate R of the transmission line, as shown in FIG. 15A. Thereafter, when the user stops clicking at a time $t_2$ which is later by a time 4T than the time $t_1$, the transmitter 1 will send the background image and object images #1 to #3 again at a transmission rate of R/4.

Therefore, while the user is clicking, 4T×R bits of the object #1 are sent. So, when the time resolution during clicking is 0 frame/sec, the receiver 2 will display the object image #1 with a spatial resolution of 4T×R bits/frame. That is, when the horizontal and vertical spatial resolutions have been improved to the same extent, the time resolution at the receiver 2 is 0 frame/sec but the object image #1 clicked by the user will be displayed with horizontal and vertical spatial resolutions 4 times higher than those before clicking (=$\sqrt{4T \times R/(T \times R/4 \text{ bits})}$).

Thus, the spatial resolution can be improved at the sacrifice of the time resolution, and the spatial resolution of object image the user is interested in can be improved more rapidly than when the time resolution is sacrificed.

In an example shown in FIG. 15A, while the object image #1 is being clicked, a transmission rate of 0 frame/sec is set for sending the background image and other object images #2 and #3 so that these data will not be sent. In an example shown in FIG. 15B, however, a high transmission rate may be allocated for sending the object image #1 while a low transmission rate may be allocated for sending the background image and object images #2 and #3.

Even if the clicking is made, the transmission rate allocated for sending the background image and object images #1 to #3 can be kept as R/4. That is, since the spatial resolution is improved at the sacrifice of the time resolution, sending of the data takes a time even without allocating any other transmission rate.

In the above, object image having the spatial resolution elevated by clicking is stored in the object memory 75, and after the clicking is stopped, the object image having the high spatial resolution is pasted on the background image. However, where the high spatial-resolution object image is to be pasted on the background image depends upon an object movement vector included in the appended information on the object, sent from the transmitter 1 later.

Therefore, since the receiver 2 has to recognize an object image in a frame, corresponding to an image in a frame adjacent to the former frame, the object extraction unit 14 of the transmitter 1 appends information intended for use by the receiver 2 to make such a recognition for extraction of an object.

In the above, there has been described an example in which when a focus of interest is designated by operating the click data input unit 24 by the user of the receiver 2, data sending is controlled in the transmitter 1 to improve the spatial resolution of an image inside a preferred range including the focus of interest at the sacrifice of the time resolution of the image. In addition, the transmitter 1 can learn for example the preference of the user of the receiver 2, and predictively detects, based on the result of learning, an object etc. which, it is considered, the user of the receiver 2 desires to display with a high spatial resolution, to thereby control data sending so that the object can be displayed with a high spatial resolution.

Figure 16:
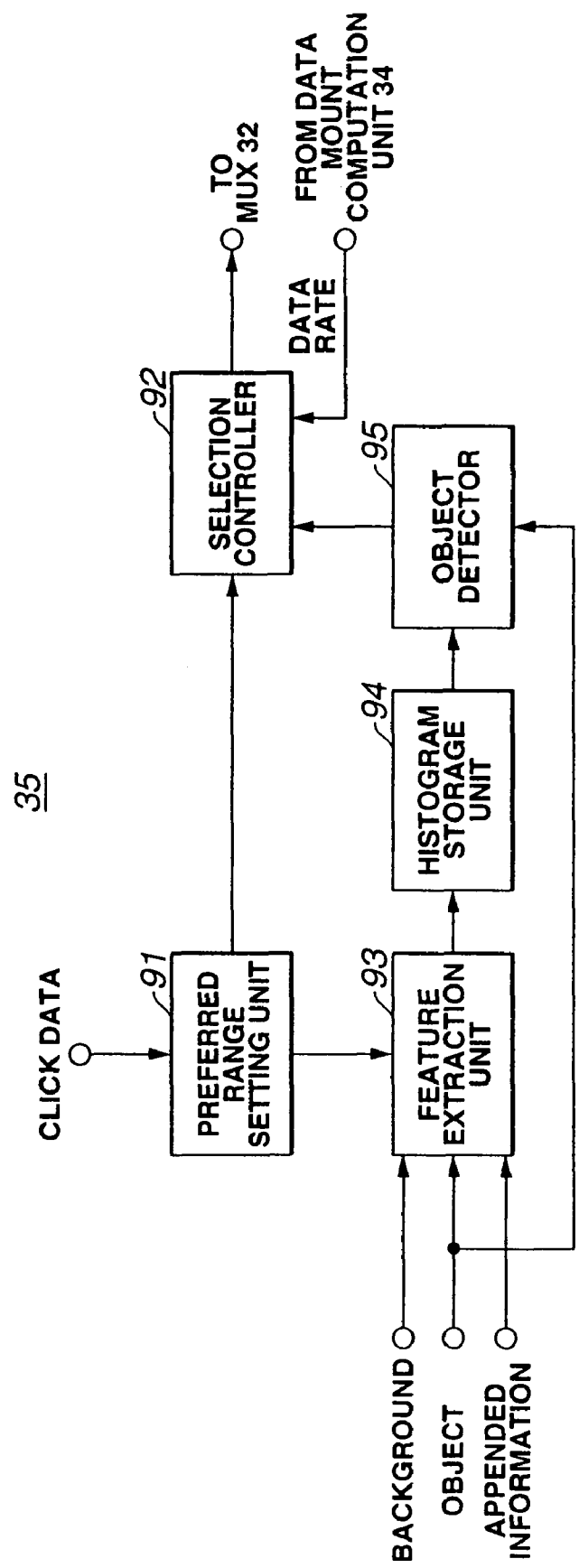
FIG. 16 is a block diagram of the essential portion of the controller included in the transmission processor in FIG. 6, intended for prediction of a focus of interest.

FIG. 16 shows, by way of example, the construction of the controller 35 in FIG. 6, intended for such a control of data sending.

As shown in FIG. 16, the controller 35 includes a preferred range setting unit 91, selection controller 92 and a feature extraction unit 93. The preferred range setting unit 91 receives click data sent from the receiver 2 to set a preferred range as having previously been described, and the set preferred range is supplied to the selection controller 92 and feature extraction unit 93.

Based on signals supplied from the preferred range setting unit 91 and indicative of a preferred range, data rate information supplied from the data amount computation unit 34 in FIG. 6 and information supplied an object detector 95 which will further be described later, the selection controller 92 controls selection by the MUX 32 of each of background image, object image and appended information. That is, receiving the signals indicative of the preferred range from the preferred range setting unit 91, the selection controller 92 will control the multiplexing in the MUX 32 so that the spatial resolution of an image inside the preferred range is improved at the sacrifice of the time resolution of the image. Also, receiving label information indicative of an object detected by the object detector 95, the selection controller 92 controls the MUX 32 to improve the spatial resolution of the labeled object by the sacrifice of the time resolution of the image. Further, supplied with data rate of the multiplexed data output from the MUX 32 from the data amount computation unit 34, the selection controller 92 controls the MUX 32 to select data so that the data rate will not exceed the transmission rate of the transmission line.

The feature extraction unit 93 is supplied with background image data, object image data and appended information from the pre-processor 12, and with signals indicative of a preferred range, from the preferred range setting unit 91, to extract a feature of an image inside the preferred range set by the preferred range setting unit 91. That is, the feature extraction unit 93 will extract, concerning for example an object inside the preferred range, a feature reflecting a tendency of the user of the receiver 2 to be interested in the object.

More particularly, the feature extraction unit 93 extracts, concerning an object indicating a certain "person" for example, features indicating that the object is a "person", that his or her motion is uniform for example, the object is at this side, that the object is in the middle position on the screen, that the object is moving at a speed (the object is a moving portion), that for example eyes, nose and mouth are included in areas defining the object (areas of the object include the eyes, nose and mouth), that the pattern of the object is striped for example (the object is a striped portion), that the object is red (the object is a red portion), etc., as shown in FIG. 17.

Further the feature extraction unit 93 determines a vector defined by the above extracted features of the object (feature vector), and increments by one the degree of the thus determined feature vector of a histogram stored in a histogram storage unit 94 also included in the controller 35.

The histogram storage unit 94 stores a histogram of a feature vector determined by the feature extraction unit 93 as a result of learning the preference of the user of the receiver 2.

The controller 35 further includes an object detector 95. This object detector 95 is provided to detect, from an object image supplied from the pre-processor 12, an object from which there can be determined a similar feature vector to the most frequent feature vector in the histogram stored in the histogram storage unit 94. That is, the object detector 95 determines a feature vector as in the feature extraction unit 93 for an object supplied from the pre-processor 12. Further, the object detector 95 refers to the histogram stored in the histogram storage unit 94 to judge whether there exists a feature vector of the object from the pre-processor 12 within a predetermined range of feature vector space about the most frequency feature vector. When the object detector 95 judges that such a feature vector exists, it will predict that the user of the receiver 2 tends to be interest in the object, and supply a label indicative of the object to the selection controller 92.

Figure 18:
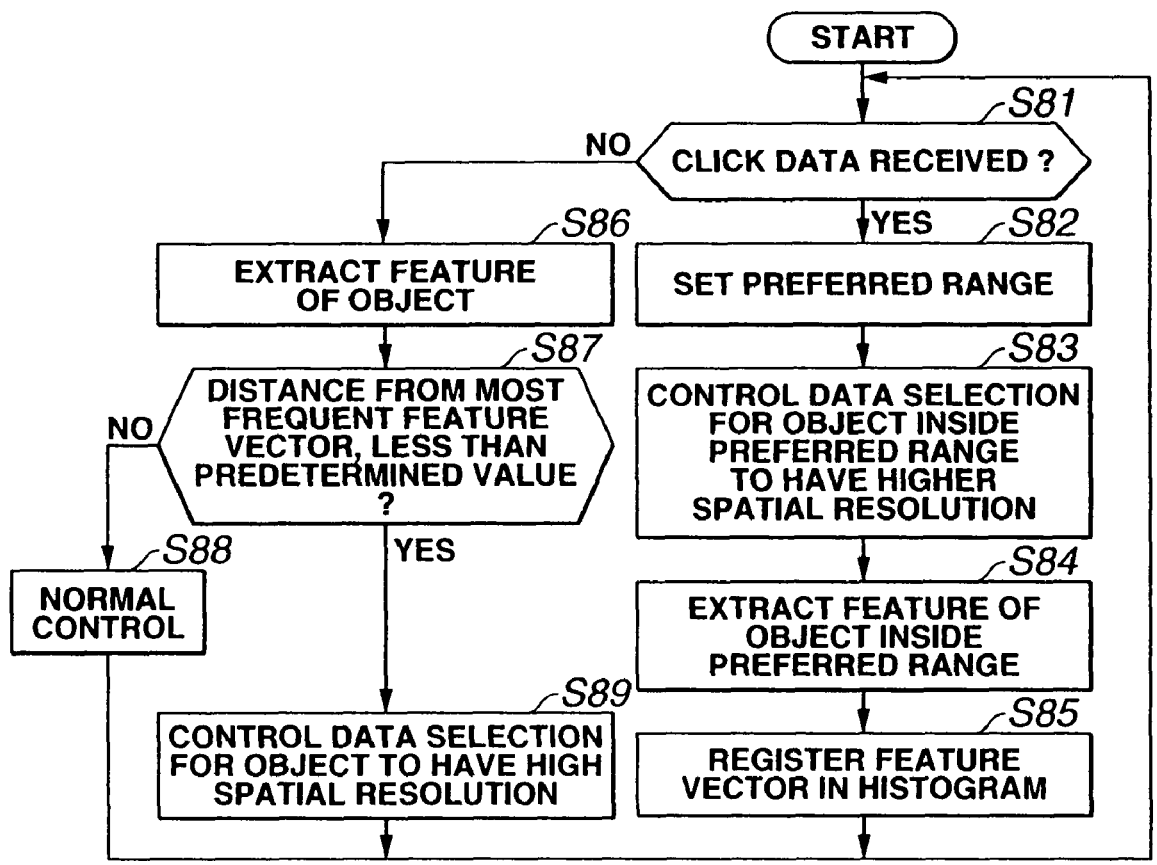
FIG. 18 shows a flow of operations made in the controller included in the transmission processor in FIG. 6, intended for prediction of a focus of interest.

Next, how the MUX 32 is controlled by the controller 35 which is operative as having been described with reference to FIG. 16, will be described below with reference to the flow chart in FIG. 18.

First in step S81, the preferred range setting unit 91 judges whether click data have been sent from the receiver 2. If it is judged in step S81 that clock data have been sent from the receiver 2, the preferred range setting unit 91 goes to step S82 where it will set a preferred range as having previously been described and supply signals indicative of the preferred range to the selection controller 92 and feature extraction unit 93.

In step S83, the selection controller 92 controls the MUX 32 to improve the spatial resolution of an image (object image) inside the preferred range at the sacrifice of the time resolution of the image.

In step S84, the feature extraction unit 93 extracts a feature of the object inside the preferred range to determine a feature vector from the extracted object feature. Further, the feature extraction unit 93 increments by one the degree of the feature vector of the histogram stored in the histogram storage unit 94 in step S85, and then the procedure returns to step S81.

The operations in steps S81 to S85 are repeated to form, in the histogram storage unit 94, histogram of the feature of the object in which the user of the receiver 2 tends to be interested. Thereby, the preference of the user of the receiver 2 will be learned.

On the other hand, if it is judged in step S81 that no click data have been sent from the receiver 2, the procedure goes to step S86 where the object detector 95 will determine a feature vector of object image data supplied from the pre-processor 12 as in the feature extraction unit 94. Further, the object detector 95 refers, in step S87, to the histogram stored in the histogram 94 to judge whether the feature vector of the object image supplied from the pre-processor 12 exists inside a predetermined range of the feature vector around the most frequent feature vector. That is, it is judged in step S87 whether the distance between the most frequent feature vector and that of the object image supplied from the pre-processor 12 is less than a predetermined value.

If it is judged in step S87 that the distance between the most frequent feature vector and that of the object image supplied from the pre-processor 12 is not less than a predetermined value, that is, when the object image supplied from the pre-processor 12 is judged from the past tendency to have a low probability of interesting the user of the receiver 2, the procedure goes to step S88 where the selection controller 92 will control the MUX 32 to display ordinary time and spatial resolutions at the receiver 2, and then the procedure returns to step S81.

Also, if it is judged in step S87 that the most frequent feature vector and that of the object image supplied from the pre-processor 12 is less than a predetermined value, that is, when the object image supplied from the pre-processor 12 has a high probability of interesting the user of the receiver 2, the object detector 95 will output a label of the object supplied from the pre-processor 12 to the selection controller 92, and then the procedure goes to step S89.

In step S89, the selection controller 92 controls the MUX 32 to improve the spatial resolution of the labeled object image from the object detector 95 at the sacrifice of the time resolution of the image, and then the procedure returns to step S81.

Therefore, in this case, the labeled object image output from the object detector 95 is displayed with a high spatial resolution by the sacrifice of the time resolution at the receiver 2. Subsequently, the object continues to be displayed with the high spatial resolution.

As a result, when the object in which the user tends to be interested, the receiver 2 will subsequently continue to be displayed with the high spatial resolution even with no operation of the click data input unit 24 by the user or automatically.

Note that the histogram of the feature vector as the result of learning the preference of the user of the receiver 2, stored in the histogram storage unit 94 can be reset regularly or irregularly or correspondingly to a request from the user of the receiver 2.

Next, there will be described in detail the flow of operations of charging made for data service and data transmission/reception, for example, for data service to the terminals 1 and 2 or data reception/transmission between the terminals 1 and 2, made via the management center 103 in FIG. 1, and the construction of a system intended for such operations.

Generally a software is constructed from a fusion of various processing methods (programs). For example, a spreadsheet includes a program for simple arithmetic operations as well as a program for statistic operations. Normally, a package medium such as a CD-ROM or the like having recorded therein such operating methods forming a software (program; will be referred to as "method" hereunder wherever appropriate) is commercially available, and buying such a package medium to acquire the license for using the software, the user will be able to utilize the software.

The present invention provides a system in which the user cannot acquire the license for using a software stored in a package medium when he or she purchases the package medium but can acquire the license each time he uses the software and also acquire the license for a necessary one of the functions (methods) included in the software. Therefore, the user should pay an amount charged for the use of a software and also for an amount charge for the use of a necessary one of the software functions (methods). Thus, the user can use the methods with less expenses than in use of the aforementioned package medium which serves all the software functions collectively.

Also, various methods are possible for a result of an operation. Therefore, selective use of a higher-level one of various methods for attaining similar objects will assure a more desirable result. In other words, use of the more advance method will be a larger benefit to the user.

According to the present invention, there is provided a charging system in which of a plurality of difference algorithms, a one the user is going to use is selected, and an amount of money is charged according the level of the thus selected algorithm. That is, the charging system according to the present invention charges the user for an amount corresponding to a merit the user can enjoy.

Image communications will be described by way of example. Since in case of the image communications, use of a higher-level compression method (algorithm) will permit to reduce the entire data amount while maintaining a high quality of the data, so it is possible using the higher-level algorithm when the frequency band for the data communications is limited to acquire high-quality images, namely, high-definition, distortion- and noise-free images.

According to the present invention, a method capable of compressing an image with a low rate in image communications while maintaining the image quality is defined as a relatively low-level algorithm, and a method capable of compressing the image at a high rate is defined as a relatively high-level algorithm, and the user using the high-level algorithm will be charged for a larger amount than for using the low-level algorithm. Of course, the present invention is not limited to the image compression algorithm in the image communications but it can be applied to operations using various algorithms such as data communication algorithm, sound processing algorithm, etc. and charging is made for the level of an algorithm used.

Figure 19:
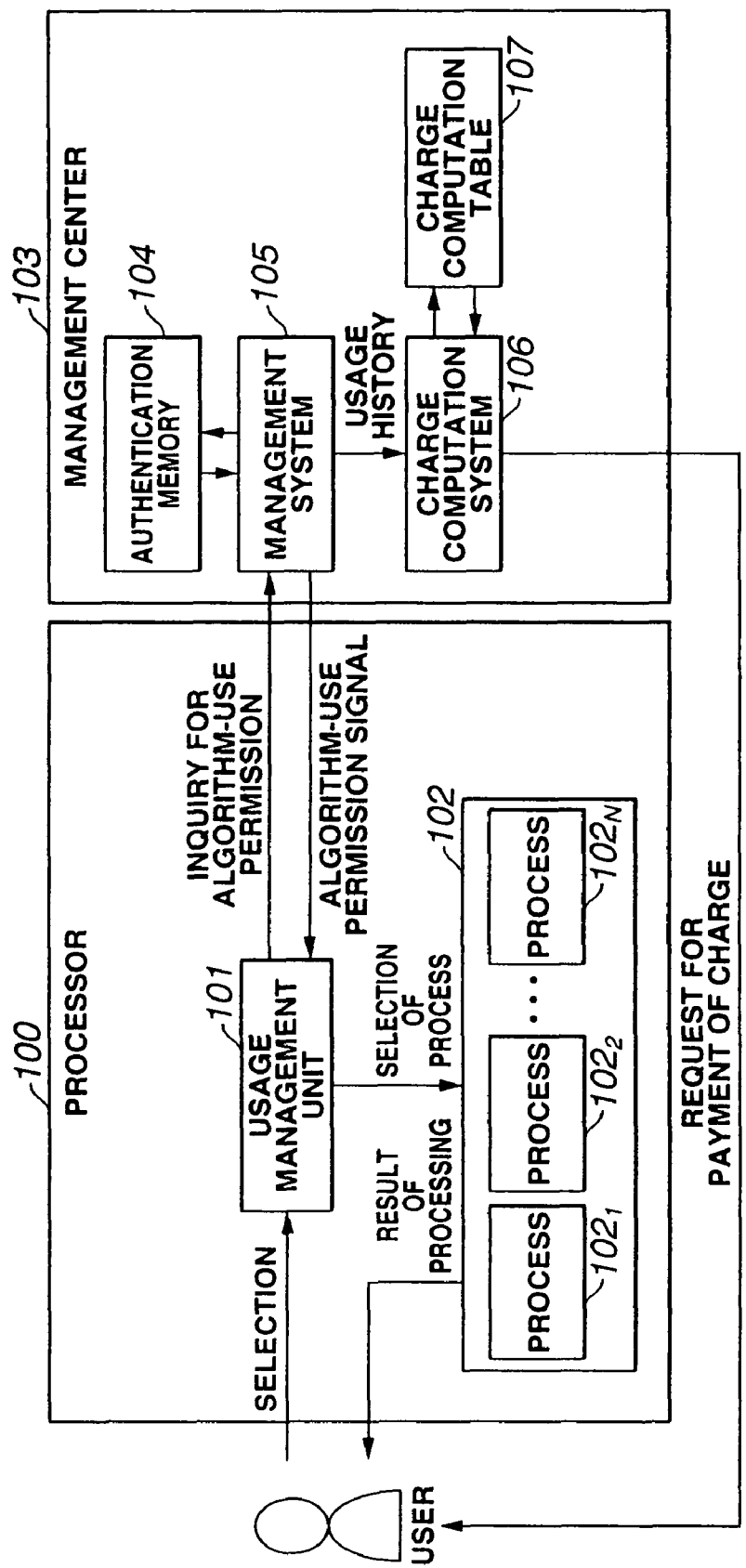
FIG. 19 is a block diagram of a model of charging effected between a processor having methods pre-installed therein and the management center.

FIG. 19 shows, as an example of the aforementioned charging system, a basic model of charging made between a processor 100 as a terminal having the above-mentioned method pre-installed therein and the management center 103. Note that charging for data service to the terminals 1 and 2 and actual data transmission/reception between the terminals 1 and 2, made via the management center 103 shown in FIG. 1, will further be described later.

As shown in FIG. 19, the processor 100 includes an algorithm processor 102 consisting of a plurality of processors $102_1$ to $102_N$ which process data with different kinds of algorithms (prograins), respectively, and a usage management unit 101 to manage use of algorithms by the processors $102_1$ to $102_N$. Note that in the example shown in FIG. 19, the algorithms of the processors $102_1$ to $102_N$ in the algorithm processor 102 cannot freely be used by the user.

As also shown in FIG. 19, the management center 103 includes an authentication memory 104 to hold authentication information on whether the processor 100 is an authorized one (the user is an authorized one), a charge computation system 106 to compute a charge for the use of an algorithm by the user based on a history of using the algorithm by the user (processor 100) and usage-charge computation table 107, and a management system 105 to manage the entire system.

As will be seen from FIG. 19, when the user wants to use any of processes to be effected in the processors $102_1$ to $102_N$ of the processor 100, he or she will first make a selective input to select one of the processors $102_1$ to $102_N$ for use (that is, one of algorithms to be used). When the user make the input, the usage management unit 101 will first make an inquiry to the management center 103 for permission to use the process (algorithm).

Receiving the permission inquiry signal, a management system 105 provided in the management center 103 checks, based on authentication information stored in the authentication memory 104, whether the processor 100 having made the inquiry is a one under the management system 100, that is, whether the processor 100 having made the inquiry is an authorized one (authorized user). When the processor 100 is checked to be an authorized processor (authorized user), the management system 105 sends an algorithm-use permission signal to the processor 100.

Upon reception of the algorithm-use permission signal, the usage management unit 101 in the processor 100 controls the algorithm processor 102 to immediately start a process in a processor corresponding to a process for which a selection input has been made by the user (a process of which the use is allowed by the management center 103). Thus, a user's desired operation will be effected.

Also, the management system 105 in the management center 103 sends, to the charge computation system 106, information (usage history) indicative of a processor 100 (user) to which the algorithm-use permission has been sent and a process (algorithm) of which the use has been permitted. Receiving the usage history information, the charge computation system 106 uses a usage-charge computation table held in the charge computation table 107 and set for each algorithm to compute a charge for the use of the process (algorithm). Thereafter, the charge computation system 106 will send a request for payment of the charged amount to the user of the processor on an on-line or off-line basis.

FIG. 19 shows an example in which the method (program) is pre-installed in the processor 100. As in a basic model for charging shown in FIG. 20, however, a processor 110 holds no method (program) but a method may be acquired from a server such as the management center 103 or the like (program is down-loaded at each time a process has been effected)

Figure 20:
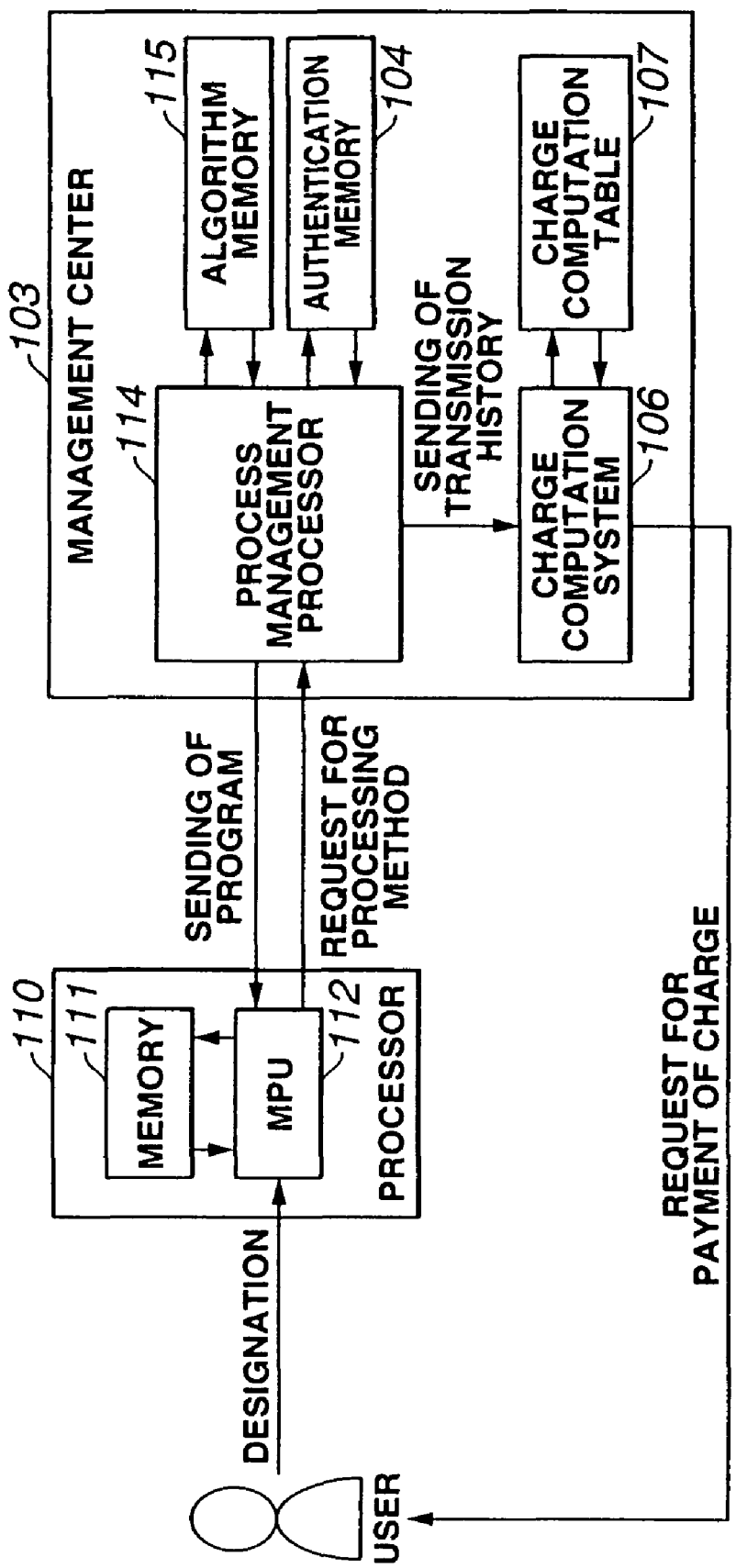
FIG. 20 is a block diagram of a charging model intended for acquisition of a method from the management center.

As shown in FIG. 20, the processor 110 has provided therein a memory 111 to provisionally hold a method (program) sent from the management center 103, and an MPU (microprocessor unit) to make a process by a method (program) held in the memory 110.

The management center 103 shown in FIG. 20 includes an authentication memory 104 to hold authentication information on whether the processor 110 is an authorized one (the user is an authorized one), a charge computation system 106 to use a history of method (program) sending to the user (processor 110) and a usage-charge computation table held in a charge computation table 107 for each algorithm, an algorithm memory 115 to hold a plurality of difference algorithms (program), and a process management processor 114 to manage the entire system, read and compress, for example, a program from the algorithm memory 115 upon request from the processor 110, and send the program to the processor 110.

As shown in FIG. 20, to use any of operations corresponding to algorithms, respectively, held in th algorithm memory 115 of the management center 103, the user of the processor 110 will first give a designation for selection of any of the precesses. Given the user's designation, the MPU 112 of the processor 110 makes a request to the management center 103 for a processing method (algorithm).

Upon reception of the request for sending of the algorithm, the process management processor 114 of the management center 103 checks, based on the authentication information stored in the authentication memory 104, whether the processor 110 having made the request is a processor under the management of the process management processor 114, that is, whether the processor 110 having made the request is an authorized one (authorized user). Making sure in the authentication that the processor 110 is an authorized one (authorized user), the process management processor 114 reads an operating procedure (program) from the algorithm memory 115, compresses, for example, the program and encrypts it as necessary, and sends it to the processor 110.

Receiving the compressed and encrypted program sent from the process management processor 114, the MPU 112 of the processor 110 defreezes and decrypts the program and stores the program into the memory 111. Thereafter, the MPU 112 uses the program stored in the memory 111 to make an operation. Thus, the user's desired operation will be effected. Note that after thus effected, the program stored in the memory 111 will destruct itself or automatically be erased against re-use.

Also, the process management processor 114 of the management center 103 sends, to the charge computation system 106, information (usage history) indicative of the processor (user) having sent the program and method for effecting the program (algorithm). Receiving the usage history, the charge computation system 106 uses th table held in the charge computation table 107 to compute a charge for the use of the process (algorithm). Thereafter, the charge computation system 106 will send a request to the user of the processor 110 for payment of the charge on an on-line or off-line basis.

Next, there will be described with reference to each of FIG. 21 and subsequent drawings a charging which will be made in case the aforementioned charging model is applied to an actual charging system, that is, for example a charging for data service to the terminals 1 and 2 and also for data transmission/reception between the terminals 1 and 2, made via the management center 103 in FIG. 1.

In the example shown in FIG. 1, the data mount of an image sent and received is a problem as having previously been described, and in the aforementioned example, the data amount is controlled by dividing an image into a background, object and appended information and hierarchically encoding them. In the following example, however, for controlling the data amount, an appropriate one corresponding to a user-demanded image quality is selected from among different image compression algorithms and image data compressed by the use of the selected algorithm is sent and received. Note that in this embodiment, the different algorithms for the image compression include algorithms for sub sample compression, object encoding-compression, classification-adaptive predictive compression and others (MPEG compression, for example) in addition to the hierarchical encoding algorithm.

According to the present invention, the above algorithms further include, in addition to the above image compression algorithms, algorithms in all layers (software layer) such as an algorithm for automatic selection (optimization) of any of the image compression algorithms correspondingly to a situation, an algorithm for predicting an area (focus of interest) the user is interested in in an image by learning as having previously been described with reference to FIGS. 16 to 18, an algorithm for automatic control of the power consumption of the system. That is, the software used in the system consists of for example a hardware control software, OS (operation system), application software, etc. In this embodiment, however, it is possible to select different algorithms in the application software layer such as the image compression algorithms, automatic algorithm selection (optimization) algorithm and interesting-focus predictive algorithm as well as different algorithms in the hardware control software layer such as the automatic power-consumption control algorithm and a control algorithm for control of switching between various kinds of hardware.

According to the present invention, a desired one is selected from among the plurality of different algorithms, a charging will be made for the selected algorithm. Note that the amount charged for each algorithm is defined by a sum of charges for algorithm selections made in respective layers.

Figure 21:
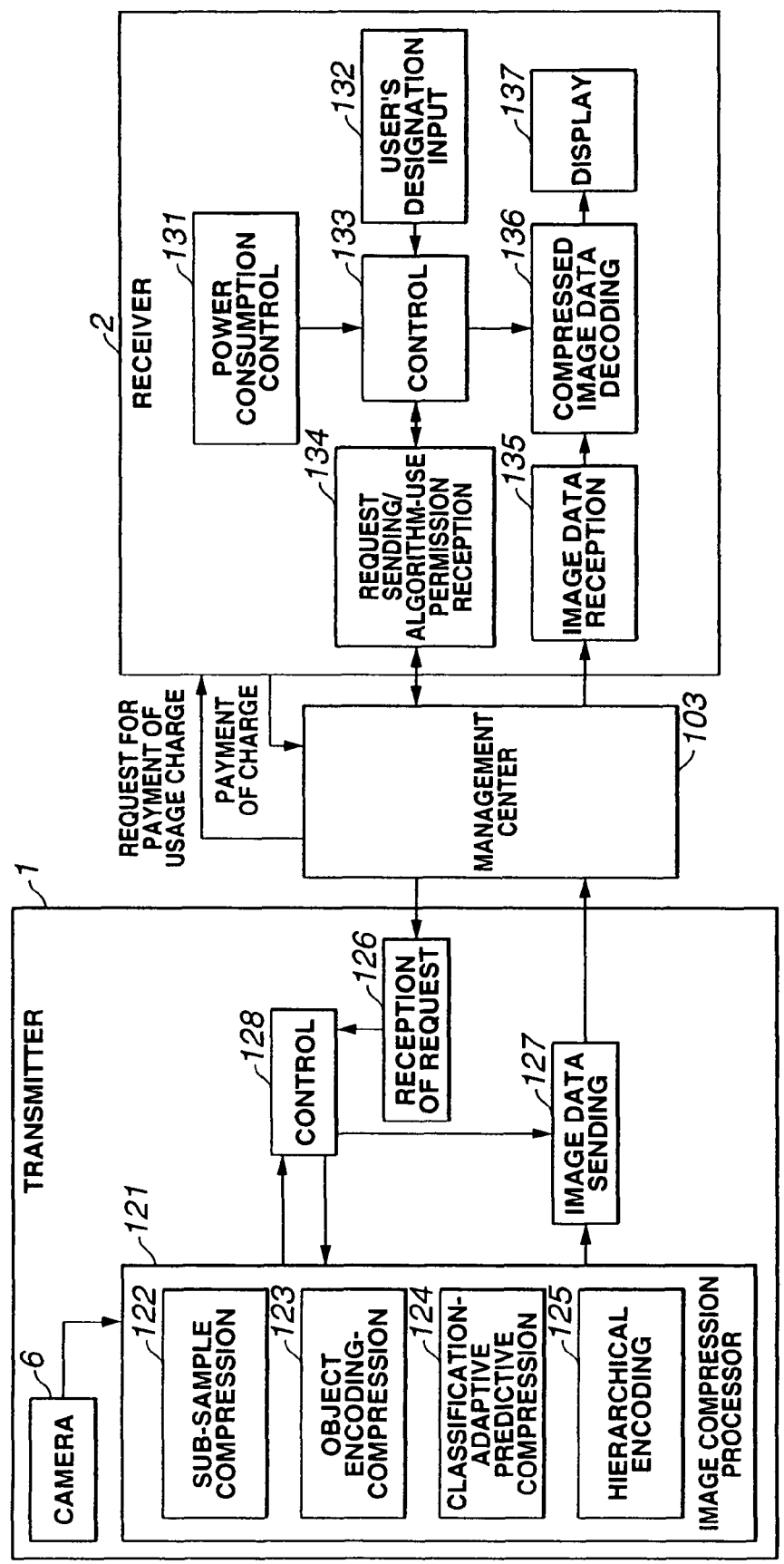
FIG. 21 is a block diagram of the essential portion of the transmitter and receiver, intended for an actual data communication system having the charging model applied therein.

FIG. 21 shows, by way of example, the construction of the essential portion of a system in which an appropriate algorithm selected from among the different image compression algorithms correspondingly to the image quality demanded by the user can be used to compress image data and send/receive the compressed image data. For the simplicity of the illustration and explanation, FIG. 21 shows only the essential portion of the system configured by applying the charging model according to this embodiment to the system shown in FIG. 1, with omission of the other construction of the transmitter 1 and receiver 2 in FIG. 1. The transmitter 1 and receiver 2 are basically identical in construction to each other. However, FIG. 21 shows the construction of only the essential portion of the transmitter 1 for sending image data in response to a sending request from the receiver 2 and also the construction of only the essential portion of the receiver 2 for receiving a user's request and image data sent in response to the request.

As shown in FIG. 21, the transmitter 1 includes mainly the video camera 6 (equivalent to the aforementioned image input unit 11) for acquisition of image data, an image compression processor 121 having provided therein a sub sample compression unit 122 to effect the sub sample compression algorithm, object encoding-compression unit 123 to effect object ecoding-compression algorithm, classification-adaptive predictive compression unit 124 to effect the classification-adaptive predictive compression and the hierarchical encoder 125, an image data transmission unit 127 to send compressed image data, a request receiving unit 126 for receiving a signal of request for sending image data, and a controller 128 to control, upon reception of the request for image data sending, the image compression processor 121 in response to the sending request, automatically select (optimize) an optimum one of the image compression algorithms as necessary and predict a focus of user's interest.

Also as shown in FIG. 21, the receiver 2 includes a user's designation input unit 132 to input a selection by the user (input for image quality selection in this embodiment), a controller 133 to select any of the image compression algorithms based on a selection entered by the user and generate a signal for requesting any one of the algorithm for automatic selection (optimization) of an image compression algorithm according to a situation, algorithm for prediction of an area (focus of interest) the user is interested in in an image, algorithm for automatic control of the power consumption of the system, etc., a request sending/algorithm-use permission reception unit 134 to send the request signal to the management center 103 and receive an algorithm-use permission signal from the management center 103, a power consumption controller 131 to control the system power consumption when the automatic power-consumption control algorithm, an image data reception unit 135 to receive the compressed image data sent from the management center 103, a compressed data decoder 136 to decode the received compressed image data correspondingly to the algorithm used to compress the received image data, and a display unit 137 (equivalent to the display unit 7) to display the decoded image.

Note that the system shown in FIG. 21 has pre-stored therein the plurality of methods as in the model shown in FIG. 19 but it may be adapted to acquire a method from the management center 103 when necessary as in the model shown in FIG. 20. Therefore, the management center 103 will have any or both of the constructions shown in FIGS. 19 and 20 depending upon which is adopted, the model in FIG. 19 or 20.

As shown in FIG. 21, when the receiver 2 acquires image data picked up by the video camera 6 of the transmitter 1, a user's designation signal is supplied from the user's designation input unit 132 of the receiver 2. Note that the criteria of the designations for input of a user's designation (criteria for selection of an algorithm) include a demanded image quality (performance of processing result), processing speed, processing time, processing result, charge for the algorithm use, power consumption, etc.

Also, the function of designating a position in an image by mouse clicking, disclosed in the aforementioned PCT Published Unexamined Application No. WO01/11889A1 is owned by the user's designation input unit 132. This function can also be used to predict a focus of user's interest and designate only an image block around a point designated by mouse clicking as a data area to be subjected to signal processing.

Supplied with a designation signal for requesting a desired image quality from the user's designation input unit 132, the controller 133 generates a signal for requesting an algorithm for an image compression permitting the image quality corresponding to the designation signal and sends it to the request sending/algorithm-use permission reception unit 134. The request sending/algorithm-use permission reception unit 134 sends the request signal to the management center 103 via a base station, exchange or the like (not shown). Note that it is assumed that an initialization such as securing a communication path has been ended at this time.

Upon reception of the request signal, the management center 103 checks whether the receiver 2 having send the request signal is under the management of the management center 103, that is, whether the receiver 2 having sent the request signal is an authorized one (authorized user). When the receiver 2 is checked to be an authorized one, the management center 103 sends the request signal to the transmitter 1 via the base station, exchange or the like (not shown) and an algorithm-use permission signal to the receiver 2.

Receiving the selection signal, the request reception unit 126 of the transmitter 1 sends the request signal to the controller 128. The controller 128 will analyze the content of the selection signal and select, based on the result of the analysis, any of the sub sample compression, object encoding-compression, classification-adaptive predictive compression and hierarchical encoding algorithms for compression of image data acquired by the video camera 6, and put any one of the units 122 to 125, corresponding to the selected algorithm.

Thus, the image data compressed by the image compression processor 121 is sent to the image data transmission unit 127. The image data transmission unit 127 sends the compressed image data to the receiver 2 via the base station, exchange or the like (not shown) under the control of the controller 128. Note that the compressed image data supplied from the transmitter 1 may be sent to the management center 103 once, and then it may be sent from the management center 103 to the receiver 2 via the base station, exchange or the like (not shown).

Receiving the compressed image data, the image data reception unit 135 of the receiver 2 sends the received compressed image data to the compressed image data decoder 136. Under the control of the controller 133, this compressed image data decoder 136 uses a decoding algorithm corresponding to the image compression algorithm selected and allowed in advance for use to decode the compressed image data, and sends the decoded image data to the display unit 137. Thus, the display unit 137 will display thereon an image picked up by the video camera 6 of the transmitter 1.

In the receiver 2, when supplied, from the user's designation input unit 132, with a user's designation signal for designating the algorithm for automatic selection (optimization) of any of the image compression algorithms according to a situation or the algorithm for prediction of an area (focus of interest) the user is interested in in an area, the controller 133 will generate, based on the designation signal from the user's designation input unit 132, a signal of request for the automatic algorithm selection (optimization) algorithm or interesting-focus prediction algorithm, and send it to the request sending/algorithm-use permission reception unit 134. Thus, the request sending/algorithm-use permission reception unit 134 will send the request signal to the management center 103.

The management center 103 authenticates the request signal, and then sends the request signal to the transmitter 1 and algorithm-use permission signal to the receiver 2.

The controller 128 in the transmitter 1 analyzes the content of the request signal, automatically selects any of the sub sample compression, object encoding-compression, classification-adaptive predictive compression and hierarchical encoding algorithms and predicts a focus of user's interest (user-interesting object image), based on the result of analysis, to control the image compression processor 121 to improve the image quality by making the compression rate higher for the user-interesting object image than for the other images. Thus, the image data compressed by the image compression processor 121 is sent from the image data transmission unit 127 to the image data reception unit 135 of the receiver 2 via the base station, exchange or the like.

At this time, the compressed image data decoder 136 of the receiver 2 will use the decoding algorithm corresponding to the image compression algorithm automatically selected by the automatic algorithm selection algorithm, under the control of the controller 133, to decode the compressed image data and send the image data to the display unit 137.

At the receiver 2, when supplied with a user's designation signal for designating the automatic power-consumption control algorithm from the user's designation input unit 132, the controller 133 sends an inquiry signal for permission of using the automatic system power consumption control algorithm to the management center 103 via the request transmission unit 134. Receiving a permission signal in response to the inquiry signal from the management center 103, the receiver 2 will be able to use the power consumption control algorithm and the power consumption controller 131 will automatically control the power consumption of this system.

Simultaneously with or after the aforementioned operation, the management center 103 uses the receiver (user) having sent the algorithm-use permission and usage history information on processes of which the use has been permitted, namely, on the image compression algorithms, automatic algorithm selection (optimization) algorithm, interesting-point prediction algorithm, automatic power-consumption control algorithm, etc. to compute a charge to the user of the receiver 2 for the use of the algorithms and request the user for payment of the charged amount. Thus, the user of the receiver 2 will pay, to the management center 103, an amount corresponding to the request for payment of usage charge Note that in the example in FIG. 21, the operations made according to each image compression algorithm, automatic algorithm selection (optimization) algorithm and to user-interesting point prediction algorithm are actually effected in the transmitter 1 but since it is the receiver 2 that selects such algorithms and benefits by them, the charge for the use of the algorithms will be made to the receiver 2 (user) benefits by the algorithms.

The charge for the use of the algorithms is defined by a sum of charges made for requests in the respective layers. Therefore, in case only the image compression algorithms have been used, there will be computed a charge preset for the use of each of the sub sample compression, object encoding-compression, classification-adaptive predictive compression and hierarchical encoding algorithms. Also, in case for example the automatic algorithm selection (optimization) algorithm has been used, charging will be made with a charge for the use of an image compression algorithm selected according to the automatic algorithm selection (optimization) algorithm, added to the charge for the use of the automatic algorithm selection (optimization) algorithm. Similarly, when the user-interesting point prediction algorithm and automatic power-consumption computation algorithm have been used, charging will be made with addition of the charges for the use of these algorithms. Note that a request for payment of the charges may be made on the basis of the result of charge computation to the user consecutively or collectively for a certain period. Also the charging may be made proportionally to a time for which the algorithms have been used.

In this embodiment, a request for payment of a charge is made to the user of the receiver 2 from the management center 103 on an on- or off-line basis, and the user responds to the request to pay the charged amount to a designated account or the like on an on- or off-line basis. Alternatively, the management center 103 may be adapted to have pre-stored therein a number of account for each identifier of the user of the receiver 2 and a number of account of thereof, and the charge computation system 106 may be adapted to compute a charge to the user correspondingly to the request signal from the user of the receiver 2 and send, to an external payment sensor, at least the user's number of account, account number of the management center 103 and money amount information corresponding to an amount charged to the user, whereby the charge can instantly be paid.

Note that the user of a receiver has only to designate his request such as a request for the image quality for example, and may not always be conscious of his own selection of algorithms.

Figure 22:
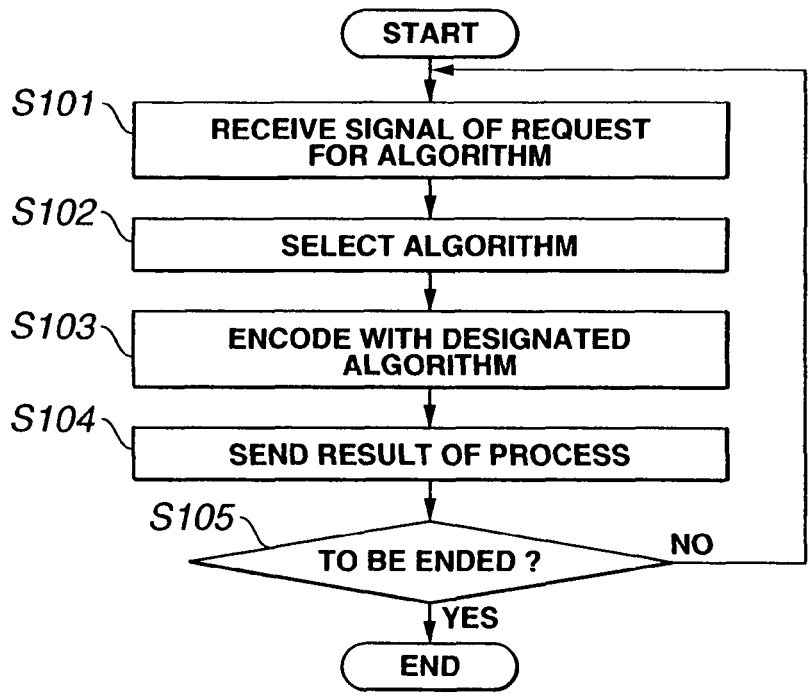
FIG. 22 shows a flow of operations made in the transmitter in FIG. 21, intended for the actual data communication system having the charging model applied therein.

Next, FIG. 22 shows a flow of operations of the transmitter 1 for example in FIG. 21.

As shown in FIG. 22, first in step S101, the request reception unit 126 waits for reception of a signal of request for the algorithms, and upon reception of the request signal, it will send the request signal to the controller 128.

Receiving the signal of request for the algorithms, the controller 128 controls, in step S102, the image compression processor 121 to make a selection between algorithms. That is, the controller 128 controls the image compression processor 121 to use any one of the units 122 to 125, which corresponds to an algorithm designated by the request signal.

When an algorithm is selected by the controller 128, the image compression processor 121 encodes image data (by compression) by the unit for the designated and selected algorithm, and sends the encoding-compressed image data obtained to the image data transmission unit 127, in step S103.

In step S104, the image data transmission unit 127 sends the compressed image data from the image compression processor 121 to the receiver 2 via the base stations 3 and 5, exchange 4 and management center 103.

Thereafter, the transmitter 1 (controller 128 for example) judges, in step S105, whether the process is to be ended. If the judgement is that the process is not to be ended, the transmitter 1 goes back to step S101. If it is judged that the procedure is to be ended, the process in the transmitter 1 in FIG. 22 is ended.

Figure 23:
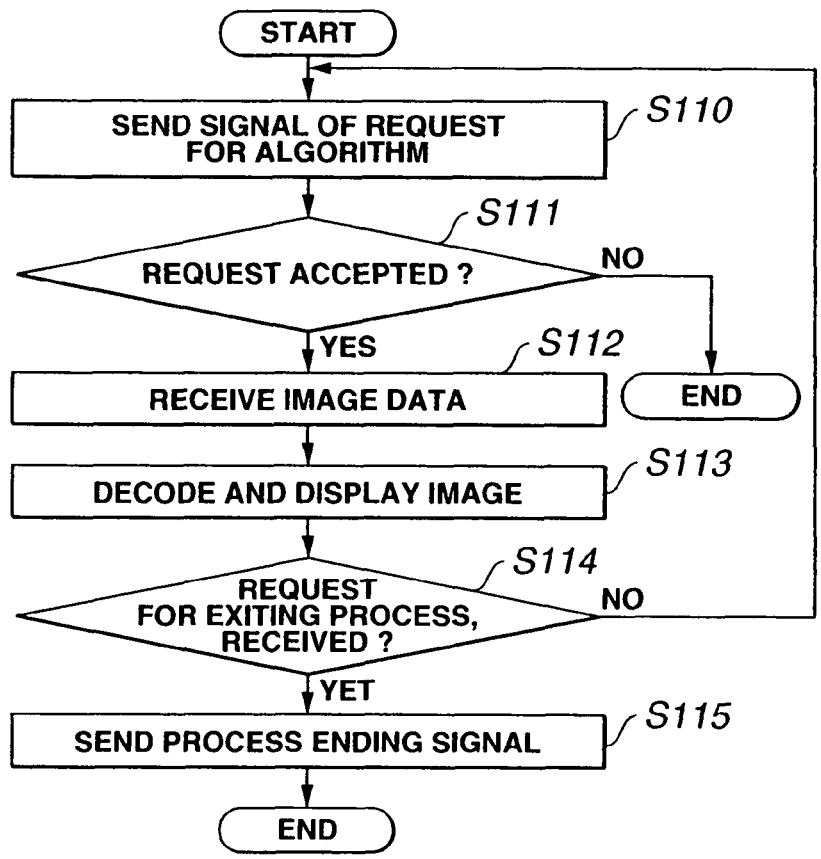
FIG. 23 shows a flow of operations made in the receiver in FIG. 21, intended for the actual data communication system having the charging model applied therein.

Next, FIG. 23 shows a flow of operations of the receiver 2 in FIG. 21.

As shown in FIG. 23, first when a user's designation signal for designation of for example the image quality is supplied from the user's designation input unit 132 and a request signal (signal indicative of an algorithm to be used) is generated by the controller 133, the request signal is sent, in step S110, from the request sending/algorithm-use permission reception unit 134 to the management center 103.

After sending the request signal, the controller 133 checks whether the request sending/algorithm-use permission reception unit 134 has received the algorithm-use permission signal from the management center 103. When the request sending/algorithm-use permission reception unit 134 has received an algorithm-use inhibition signal or has not received the algorithm-use permission signal in a predetermined time, the controller 133 exits the procedure. On the other hand, when the request sending/algorithm-use permission reception unit 134 has received the algorithm-use permission signal from the management center 103, it will be supplied with compressed image data from the transmitter 1.

The image data reception unit 135 waits for arrival of compressed image data. Upon reception of compressed image data in step S12, the image data reception unit 135 will send the compressed image data to the compressed image data decoder 136.

Upon reception of the compressed image data, the compressed image data decoder 136 decodes the compressed image data by reversely following the image data compressing procedure, and sends the decoded image signals to the display unit 137. Thus, an image is displayed on the display unit 137. The above are done in step S113.

Thereafter in step S114, the controller 133 judges whether a request for exiting the procedure has been sent from the user's designation input unit 132. If no ending request has not been made sent from the user's designation input unit 132, the procedure returns to step S110. If the ending request has been sent, an ending signal is generated in step S115 and sent to the management center 103 via the request sending/algorithm-use permission reception unit 134. Th management center 103 will have the transmitter 1 end the transmission, whereby the procedure is ended.

Figure 24:
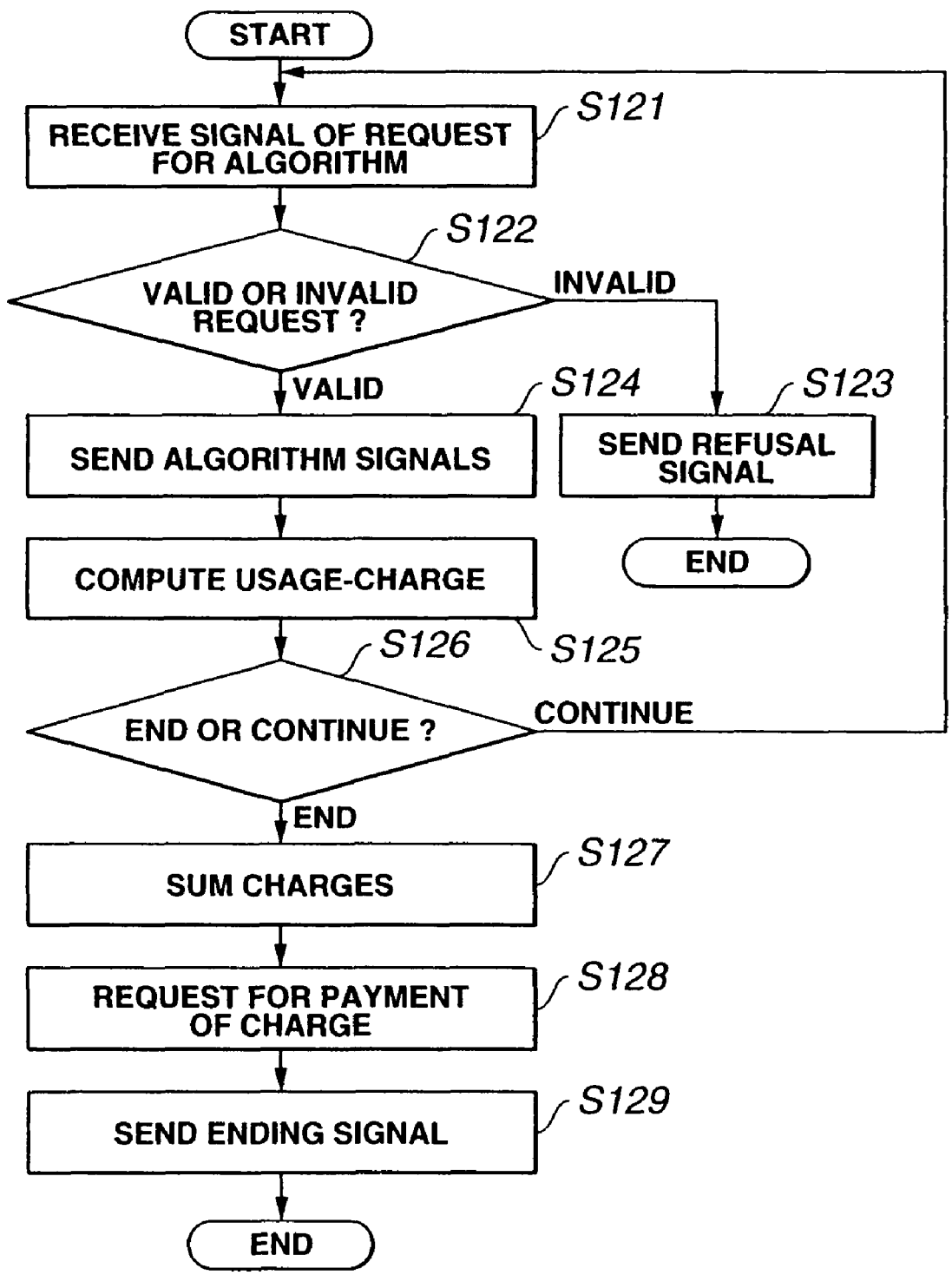
FIG. 24 shows a flow of operations made in the management center in FIG. 21, intended for the actual data communication system having the charging model applied therein.

FIG. 24 shows a flow of operations of the management center 103 shown in FIGS. 21 and 19. Note that the operations will be explained with reference to the internal construction of the management center 103 in FIG. 19 wherever appropriate.

First in step S121 in FIG. 24, the management system 105 waits for arrival of a signal of request for an algorithm (algorithm requesting signal) from the receiver 2. Upon reception of the request signal, the management system 105 uses, in step S122, information held in the authentication memory 104 to judge whether the request from the receiver 2 is valid or not. If the request from the receiver 2 is judged in step S122 to be invalid, the management system 105 sends an inhibit signal as a refusal signal, and then exits the procedure.

On the other hand, if in step S122 the request is judged to be valid, the management system 105 sends the request signal (signal indicative of a requested algorithm) to the transmitter 1, and information indicative of the requested algorithm and receiver 2 to the charge computation system 106.

Receiving the information indicative of the request algorithm and receiver 2 from the management system 105, the charge computation system 106 uses, in step S125, the information and the usage-charge computation table in the charge computation table 107 to compute a charge.

Thereafter, the management system 105 judges whether an ending signal has arrived from the receiver 2. When no ending signal has been received, the procedure returns to step S121 to continue the operation.

In step S126, it is judged whether the transmission is to be ended or continued. If the judgment in step S127 is "end", the charge computation system 106 sums the amounts charged for the use of respective processes, and requests, in step S128, the user of the receiver 2 for payment of the sum of charged amounts. The request may not be made on an on- or off-line basis to the user but may be send the user's number of account, account number of the management center 103 and charged amount information to an external payment center under the control of the controller 133.

Thereafter, the management system 105 sends an ending signal to the transmitter 1 to end the process in FIG. 24. Note that operations in steps S127 and S128 may be done after completion of an operation in step S129.

Next, a flow of operations made according to the automatic algorithm selection (optimization) algorithm will be described with reference to the flow chart in FIG. 25.

The algorithm selection or optimization method varies depending upon on what the selection or optimization is effected. In the above description, the user selects an image compression algorithm on the basis of image quality which can be attained by the algorithm. However, there will be described an example of process (algorithm) selection made on the basis of how low the usage charge is for the use of the automatic algorithm selection (optimization). That is, according to the automatic algorithm selection (optimization) algorithm, there will first be selected an algorithm whose usage charge is lowest. Note that although in this embodiment, an image compression algorithm is automatically selected but the present invention is not limited to this example but any algorithm may automatically be selected (optimized) while the criterion of optimization is not limited to the usage charge but it may be image quality, processing time, data transfer time or the like.

Figure 25:
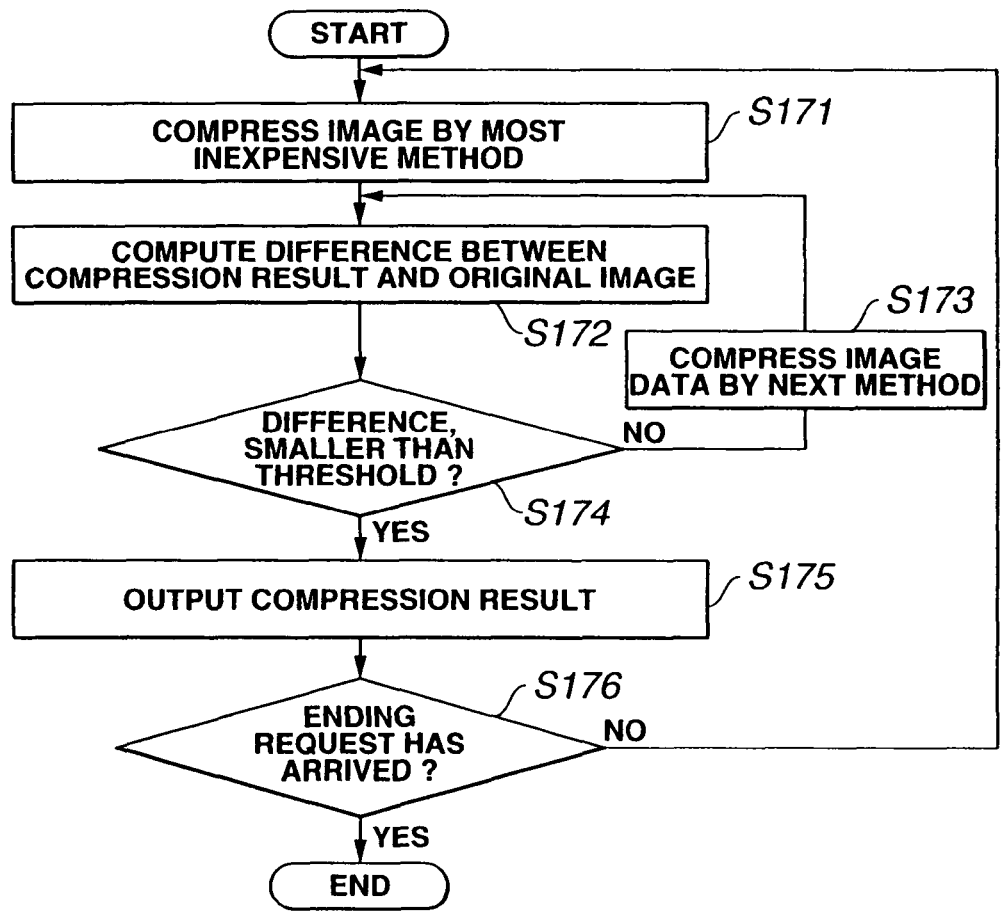
FIG. 25 shows a flow of operations made according to the optimization algorithm intended for automatic selection of an algorithm.

When a designation to select an algorithm for optimization of image compression for example is supplied from the receiver 2, the controller 128 in the transmitter 1 in FIG. 21 will select, in step S171 in FIG. 25, a one, which can be used with the lowest charge, of the sub sample compression, object encoding-compression, classification-adaptive predictive compression and hierarchical encoding algorithms. Thus, in the image compression processor 121, image data are compressed by a compression unit corresponding to the algorithm of which the usage charge is smallest. It is assumed here that the usage charge is determined on the basis of the level, for example, of the image data compression and that the usage charge for the sub sample compression algorithm which provides the simplest compression is 100 yens per use, that for the object encoding-compression algorithm which provides a next simplest compression is 200 yens per use, that for the hierarchical encoding algorithm which provides a higher-level process is 300 yens per use and that for the classification-adaptive predictive compression algorithm which provides the highest-level process is 400 yens per use. In this case, since the usage charge for the sub sample compression algorithm is smallest, the sub sample compression unit 122 in the image compression processor 121 is selected in step S171 to compress the image data.

Next, in step S172, in the image compression processor 121 computes a difference between an original image and an image obtained by decoding (by a local decoder) data having been compressed according to the selected image compression algorithm, and returns the difference to the controller 128.

Supplied with the difference, the controller 128 will judge, in step S174, whether the difference is smaller than a predetermined threshold.

If the difference is not smaller than the predetermined threshold, it means that the quality of an image resulted from the compression with the selected image compression algorithm is lower than the limit. Therefore, in this case, the controller 128 will select an image compression algorithm which will assure better image quality. If the sum sample compression algorithm has been selected during the precedent selection of image data compression algorithm, the controller 128 will select the object encoding-compression algorithm whose level is higher than the sub sample compression algorithm. Thereafter, in the image compression processor 121, the newly selected algorithm is used to compress image data, and then a difference between the original image and image resulted from the compression, and the controller 128 will judge again whether the difference is lower than the predetermined threshold. This series of operations will be repeated until the difference becomes smaller than the predetermined threshold.

If the difference is judged in step S174 to be smaller than the predetermined threshold, the image compression processor 121 will send, in step S175, image data having been compressed according to the selected image compression algorithm via the image data transmission unit 127.

Assume here that the compression parameters in each of the image compression algorithms take default values. That is, with the compression parameters (quantization coefficient, quantization bit, sampling frequency and bit rate) being as default values, the compression ratio of a natural image in each algorithm will be set to ½ or so.

Thereafter, the controller 128 will judge, in step S176, whether an ending request has been made from the receiver 2. If the request has not arrived, the procedure returns to step S171. If the request has been made, the process is ended. The above are the operations which will be made when it is designated that the automatic algorithm selection (optimization) algorithm is should be selected.

In this case, the receiver 2 will be requested to pay a sun of an amount charged for the use of the image compression algorithm having been selected when the difference is smaller than the predetermined threshold and an amount charged for the use of the automatic algorithm selection (optimization) algorithm.

Note that the predetermined threshold on which the image quality depends can be determined in a plurality of manners. For example, a threshold may be pre-determined or a processed or compressed image is provided to the user for determination of a threshold.

As having been described in the above with FIG. 25, an image compression algorithm finally selected through study of the image quality obtained by compressing an image once (by comparison in performance) is taken as an optimum algorithm for compression of image data. By detecting feature of an image in advance, however, it is may be judged based on the image feature which one is most optimum. It is not expectable that use of a simple compression algorithm with for example an image whose values of brightness, motion, color, etc. vary greatly (high-activity image) will assure sufficient quality of the image. To solve this problem, a higher-level compression algorithm may automatically be selected for such an image. Also, a suitable compression algorithm for an image can automatically be selected by detecting as a feature of the image whether the image is a CG (computer graphics) image or whether the image is a computer-game image. In this case, since image compression is not tried repeatedly, so the processing speed can be higher than in the method in which the image compression algorithms are selected one after another starting with the one whose usage charge is the lowest. By presetting a relation between an image feature and compression algorithm, it is possible to speedily select an optimum compression algorithm.

Next, of the aforementioned image compression algorithms, the sub sample compression algorithm will further be described. The sub sample compression algorithm is such that the number of pixels forming an image is reduced by thinning out them at a rate of one per two pixels for example. Of course, the thinning-out of pixels may be done at a rate of one per three, one per four or the like.

Next, the object encoding included in the image compression algorithms will be described.

The object encoding is such that a portion of an image which does not vary so much as the time elapses is extracted as an object image and information on the object image is sent once but not sent thereafter while position information (and motion information) on the object image is sent, thereby compressing the information. Note that the object may be regarded as generally the same as the object having previously been described with reference to FIG. 2.

In sending for example a moving picture, it will lead to a waste of a transmission band to send image data on an object image which will not vary at all. Therefore, by not sending again an object image data sent once, the information can be sent in a considerably reduced amount.

Figure 26A:
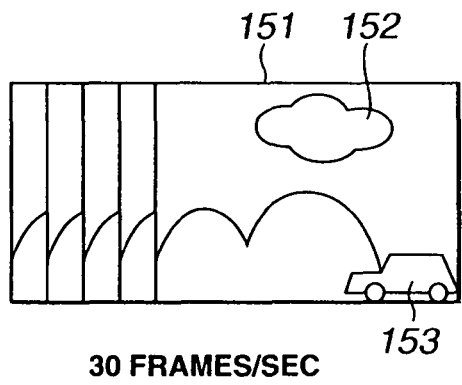
FIGS. 26A and 26B explain an object extracted from an image and its motion.
Figure 26B:
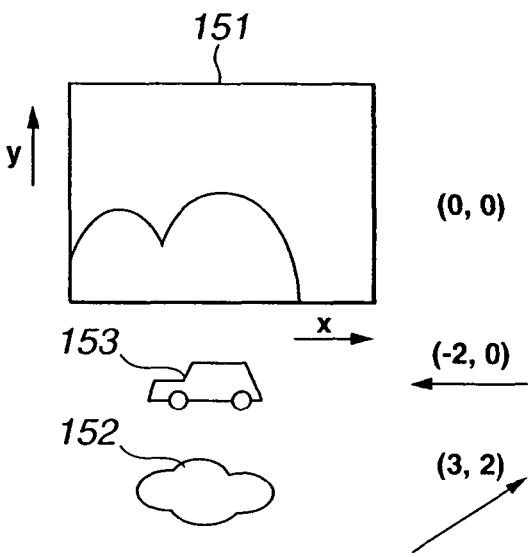

The object encoding will further be described with reference to FIG. 26. For this explanation, it is assumed that there is a moving image consisting of 30 frames/sec, each frame including a background 151 consisting of a stationary sky and mountain, a moving cloud 152 and a moving car 153 as shown in FIG. 26A. As shown in FIG. 26B, an object image of the background 151, an object image of the car 153 and an object image of the cloud 152 will be extracted from one frame of the image. By this object encoding, a movement vector indicative of a direction and amount (distance) of an image movement can be determined for each object by block matching between image frames in FIG. 26A. In the example shown in FIG. 26B, it is assumed that the movement vector of the stationary background 151 is $(x, y)=(0, 0)$, the movement vector of the car 153 is (x, y)=(−2, 0) indicating that the car 153 moves by −2 in the x-direction while it does not move in the y-direction and the movement vector of the cloud 152 is (x, y)=(3, 2) which indicates that the cloud 152 moves by 3 and 2 in the x- and y-directions, respectively. With the object encoding, information on the shape of each of the objects including the background 151, car 153 and cloud 152 is acquired and sent, and then the initial position information on each object and movement vector of each frame is sent or the position information on each frame is sent, whereby the amount of data to be sent can considerably be reduced. On the other hand, at the receiving side, an image is reproduced from the shape information on the objects and position information on each frame or movement vectors.

Figure 27:
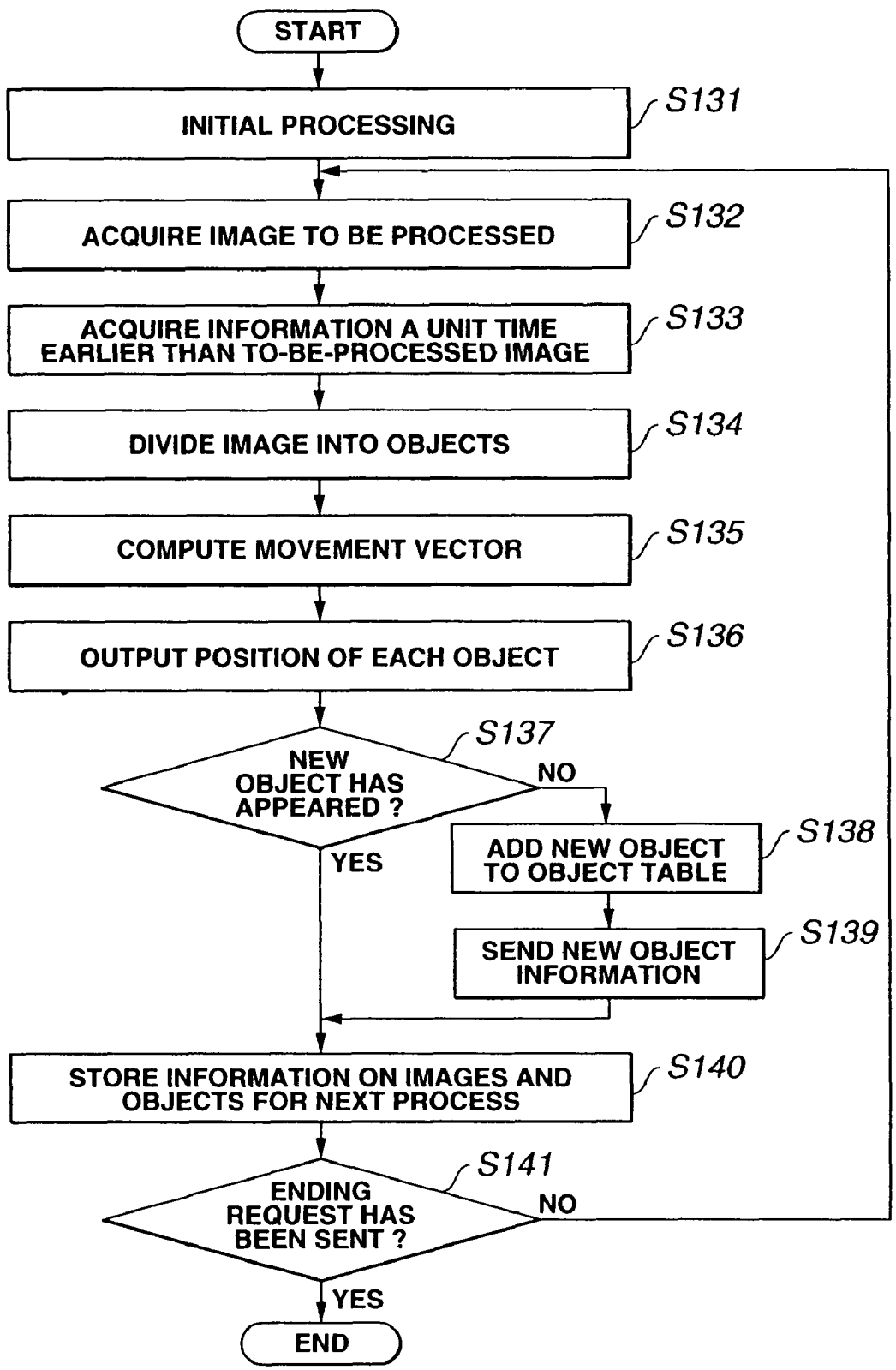
FIG. 27 shows a flow of operations made in the object encoding-compression.

FIG. 27 shows a flow of operations of the object encoding-compression unit 123 in FIG. 21 for the above object encoding.

As will be seen in FIG. 27, first, when the compression by the object encoding-compression unit 123 is selected by the controller 128, the object encoding-compression unit 123 makes an initial processing in step S131. By the initial processing, initial image data are acquired from the video camera 6, objects included in the image are extracted as object images, and data (shape information etc.) for use in subsequent processes are taken into an object table and held.

After the initial processing in step S131, the object encoding-compression unit 123 goes to step S132 where it will acquire to-be-processed image data one after another from the video camera 6, and further goes to step S133 where it will acquire information on object images already held in the object table, such as unit-time (ex. one frame) earlier images.

Next, in step S134, the object encoding-compression unit 123 divides the current image into object images corresponding to object images held in the object table. In this process, for example portions identical in color to the object images held in the object table are taken as the same images, and objects are extracted based on the previously described click data.

Then, in step S135, the object encoding-compression unit 123 extracts, by computation, information on movement (movement vector) between object images held in the object table and those in the current frame, and sends the movement vector along with the initial position information to the receiver 2 in step S136. In the aforementioned example, the movement vector is determined by the block matching. In this process, however, since the object images are already extracted and held in the object table in step S134, it is possible to accurately determine the movement by matching each of the object images with the object images held in the object table.

In step S137, the object encoding-compression unit 123 checks if there have appeared new object images other than the object images already extracted and whose information are held in the object table. If no new object images are detected in this step S137, the object encoding-compression unit 123 goes to step S140. On the contrary, if any new object images are detected, the object encoding-compression unit 123 goes to step S138 where it will add information on the new object images to the object table, and further goes to step S139 where it will send, to the receiver 2, the information on the new object images (such as object image data, initial position information, movement vector information, etc.). After the process in this step S139, the object encoding-compression unit 123 goes to step S140.

In step S140, the object encoding-compression unit 123 stores, for a next process, object images in the current frame and position information or movement vector information on the object images to the object table. Then, it goes to step S141 where it will judge whether an ending request has been sent from the receiver 2. When the ending request has not been sent, the procedure returns to step S132. When the ending request has been sent, the object encoding-compression unit 123 exits the process. The flow of operations for compression of an object by encoding has been described in the above.

Next, the construction and operations of the classification-adaptive predictive compression unit 124 in FIG. 21 will further be described.

First, description of an image with the use of a time-space model will be described herebelow with reference to FIG. 28.

In FIG. 28, T1 and T2 indicate two frames temporally continuous with each other. T1 indicates a past frame while T2 indicates a current frame. In these frames, there are shown pixels used to generate and classify an estimated value. In FIG. 28, a future pixel indicated with a symbol "×" in the current frame is represented by a linear primary combination model of the number $\underline{n}$ of taps of values xi and coefficients wi (where i=1, 2, . . . , n) shown in FIG. 28. The coefficient is a predictive coefficient. A set of coefficients is defined for each frame or class so that a square of a difference from a true value of an estimated value $\underline{y}$ of a future pixel represented by the linear primary combination of the values xi ad coefficients wi of the pixels is minimum as the result of a computation by the least-square method.

In the time-space model shown in FIG. 28, the number of taps is n=16. The predicted value $\underline{y}$ of the future pixel in the current frame T2 is represented by a linear primary combination model w1×1+w2×2+ . . . +w16×16 of 16 taps of input pixels. For a coefficient wi in the linear primary combination model, a value is determined which results in a minimum difference between an actual value and estimated value represented by the linear primary combination model.

For determination of the above yet-to-set coefficient wi, an expression of the linear primary combination model is generated in which values xi (i=1, 2, . . . , n) of each pixel shown in FIG. 28, which be when the input images Ere shifted each by one pixel in the spatial direction (horizontally and vertically) and actual values yj (j=1, 2, . . . , m) of images to be predicted are placed. For determination of a set of coefficients for one frame for example, input images are shifted each by one pixel to generate a great number of expressions, that is, simultaneous equations (will be referred to as "observation equation) for the number $\underline{m}$ of pixels in one frame. For 16 coefficients, it is necessary to provide at least 16 simultaneous equations. The number $\underline{m}$ of the simultaneous equations can appropriately be selected based on the balance between the accuracy and processing time. The observation equation is given by the following expression (1) below:

$$XW=Y \tag{1}$$

where each of X, W and Y is a matrix as given by the following equations (2):

$$X = \begin{bmatrix} X_{11} X_{12}, \ldots X_{1n} \\ X_{21} X_{22}, \ldots X_{2n} \\ \ldots \\ X_{m1} X_{m2}, \ldots X_{mn} \end{bmatrix}, W = \begin{bmatrix} W_1 \\ W_2 \\ \ldots \\ W_n \end{bmatrix}, Y = \begin{bmatrix} y_1 \\ y_2 \\ \ldots \\ y_m \end{bmatrix} \tag{2}$$

A coefficient $\underline{w}$ which will provide a minimum error with respect to an actual value is deteimined by the least square method. To this end, a following residual equation (3) is prepared by adding a residual matrix E to the right side of the observation equation. That is, the least square method is used to determine a square of elements in the residual matrix E in the residual equation, namely, a coefficient matrix W which provides a minimum error.

$$YW = Y + E, E = \begin{bmatrix} e_1 \\ e_2 \\ \ldots \\ e_m \end{bmatrix} \quad (3)$$

The requirement for finding the most probable value of each element ori in the coefficient matrix W from the residual equation (3) is to minimize the sum of squares of m residuals corresponding to the pixels in an image block: The requirement is given by the following equation (4):

$$e_{1\times}\partial e_1/\partial w_i + e_2 \times e_2/\partial w_1 + \ldots + e_{m\times}\partial e_m/\partial w_i = 0 (i=1, 2, \ldots, n) \quad (4)$$

Then, it suffices to undetermined coefficients w1, w2, ..., the elements of the coefficient matrix W, which satisfy the above requirements to the number of n. Therefore, the following equations (5) can be obtained from the above residual equation (3):

$$\partial e_i/\partial w_1 = x_{i1}, \partial e_i/\partial w_2 = x_{i2}, \ldots, \partial e_i/\partial w_n = x_{in} (i=1, 2, \ldots, n) \quad (5)$$

By setting i=1, 2, ..., n for the conditions of the equation (4), the following equations (6) are provided:

$$\sum_{i=1}^{n} e_i x_{i1} = 0, \sum_{i=1}^{n} e_i x_{i2} = 0, \ldots, \sum_{i=1}^{n} e_i x_{in} = 0 \quad (6)$$

The following normal equation (7) can be obtained from the equations (3) and (6):

$$\begin{cases} \left(\sum_{j=1}^{m} X_{j1}X_{j1}\right)W_1 + \left(\sum_{j=1}^{m} X_{j1}X_{j2}\right)W_2 + \ldots + \left(\sum_{j=1}^{m} X_{j1}X_{jn}\right)W_n = \left(\sum_{j=1}^{m} X_{j1}Y_j\right) \\ \left(\sum_{j=1}^{m} X_{j2}X_{j1}\right)W_1 + \left(\sum_{j=1}^{m} X_{j2}X_{j2}\right)W_2 + \ldots + \left(\sum_{j=1}^{m} X_{j2}X_{jn}\right)W_n = \left(\sum_{j=1}^{m} X_{ju2}Y_j\right) \\ \vdots \\ \left(\sum_{j=1}^{m} X_{jn}X_{j1}\right)W_1 + \left(\sum_{j=1}^{m} X_{jn}X_{j2}\right)W_2 + \ldots + \left(\sum_{j=1}^{m} X_{jn}X_{jn}\right)W_n = \left(\sum_{j=1}^{m} X_{jn}Y_j\right) \end{cases} \quad (7)$$

The normal equation (7) is a simultaneous equation including unknown quantities just to the number of n. Thus, each unknown coefficient wi being the most probable value can be determined. More accurately, when the matrix as to each undetermined coefficient wi in the normal equation (7) is normal, the coefficient wi can be determined. Actually, the Gauss-Jordan elimination is used to determine the undetermined coefficient wi. In this way, one set of coefficients for representing future pixels is defined per frame. When many frames of an input image are used to make a learning similar to the aforementioned one, a mean coefficient defined for each frame or a coefficient of maximum frequency is stored in a coefficient memory 205 which will further be described later.

In this embodiment, a coefficient determined by the learning is used as a predictive coefficient to make a predictive encoding. In this case, the input image is classified (clustered) for an improved accuracy of estimation. In FIG. 28, pixels indicated with a small circle and small double circle respectively are ones used in the linear primary connection model, and the pixels indicated with the small double circle are ones used in the classification. That is, four of the 16 pixels are used in the classification as well.

If each of the four pixels is of 8 bits, values of the pixels can be combined in a great number of ways, which will not enable any practical classification. To avoid this inconvenience, the number of bits of each pixel is compressed by encoding as will further be described later. More specifically, each pixel is compressed to a code of one bit by the use of ADRC (encoding adaptive to the dynamic range). Thus, it will suffice to classify pixels into 16 classes (which would otherwise be 24 classes). Note that a code indicative of a class is called "index". The number of bits of a pixel may be reduced by the vector quantization, not by the ADRC. In addition, the MSB of each pixel may be collectively taken as the index. The classification with a code of 4 bits, derived from normalization to one bit of 4 pixels near a predictive pixel, will lead to a classification of pixels according to an approximate pattern of a time-space change of an image.

FIG. 29 shows, by way of example, the configuration of the data communication system for a learning to make in the classification. Many stationary image data having different patterns should desirably be supplied to an input terminal 201 in FIG. 29. The input image data are supplied to a time-series conversion circuit 202 and least square computation circuit 203. The time-series conversion circuit 202 will synchronize a plurality of pixel data included in for example raster-scanned input image data and used in the linear primary combination model and classification.

Output data from the time-series conversion circuit 202 are supplied to the computation circuit 203 and classification circuit 204. The classification circuit 204 will generate an index corresponding to a three-dimensional change of the image, and the index is supplied to the computation circuit 203. With respect to the time-series model shown in FIG. 28, the computation circuit 203 will use the aforementioned least square algorithm to determine a set of coefficients wi for each class indicated with the index. The coefficients wi are stored into the coefficient memory 205.

Figure 30:
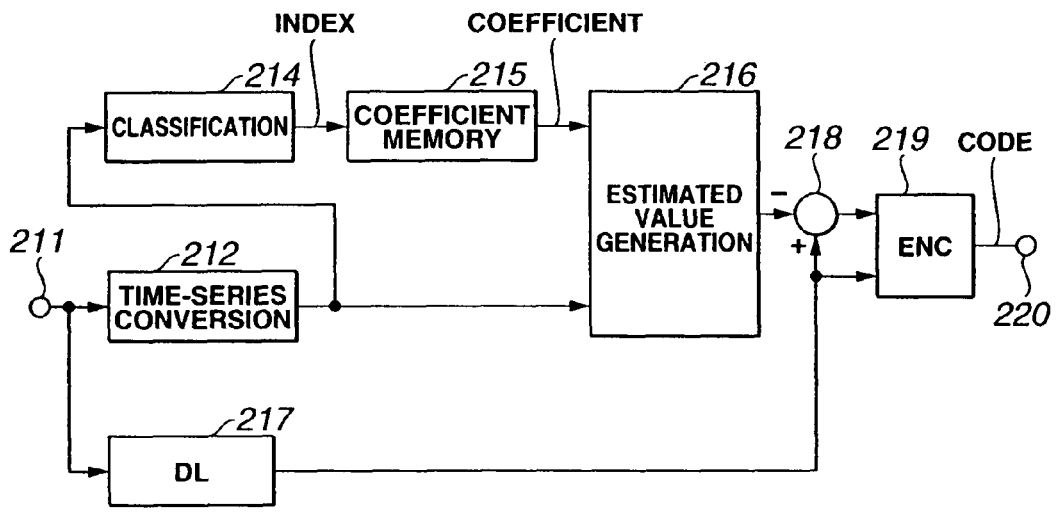
FIG. 30 is a block diagram of an example of the predictive coding circuit for classification-adaptive predictive coding.

FIG. 30 shows, by way of example, the construction of the encoder for the predictive coding according to the present invention.

As shown in FIG. 30, the encoder includes a coefficient memory 215 having stored therein for each class coefficients having been acquired through the above learning. Input image data from an input terminal 211 are supplied to a time-series conversion circuit 212 which provides output data to a classification circuit 214 and estimated value generation circuit 216. The time-series conversion circuit 212 outputs pixel data supplied in the order of raster scanning for example, including pixels having been sent one after another in the past and those which will be sent in the future, together and at a time as shown in FIG. 28. The classification circuit 214 is supplied with 4-pixel data for use in the classification. An index from the classification circuit 214 is supplied to the coefficient memory 215, and a set of coefficients corresponding to a class is read from the coefficient memory 215.

The coefficients thus read from the coefficient memory 215 are supplied to the estimated value generation circuit 216 where an estimated value is generated from the pixel data supplied from the time-series conversion circuit 212. The estimated value is supplied to a subtraction circuit 218 which is also supplied with input image data via a delay circuit 217. The time-series conversion circuit 212, classification circuit 214, coefficient memory 215 and the estimated value generation circuit 216 form together a local decoder. The subtraction circuit 218 generates a difference between an true value (real data) and the estimated value.

The difference is encoded by an encoder 219 for encoding by compression, and an encoded data (code) is delivered at an output terminal 220. For the purpose of the compression-encoding, the number of bits is reduced by the adaptive quantization, and then the data is entropy-encoded with a Huffman code predetermined based on the incidence probability. Further, pixel values themselves are supplied to the encoder 219 for the purpose of refreshing, and they are inserted at each predetermined data to be sent. However, the compression-encoding may be done otherwise. For example, the difference value is blocked, then subjected to an orthogonal transformation like DCT transform and further entropy-encoded. The compression-encoded data output is sent.

Figure 31:
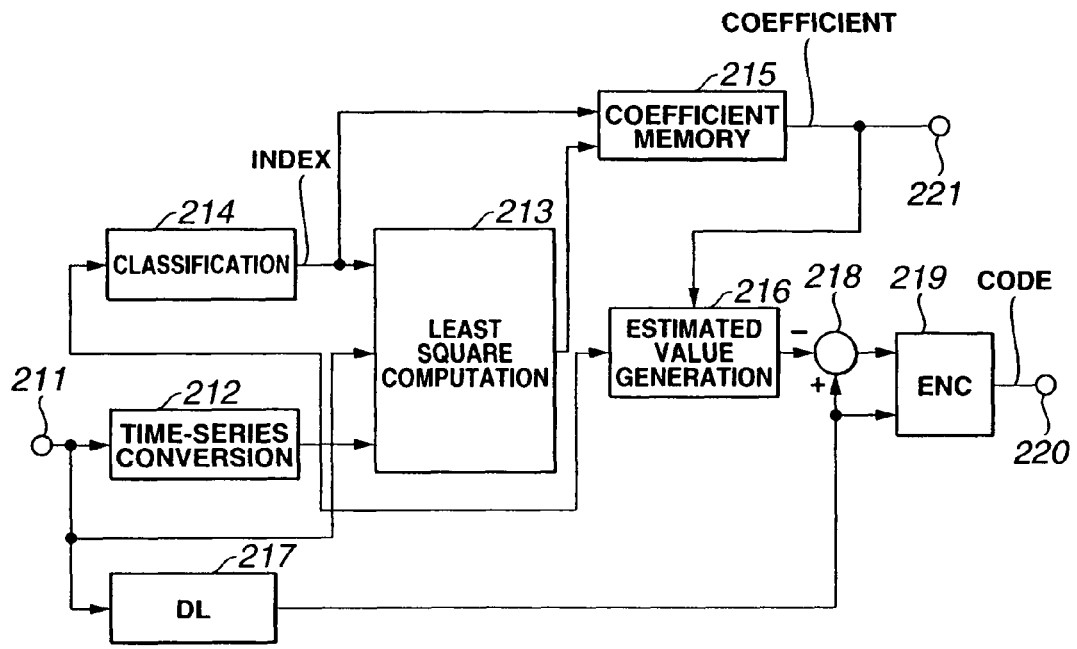
FIG. 31 is a block diagram of another example of the predictive coding circuit for classification-adaptive predictive coding.

In the example shown in FIG. 30, there is used a versatile coefficient acquired through a previously-made learning. The encoder shown in FIG. 31 is designed to update the coefficient in association with an input image. That is, the encoder has provided therein a least square computation circuit 213 similar to that intended for the learning to provide a coefficient with which the coefficient memory 215 is updated. More particularly, an index is supplied from the classification circuit 214 to the computation circuit 213 and coefficient memory 215, input image data are supplied to the computation circuit 213, and a determined coefficient is supplied from the computation circuit 213 to the coefficient memory 215. The coefficient may be updated based on a result of learning considerably many frames, not only at each frame of the input image. Also, a coefficient determined through learning in advance may be stored in a coefficient memory 215 in FIG. 31, and be updated with an input image. In the example in FIG. 31, since the content of the coefficient memory 215 changes, it is necessary to send coefficient data delivered at an output terminal 221 along with a code. In the encoder shown in FIG. 31, the least square computation circuit 213 may be adapted to selectively be operated.

Next, the construction of each of circuits provided during learning in the encoder will be described in detail.

Figure 32:
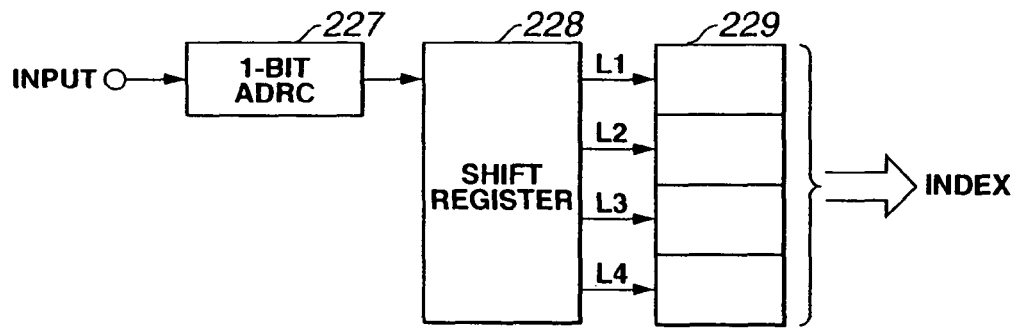
FIG. 32 is a block diagram of an example of the classification circuit for classification-adaptive predictive coding.

FIG. 32 shows an example of the classification circuits 204 and 214. Input image data (4-pixel data) are supplied one after another to a 1-bit ADRC circuit 227. The ADRC circuit 227 detects maximum and minimum values of the four pixels, to thereby detect a dynamic range DR which is a difference between the maximum and minimum values. The value of each pixel is divided by the dynamic range DR. The quotient is compared with 0.5. When the quotient is larger than 0.5, a code "1" is generated. When the quotient is smaller than 0.5, a code "0" is generated.

The ADRC circuit 227 compresses the value of each pixel to one bit ("0" or "1"). The output of the ADRC circuit 227 is supplied to a shift register 228 which in turn will converts the data from series to parallel. L1, L2, L3 and L4 each of 1 bit from the shift register 228 are stored into a register 229. These four bits (L1, L2, L3 and L4) form together an index.

The ADRC circuit 227 reduces the number of quantized bits to one (bit) as in the above. However, the number of bits may be reduced to two or more (bits). Also, the number of pixels in each pixel block including the four pixels for example may be reduced to a variable one.

Now, there will be described with reference to FIG. 33 a circuitry, in the receiver 2, intended for reception and decoding of the data (received code) encoded by the classification-adaptive predictive encoding as in the above.

Figure 33:
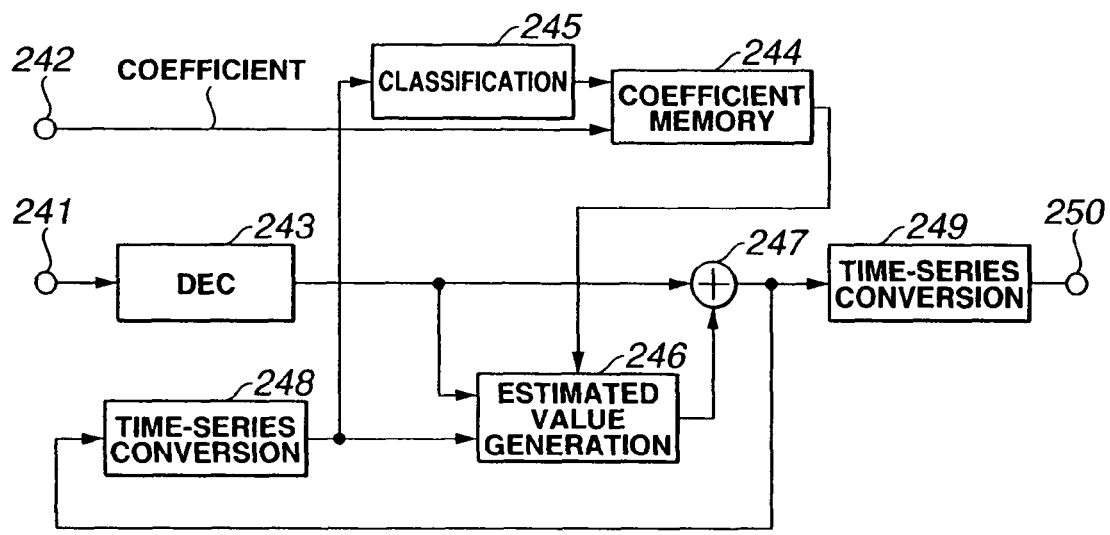
FIG. 33 is a block diagram of an example of the decoder for classification-adaptive predictive coding.

As shown in FIG. 33, a received code supplied to an input terminal 241 is supplied to a compression-encoding decoder 243, and a received coefficient from an input terminal 242 is supplied to a coefficient memory 244. The coefficient memory 244 outputs a coefficient corresponding to a class in responsive to the index supplied from a classification circuit 245. When it is not intended to change any coefficient acquired through the learning, the content of the coefficient memory 244 will not be changed. The content of the coefficient memory 244 has to be the same as that at the sending side. The coefficient is supplied to an estimated value generation circuit 246.

The decoder 243 provides decoded difference data which will be supplied to an adder 247. Also, pixel values inserted for refreshing are supplied to the estimated value generation circuit 246 in which they are used for generation of an estimated value. The adder 247 adds the decoded difference value and estimated value supplied from the estimated value generation circuit 246 to generate a decoded value. The decoded value is supplied to a time-series conversion circuits 248 and 249. The time-series conversion circuit 248 collects a plurality of decoded pixel data necessary for the estimation. The time-series conversion circuit 249 converts the decoded signals for display on the display unit 137 and sends the signals from an output terminal 250 to the display unit 137.

The decoded pixel data from the time-series conversion circuit 248 are supplied to the estimated value generation circuit 246 and the decoded pixel data necessary for the classification are supplied to a classification circuit 245. The classification circuit 245 is included in the aforementioned 1-bit ADRC circuit, and provides an index to the coefficient memory 244. The construction of each circuit in the decoder shown in FIG. 33 is similar to that having been described concerning the encoder, and therefore will not be described any more.

Next, the automatic power-consumption control algorithm will be described.

For control of the power consumption, each process is divided into basic operations and it is preset how much power each of the operations consumes. The value of the power for each operation will be hardware-dependent. With the use of the value of power for each operation, the power consumption can be reduced. In this embodiment, charging is made for usage of the automatic power-consumption control algorithm.

Also, the power consumption should automatically be controlled as elaborately as possible. Desirably, the power-consumption control should be effected for each process (1 clock) in the circuit. The concept of the power consumption control is shown in FIG. 34.

Figure 34:
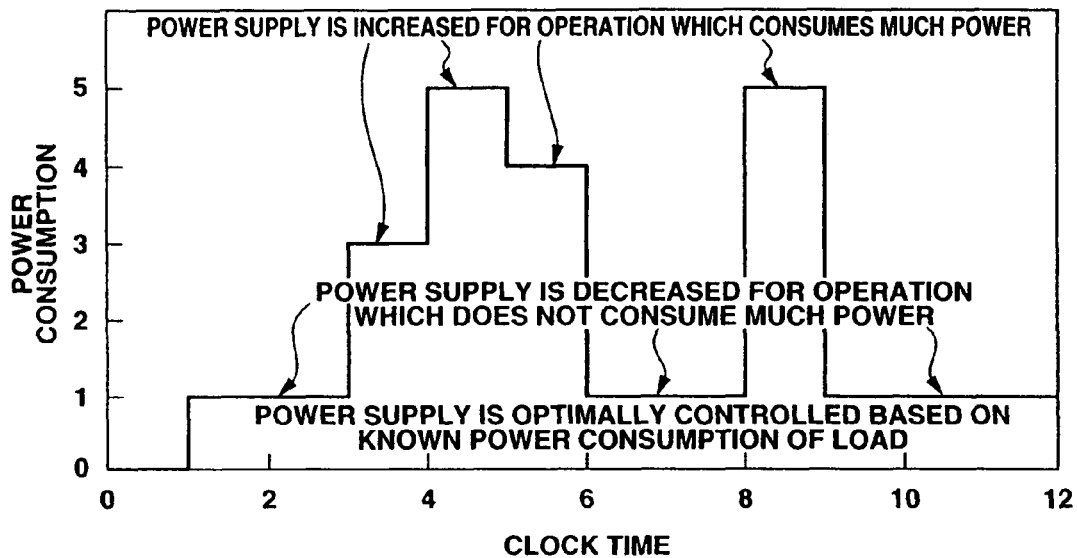
FIG. 34 explains the concept of an operation per process (per clock) in automatic control of the power consumption.

In FIG. 34, the vertical axis indicates a power consumption while the horizontal axis indicates one clock (one process). As shown in FIG. 34, the minimum necessary power for each of very small processes is examined in advance to control the supply of a necessary power for a process going to be done. That is, the power control is made to decrease the power supply for a process needing not so much power while increasing the power supply for a process needing much power.

Figure 35:
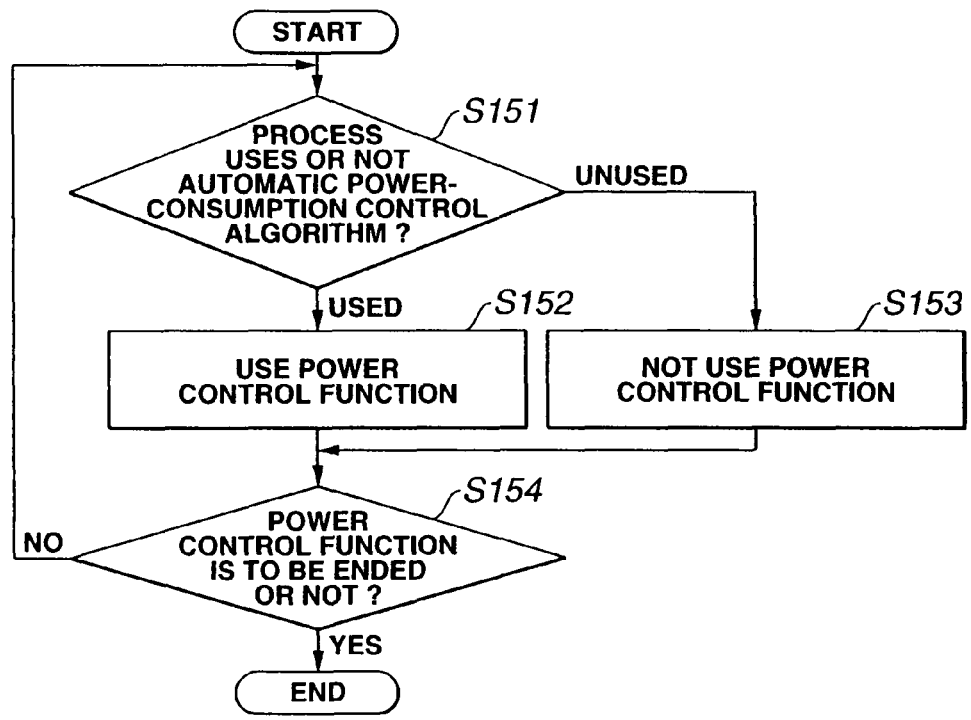
FIG. 35 shows a flow of operations made according to the automatic power-consumption control algorithm to judge whether a power control is to be done or not adaptively to a process.

FIG. 35 shows a flow of operations made in judging in the automatic power-consumption control algorithm whether the power control should be done for each of processes (other than the power control process).

As in FIG. 35, the power consumption controller 131 in FIG. 21 judges in step S151 based on the automatic power-consumption control algorithm which process is going to be done. When the power consumption controller 131 judges that the process going to be done is a one which uses the automatic power-consumption control algorithm, it will is set to perform the power control function for that process in step S152. When the judgement is that the process is a one which does not use the automatic power-consumption control algorithm, the power consumption controller 131 goes to step S153 where it will be set not to perform the power control function.

Thereafter, the power consumption controller 131 goes to step S154 where it will judge whether it should exit the power control function. When the power consumption controller 131 should not end the function, it returns to step S151. When it should end the function, it exits the automatic power-consumption control algorithm.

Figure 36:
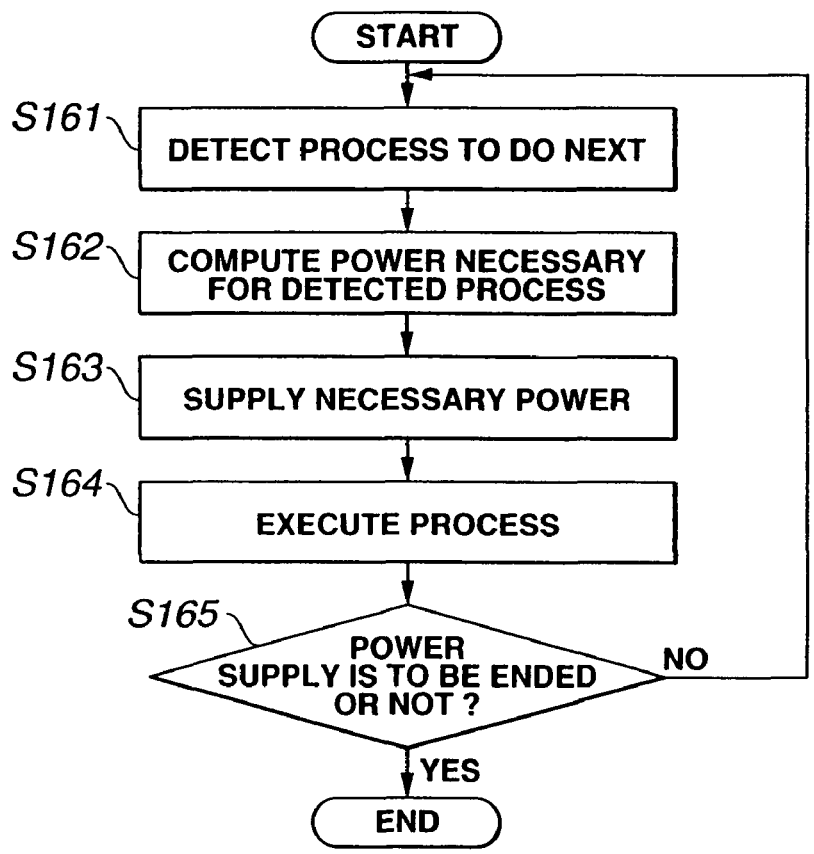
FIG. 36 shows a flow of operations made in performance of the power control function.

FIG. 36 shows a flow of operations effected when the power consumption controller 131 is set in step S152 in FIG. 35 to perform the power control function.

In step S161 in FIG. 36, the power consumption controller 131 monitors a next process to make, and computes, in step S162, a power necessary for the process (it is necessary to supply an power amount preset based on a reference table).

Next in step S163, the power consumption controller 131 supplies, from a power source (not shown), a power computed as in the above to each circuit in the system. Thus in step S164, each circuit in the receiver 2 actually effects the above-mentioned process. Alternatively, in case the power consumption controller 131 is incorporated in the controller 133 or the like, the system may be adapted such that some circuits in the controller 133 are selectively made to sleep according to the operation type of each process in order to control the power consumption.

Thereafter, the power consumption controller 131 judges whether the power supply is to be ended. When the judgment is that the power supply is not to be ended, the power consumption controller 131 returns to step S161. If the power consumption controller 131 judges that the power supply should be ended, it will exit the automatic power-consumption control algorithm.

Note that the charged amount may be changed according to the level of the process (algorithm). For example, the charged amount may be changed according to the time intervals of monitoring, to the level of optimization of the power consumption control, or to the like.

The above series of operations can be done by hardware or software. In case the operations are to be done by software, programs forming together the software are installed in a computer incorporated in the transmitter 1 and receiver 2 as dedicated hardware, a genera-purpose computer, or the like.

Here will be described a recording medium having the program for doing the series of operations recorded therein and used to install the program into a computer and enable them to be executed by the computer.

The program for effecting the above series of operations can be pre-recorded in a hard disc or semiconductor memory as a recording medium incorporated in a computer. The program may be stored (recorded) provisionally or permanently in recording medium such as a floppy disc, CD-ROM (compact disc read-only memory), MO (magneto-optical) disc, DVD (digital versatile disc), magnetic disc or a semiconductor memory.

Note that the program can be installed from the above-mentioned recording medium to a computer or it can be wirelessly transferred from a download site to a computer via a digital-broadcasting artificial satellite or via a network such as LAN (local area network) or Internet and installed into a hard disc incorporated in the computer.

Also note that the steps for description of the program for various operations may not always be done on the time series in a description sequence in a flow chart but may include operations which are effected in parallel or individually (for example, parallel operations or object-based operations).

Next, an example construction of the above-mentioned computer will be described with reference to FIG. 37.

Figure 37:
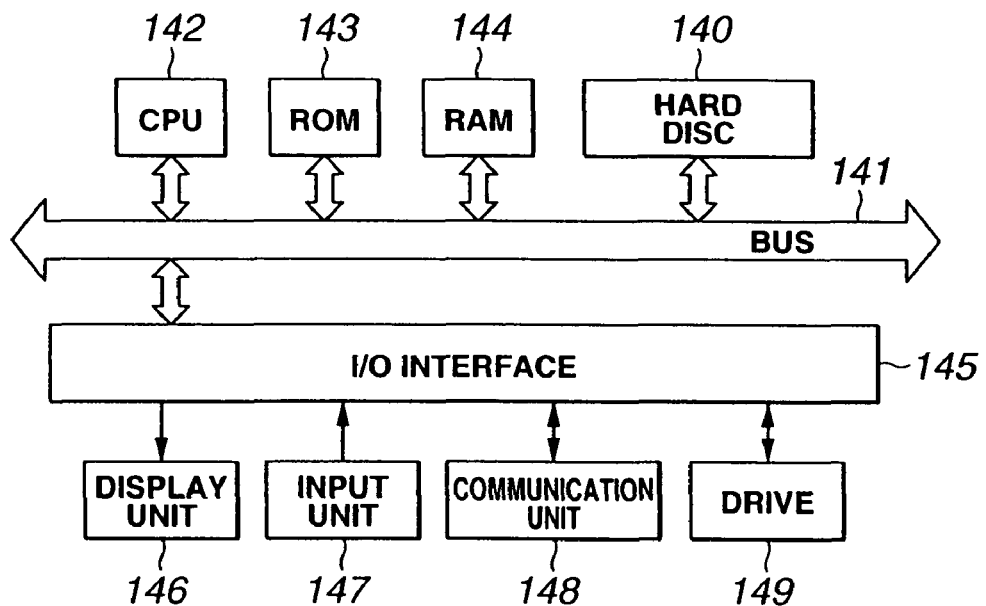
FIG. 37 is a block diagram of the computer according to the present invention.

The computer shown in FIG. 37 incorporates a CPU (central processing unit) 142. An input/output interface 145 is connected via a bus 141 to the CPU 142. When supplied with an instruction from the user operating an input unit 147 including a keyboard, mouse and the like via the input/output interface 145, the CPU 142 will execute a program stored in a ROM (read-only memory) 143 corresponding to the above-mentioned semiconductor memory. Alternatively, the CPU 142 will load, into a RAM (random-access memory) 144, and execute, a program stored in the hard disc 140, a program transferred from the satellite or network, received by a communication unit 148 and installed in the hard disc 140 or a program read out from a floppy disc, CD-ROM, MO disc, DVD or magnetic disc provided in a drive 149 and installed in the hard disc 140. Then the CPU 142 outputs the result of execution of the program to a display unit 146 composed of an LCD (liquid crystal display) or the like via the input/output interface 145 for example.

According to the present invention, the time resolution and spatial resolution of an image can be changed also by making discrete cosine conversion of the image to select a degree of coefficient or quantizing the image to change the quantizing step in the transmitter 1 for example.

For displaying for example an object image (interesting area) at an ordinary time resolution, the profile of the image may be chain-encoded, a mean value of pixels (color) of the object image be determined as a representative value and the data be subject to an entropy encoding such as Huffman encoding, in the transmitter 1, while the inside of the object image area may be painted in a color as the representative value in the receiver 2.

In the above example, the spatial resolution of an image is improved. On the contrary, the time resolution of the image can be improved. Also in the above example, the spatial resolution of a preferred range as an area of an image is improved, but the spatial resolution of the entire image can also be improved.

Further, in the above example, an image is separated into a background and object before being processed. However, the image may be processed without being so separated.

In the above example, switching can be made between various kinds of hardware by selecting an algorithm or software layer. In the present invention, the algorithm and hardware control program include an operation for switching between pieces of hardware. Thus, the present invention will include the switching between pieces of hardware and also charging corresponding to the switching.

Besides, the present invention is applicable to image data as well as to sound data. For example, the present invention can be applied to extraction of sound features (such as sound pitch, desired part of human voice, characteristic sounds of musical instruments, etc.) based on a certain basic frequency included in sound signal.

As having previously been described, the Japanese Published Unexamined Application No. 164552 of 1998 discloses a video-on-demand transmitter and terminal which make it possible to serve a video program whose quality meets the user's demand and charge the user on a program-quality basis. In the technique disclosed in this Japanese Published Unexamined Application, the transmitter and terminal use data processing algorithms similar to each other such as MPEG-1 or MPEG-2 upon which the quality of a served video program depends and thus the charge for a served video program is varied depending upon whether or not the served video program is a one compressed with a data processing algorithm such as MPEG-1 or MPEG-2. That is, in this system, a data processing algorithm (MPEG-1 or MPEG-2) used at the receiving side (terminal) is similar to a one (MPEG-1 or MPEG-2) at the transmitter to select an image quality. Also in this disclosed system, it is possible at the receiving side to reproduce an video program having been processed with either MPEG-1 or MPEG-2. In other words, the sending side uses a data processing algorithm similar to a one used at the receiving side.

However, in the data transmission system according to the present invention selects, the transmitter selects one of quite different algorithms such as sub sample compression, object encoding-compression, classification-adaptive predictive compression, etc. for transmission of data and the receiver can reproduce the data having been processed with the selected algorithm. Further, the communication system according to the present invention cannot only select one of the different algorithms but can automatically select a compression method and predict a focus of interest. Also the system according to the present invention can select one of different software layers as in the automatic selective control of power consumption.

INDUSTRIAL APPLICABILITY

According to the present invention, desired ones of a plurality of different software layers and algorithms can be designated for use to process data for transmission, ones for the data can be selected from the different software layers and algorithms, the data can be processed with the use of the selected software and algorithm, and charging can be made for the use of the software layer and algorithm, whereby it is possible to serve data to various demands from a user and charge the user for the use of the data, that is, to charge the user for the merits such as level of data processing result (image quality, sound quality, etc.), power consumption, processing time, data transfer time and result of processing as well as to the satisfaction of the data server or provider having served the data to the user.

The invention claimed is:

1. A communication system with a charging management apparatus, comprising:
    a processor including:
        a designator adapted to designate desired methods for at least an application layer and hardware control layer, respectively;
        a request signal transmitter configured to send a signal of request for a method designated by the designator;
        a receiver for receiving a reply to the request signal;
        a signal processor for selectively carrying out methods related to the application layer;
        a hardware controller for selectively carrying out methods related to the hardware control layer; and
        a controller for controlling the signal processor or hardware controller to carry out the method designated by the designator;
    a charging management apparatus including:
        a receiver for receiving the request signal;
        a judgment unit for judging, based on the received request signal, that the method designated by the designator is available;
        a transmitter for sending the judgment result from the judgment unit to the receiver;
        a usage-charge storage unit for storing charge information on the use of each of a plurality of methods stored in the signal processor or hardware controller; and
        a processor for computing, based on information stored in the usage-charge storage unit, information indicative of an amount charged to the user having made designation to the designator, and outputting the charged amount information,
    wherein the hardware controller controls a power for supply to circuits in the processor according to the methods carried out by the processor.

2. The communication system according to claim 1,
    wherein the signal processor includes a storage unit to store a plurality of methods; and
    wherein the controller reads, from the storage unit, one method in response to a designation from the designator and carries out the method.

3. The communication system according to claim 2,
    wherein the signal processor is located remote from the controller,
    wherein the one method designated from the designator is read from the storage unit and downloaded to the controller, and
    wherein the controller carries out the downloaded method.

4. The communication system according to claim 1,
    wherein the receiver receives content data;
    wherein the processor includes an output unit for outputting the received content data; and
    wherein the signal processor being controlled by the controller to process supplied content data by carrying out a method selected on the basis of the designation supplied from the designator, and output the processed content data to the transmitter.

5. The communication system according to claim 4,
    wherein the signal processor has a plurality of methods corresponding to a plurality of compression algorithms by which the supplied content data are compressed; and
    wherein the content data are compressed by a user-defined compression algorithm under the control of the controller.

6. The communication system according to claim 5,
    wherein the signal processor holds a method which is a compression algorithm including the steps of:

extracting an interesting image block corresponding to an interesting pixel from image data supplied as content data;

classifying the interesting pixel based on the values of pixels included in the interesting image block;

outputting an estimated value of the interesting pixel, obtained by a linear primary combination of a plurality of coefficients pre-computed for each class and stored and the value of each pixel included in the estimation image block corresponding to the interesting pixel; and encoding a value resulted from subtraction of the estimated value from the value of the interesting pixel.

7. The communication system according to claim 5, wherein the signal processor holds a method which is a compression algorithm including the steps of:

dividing a current frame of moving image data supplied as content data into more than at least one object images; and computing a movement vector of an object inside the object image resulted from the division from the current frame and past frame.

8. The communication system according to claim 5, wherein the signal processor stores a method which is a compression algorithm to automatically select, from the signal processor, one of a plurality of methods corresponding to the plurality of compression algorithms corresponding to money amount information designated by the designator.

9. The communication system according to claim 8, wherein the method to select one of the plurality of methods has the steps of:

selecting one, which can be used at the lowest price, of the plurality of methods corresponding to the plurality of compression algorithms;

computing a difference between decoded data resulted from decoding of the content data compressed by the lowest-price method and original content data; and outputting the compressed content data when the difference is smaller than a threshold.

10. The communication system according to claim 5, wherein the signal processor stores a method to automatically select, from the signal processor, one of a plurality of methods corresponding to the plurality of compression algorithms corresponding to a feature of image data as the supplied content data.

11. The communication system according to claim 10, wherein the method stored by the signal processor to select one of the plurality of methods is to detect an activity as a feature of image data as the supplied content data, and select one of the plurality of methods corresponding to a higher-level compression algorithm.

12. The communication system according to claim 5, wherein the output unit displays image data as the supplied content data, wherein the designator is operated by the user to designate a predetermined position of the displayed image data, and wherein the signal processor stores a method including the steps of:

estimating a preference of the user from a feature of an object image in the image data corresponding to a predetermined position designated by the designation input unit;

automatically extract an object image the user is interested in from the image data based on the estimated user's preference; and compressing the image data for the extracted object image to have a lower compression ratio than other object images.

13. The data processing system according to claim 1, wherein the processor computes the charged amount information by summing a charge for the use of the automatic selection method for automatic selection of one of the plurality of methods based on the information stored in the usage charge storage and a charge for the use of a compression algorithm selected by the automatic selection method.

14. The communication system according to claim 1, wherein the processor sends a pre-stored user's number of accounting, a number of accounting of a provider providing a service based on the method and the charged amount information to an external payment center.

15. The communication system according to claim 1, wherein the hardware controller and controller are formed in one chip, and wherein the method of the hardware controller puts the functions of the controller into a sleeping state according to a command supplied by a clock.

16. The communication system according to claim 15, wherein the processor sends a pre-stored user's number of accounting, a number of accounting of a provider providing a service based on the method and the charged amount information to an external payment center.

17. A communication system comprising first and second communication apparatuses and a charging apparatus, the first communication apparatus including:

a designation input unit for designating desired methods for at least an application layer and hardware control layer, respectively, of a transmitter;

a signal transmitter for sending a signal of request for a method designated by the designation input unit;

a receiver for receiving content data processed by the method made available by the signal transmitter;

a hardware controller for selectively carrying out methods related to the hardware control layer; and a first controller for controlling the hardware controller to carry out the method designated by the designation input unit;

the second communication apparatus including:

a signal processor for selectively carrying out methods related to the application layer to process input content data;

a second controller for controlling the method designated by the designation input unit to be carried out based on the request signal sent from the signal transmitter; and a transmitter for sending the processed content data to outside; and the charging management apparatus including:

a usage-charge storage unit for storing charge information on the use of each of a plurality of methods stored in the signal processor or hardware controller; and a processor for computing, based on information stored in the usage-charge storage unit, information indicative of an amount charged to the user having made a designation to the designation input unit, and for outputting the charged amount information, wherein the hardware controller stores a method to control a power for supply to circuits in the processor according to the methods carried out by the processor.

18. The communication system according to claim 17, wherein the signal processor includes a storage unit to store a plurality of methods; and wherein the first and second controllers read, from the storage unit, one method in response to a designation from the designation input unit and carry out the method.

19. The communication system according to claim 18, wherein the signal processor stores a plurality of methods corresponding to a plurality of compression algorithms by which the supplied content data are compressed; and
wherein the content data are compressed by a user-defined compression algorithm under the control of the second controller.

20. The communication system according to claim 19, wherein the signal processor stores a method which is a compression algorithm including the steps of:
dividing a current frame of moving image data supplied as content data into more than at least one object images; and
computing a movement vector of an object inside the object image resulted from the division from the current frame and past frame.

21. The communication system according to claim 18, wherein the signal processor stores a method which is a compression algorithm having the steps of:
extracting an interesting image block corresponding to an interesting pixel from image data supplied as content data;
classifying the interesting pixel based on the values of pixels included in the interesting image block;
outputting an estimated value of the interesting pixel, obtained by a linear primary combination of a plurality of coefficients pre-computed for each class and stored and the value of each pixel included in the estimation image block corresponding to the interesting pixel; and
encoding a value resulted from subtraction of the estimated value from the value of the interesting pixel.

22. The communication system according to claim 19, wherein the signal processor stores a method which is a compression algorithm to automatically select, from the signal processor, one of a plurality of methods correspondingly to the plurality of compression algorithms correspondingly to money amount information designated by the designation input unit.

23. The communication system according to claim 22, wherein the method to select one of the plurality of methods includes the steps of:
selecting one, which can be used at the lowest price, of the plurality of methods corresponding to the plurality of compression algorithms;
computing a difference between decoded data resulted from decoding of the content data compressed by the lowest-price method and original content data; and
outputting the compressed content data when the difference is smaller than a threshold.

24. The communication system according to claim 22, wherein the processor computes the charged amount information by summing a charge for the use of the automatic selection method for automatic selection of one of the plurality of methods based on the information stored in the usage charge storage unit and a charge for the use of a compression algorithm selected by the automatic selection method.

25. The communication system according to claim 24, wherein the processor sends a pre-stored user's number of accounting, a number of accounting of a provider providing a service based on the method and the charged amount information to an external payment center.

26. The communication system according to claim 19, wherein the signal processor stores a method to automatically select, from the signal processor, one of a plurality of methods corresponding to the plurality of compression algorithms corresponding to a feature of image data as the supplied content data.

27. The communication system according to claim 26, wherein the method stored by the signal processor to select one of the plurality of methods has the steps of:
detecting an activity as a feature of image data as the supplied content data; and
selecting a one, of the plurality of methods, corresponding to a higher-level compression algorithm.

28. The communication system according to claim 19, wherein there is further provided a display unit for displaying image data as the supplied content data,
wherein the designation input unit is operated by the user to designate a predetermined position of the displayed image data, and
wherein the signal processor stores a method including the steps of:
estimating the preference of the user from a feature of an object image in the image data corresponding to a predetermined position designated by the designation input unit;
automatically extracting an object image the user is interested in from the image data based on the estimated user's preference; and
compressing the image data for the extracted object image to have a lower compression ratio than other object images.

29. The communication system according to claim 17, wherein the hardware controller and controller are formed in one chip, and
wherein the method of the hardware controller puts the functions of the controller into sleeping state according to a command supplied by a clock.

30. The communication system according to claim 29, wherein the processor sends a pre-stored user's number of accounting, a number of accounting of a provider providing a service based on the method and the charged amount information to an external payment center.

* * * * *